US011190929B1

(12) United States Patent
Espy et al.

(10) Patent No.: US 11,190,929 B1
(45) Date of Patent: Nov. 30, 2021

(54) ELECTRONIC DEVICE IDENTIFICATION SYSTEM, APPARATUSES, AND METHODS

(71) Applicant: Ubiety Technologies, Inc., Chicago, IL (US)

(72) Inventors: Aaron Richard Espy, Chicago, IL (US); Keith Puckett, Chicago, IL (US); Brian Sykes, Wilmette, IL (US); Mark Hoffmann, Lansing, IL (US); Michael Cox, Sun Valley, CA (US)

(73) Assignee: Ubiety Technologies, Inc., Chicago, IL (US)

( * ) Notice: Subject to any disclaimer, the term of this patent is extended or adjusted under 35 U.S.C. 154(b) by 0 days.

(21) Appl. No.: 16/886,125

(22) Filed: May 28, 2020

Related U.S. Application Data

(62) Division of application No. 16/801,915, filed on Feb. 26, 2020.

(60) Provisional application No. 62/823,812, filed on Mar. 26, 2019, provisional application No. 62/842,970, filed on May 3, 2019, provisional application No. 62/941,042, filed on Nov. 27, 2019.

(51) Int. Cl.
*H04W 8/18* (2009.01)
*H04W 4/021* (2018.01)
*H04L 29/12* (2006.01)
*H04W 4/80* (2018.01)
*H04B 17/318* (2015.01)
*H04W 76/11* (2018.01)
*H04W 8/20* (2009.01)

(52) U.S. Cl.
CPC .......... *H04W 8/183* (2013.01); *H04B 17/318* (2015.01); *H04L 61/6054* (2013.01); *H04W 4/021* (2013.01); *H04W 4/80* (2018.02); *H04W 8/205* (2013.01); *H04W 76/11* (2018.02)

(58) Field of Classification Search
CPC ..... H04W 8/183; H04W 8/205; H04W 76/11; H04W 4/80; H04L 61/6054; H04B 17/318
See application file for complete search history.

(56) References Cited

U.S. PATENT DOCUMENTS

| | | |
|---|---|---|
| 9,245,433 B1 | 1/2016 | Butler et al. |
| 10,008,102 B1 | 6/2018 | McEachron |
| 10,045,156 B2 | 8/2018 | Malone et al. |
| 10,356,620 B1 | 7/2019 | Obaidi |
| 10,440,499 B2 | 10/2019 | Farrell |

(Continued)

*Primary Examiner* — Christine Ng
(74) *Attorney, Agent, or Firm* — Perkins Coie LLP

(57) ABSTRACT

A wireless device identification system including one or more sensors each having at least one software defined radio to receive signals transmitted between one or more wireless devices and a mobile wireless device, one or more processors, and one or more memory devices. The one or more memory devices having stored thereon instructions that when executed by the one or more processors cause the one or more processors to capture cellular information, Wi-Fi information, Bluetooth information, and local network information from the received signals. The instructions can include correlating the captured information to the mobile wireless device by creating a weighted edge relationship graph having a plurality of nodes, including a node corresponding to each of the cellular information, the Wi-Fi information, the Bluetooth information, and the local network information, and determining an association strength between each node of the relationship graph.

6 Claims, 41 Drawing Sheets

(56) References Cited

U.S. PATENT DOCUMENTS

| | | |
|---|---|---|
| 10,448,312 B2 | 10/2019 | Sanderson et al. |
| 2006/0046745 A1 | 3/2006 | Davidson |
| 2006/0205354 A1 | 9/2006 | Pirzada et al. |
| 2008/0076430 A1* | 3/2008 | Olson ............... H04W 36/0085 455/440 |
| 2009/0111501 A1* | 4/2009 | Tang .................... H04W 84/18 455/522 |
| 2010/0261478 A1 | 10/2010 | Schmidt et al. |
| 2011/0059768 A1* | 3/2011 | Pandruvada .......... H04W 88/06 455/552.1 |
| 2011/0150211 A1 | 6/2011 | Anderson |
| 2011/0171993 A1 | 7/2011 | Kim et al. |
| 2011/0222466 A1* | 9/2011 | Pance ................. H04Q 3/0029 370/316 |
| 2011/0292898 A1* | 12/2011 | Wu ..................... H04W 72/044 370/329 |
| 2012/0170556 A1 | 7/2012 | Tsfati et al. |
| 2013/0089217 A1* | 4/2013 | Kelloniemi .............. H04R 3/12 381/77 |
| 2013/0178232 A1* | 7/2013 | Claussen .................. H01Q 3/00 455/456.2 |
| 2014/0267148 A1 | 9/2014 | Luna et al. |
| 2015/0038116 A1 | 2/2015 | Lodeweyckx |
| 2016/0127931 A1* | 5/2016 | Baxley ..................... G06T 7/60 455/67.16 |
| 2016/0269399 A1 | 9/2016 | Abreu |
| 2017/0034660 A1 | 2/2017 | Roy et al. |
| 2017/0289743 A1 | 10/2017 | Asakura |
| 2018/0065017 A1* | 3/2018 | Murdock ............... G16H 40/67 |
| 2018/0077538 A1* | 3/2018 | Matus ................... G08B 21/04 |
| 2018/0139309 A1* | 5/2018 | Pasam .................... H04W 4/70 |
| 2018/0192393 A1 | 7/2018 | Speks et al. |
| 2018/0375861 A1 | 12/2018 | Isola et al. |
| 2019/0053051 A1 | 2/2019 | Yu et al. |
| 2019/0369242 A1* | 12/2019 | Wang ................... H01L 25/167 |

\* cited by examiner

ELECTRONIC DEVICE IDENTIFICATION SYSTEM, APPARATUSES, AND METHODS

CROSS-REFERENCE TO RELATED APPLICATIONS

This application is a divisional of U.S. patent application Ser. No. 16/801,915, entitled "ELECTRONIC DEVICE IDENTIFICATION SYSTEM, APPARATUSES, AND METHODS," filed Feb. 26, 2020, which claims priority to and the benefit of U.S. Provisional Patent Application No. 62/823,812, entitled "ELECTRONIC DEVICE IDENTIFICATION SYSTEM, APPARATUSES, AND METHODS," filed Mar. 26, 2019, U.S. Provisional Patent Application No. 62/842,970, entitled "ELECTRONIC DEVICE IDENTIFICATION AND DATA ANALYTICS POWERED HOME SECURITY SYSTEMS AND METHODS," filed May 3, 2019, and U.S. Provisional Patent Application No. 62/941,042, entitled "MOBILE DEVICE DETECTION AND DATA ANALYTICS POWERED SECURITY MONITORING SYSTEM AND METHODS," filed Nov. 27, 2019, the disclosures of which are hereby incorporated by reference in their entireties.

TECHNICAL FIELD

The present technology is generally directed to collection and processing of wireless transmissions and digital signaling data over large areas. In particular, several embodiments of the present technology are related to systems, apparatuses, and methods for the collection and processing of transmissions and digital signaling data generated by wireless electronic devices for the purpose of identifying individuals via their respective electronic devices in proximity to a secure area, crime, or other event of interest.

BACKGROUND

There is a burglary or home invasion in the United States approximately every 14.6 seconds, which translates to over two million burglaries committed annually. Nearly 75% of those burglaries are committed against residential homes. It is estimated that less than 10% of these crimes result in an arrest of the perpetrator.

Home security has been a concern for as long as private homes and commercial businesses have existed. Early home security systems involved magnetic contacts which were installed on points of entry from the exterior of the home or business. If a door or window was opened while the system was armed, an alarm would sound inside the house. Eventually home security systems were integrated with telephone carriers which made a dramatic improvement in the ability to notify police if an alarm breach had happened at a home or business. A significant improvement to home security in the last 30 years has been the advent of the security camera. Security cameras have long been a tool of comfort for homeowners, believing they offer a greater deterrent to a would-be burglar or intruder.

Today, conventional home security systems generally operate in the following steps. An alarm sensor detects a breach from the exterior, which then allows the homeowner, if present, to have 1-2 minutes to key in a code to disarm the alarm system. If that 1-2 minutes elapses, then the alarm monitoring company attempts a decision tree process of outreach to the homeowner(s). This typically includes calls and SMS messages to the homeowner(s) to ask if the alarm company should dispatch the police. If the alarm is triggered, and the homeowner is not home, then this process adds incremental latency. Once that process completes, the alarm monitoring company then dispatches the police to the home. It is common for the outreach and dispatch processes to take up to 10 minutes, which is often longer than a burglary takes. In other words, by the time the police arrive at the home, the criminals have come and gone.

BRIEF DESCRIPTION OF THE DRAWINGS

The devices, systems, and methods described herein can be better understood by referring to the following Detailed Description in conjunction with the accompanying drawings, in which like reference numerals indicate identical or functionally similar elements.

Figure 1:
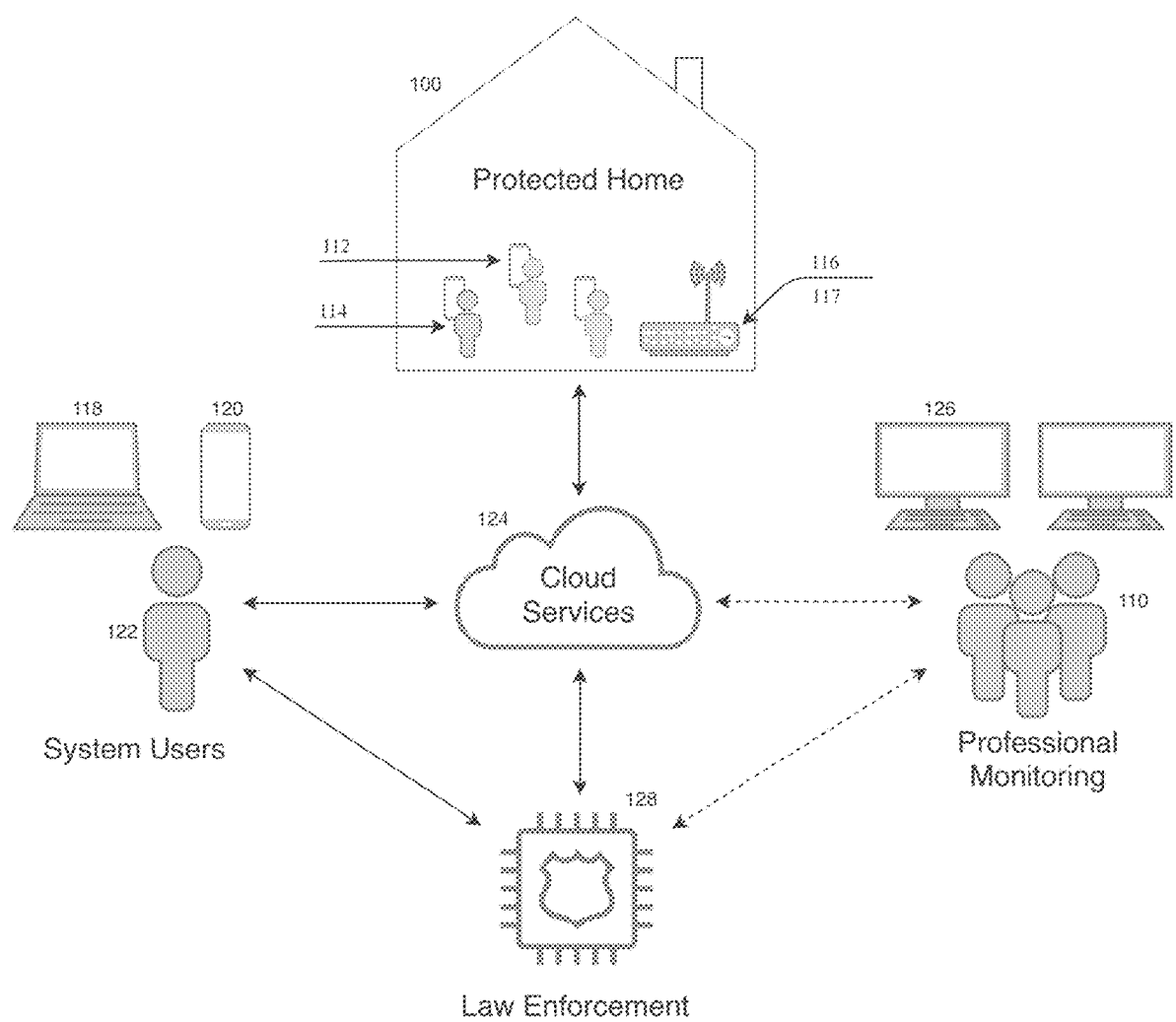
FIG. 1 illustrates the high-level components, entities and interactions of the digital monitoring capability of a wireless device detection and data analytics powered security monitoring system according to some embodiments of the disclosed technology.

The headings provided herein are for convenience only and do not necessarily affect the scope of the embodiments. Further, the drawings have not necessarily been drawn to scale. For example, the dimensions of some of the elements in the figures can be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein can be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this specification.

Introduction

Disclosed herein are wireless device detection and data analytics powered security monitoring systems and methods for identifying and tracking one or more people within an area, such as in and around a private residence or commercial business. Through early identification and tracking, the disclosed system and methods can be used to detect home invasions, identify residents that may be in danger and provide law enforcement with a perpetrator's identity for future arrest and conviction. The disclosed technology can thus provide an early warning of potential danger even before a break-in occurs.

The technology described herein provides a service capable of replacing and/or augmenting conventional security monitoring services. These services can be supported by several major components including hardware sensors, cloud services, mobile applications, and web applications. The hardware sensor can be configured to provide wireless signal detection, wireless interface characterization, external system interfaces, Internet of Things (IoT) services and data backhaul. Cloud services can be configured to provide user account management, transactional data storage, data analytic services, Application Program Interfaces (API) and the management of mobile and web applications. A mobile application can provide a user interface configured to provide event notifications, event assessment tools, event reporting tools, persona configuration, account management and application settings. The web application can be configured to provide a similar interface as the mobile application through a standard browser.

In some embodiments, wireless device signaling data can be used to determine the digital identity of anyone in a building, such as a home, at any given time. Signaling data can be provided by a proprietary sensor, described more fully below, and can be deployed within the home or a neighborhood to comprehensively monitor wireless signaling. The signaling can be used to detect events and variables, such as the time a person enters the home or building, how long they have stayed and if they are an intruder. In some embodiments, a neighborhood (large area) sensor or sensor array can be used in conjunction with a home (small area) sensor to detect the cellular subscription data as a device transitions from one cell neighbor to another.

In some embodiments, the system can be configured to provide the user with features such as notification, monitoring, assessment and reporting of events occurring within a home. The culmination of these features can be referred to as "awareness". Awareness can be achieved through the detection of wireless devices and their presence and behavior within the home. Wireless devices can be mapped to one or more personas identified by the user. The high-fidelity mapping of devices to personas can be achieved by a variety of analytic services, such as device characterization, device behavior learning, persona behavior learning, data correlation and AI. Awareness may also be augmented by data provided from external services, such as conventional security systems, cameras and other external security systems.

In further embodiments, the system and methods described herein may notify the user of an intrusion event. Mobile and web applications can be used as the primary mechanisms to notify the user of a potential intrusion event. An intrusion may refer to an event created by the presence of one or more unrecognized devices in the home. An event may also be created by one or more personas entering a home without the expressed permission of the homeowner. Intrusions may include personas that are explicitly prohibited from entering the home by the homeowner or applicable laws.

In further embodiments, the system and methods described herein can provide tools to the user for the purposes of assessing an event and determining an appropriate course of action. Events can be reported to law enforcement, designated contacts, and third-party professional monitoring services. The event details may include information that can be used to generate an automated report. The automated report may contain pertinent details for law enforcement and other trusted entities to appropriately respond to the intrusion and inform further investigations.

System Overview

FIG. 1 provides a depiction of example components for a wireless device detection and data analytics powered security monitoring system ("the system") according to various embodiments described herein. In some embodiments, the components may include a sensor 116 (described more fully below), cloud services 124, mobile application 120, web application 118, and monitoring center web application 126, respectively.

The sensor 116 can be an IoT managed device that provides wireless device detection. In some embodiments, the sensor 116 detects the transmission of wireless signaling from the interfaces contained on a wireless device 112, 114. The signaling is decoded and pre-processed and the resulting data is streamed to the cloud in the form of a proprietary message format. In some embodiments, a sensor array 117, comprised of one or more sensors 116, can be used to collect cellular and Wi-Fi signaling data from detected electronic devices, decode that data and send it to the cloud 124. The sensor array 117 can work in concert to share signaling data captured from mobile wireless devices and base stations between individual sensors, which aids in downstream analytics.

The cloud services platform 124 may comprise a series of public cloud services that work together to receive, analyze and process data for consumption of upstream systems. The systems and methods described herein can be agnostic to the public cloud provider. The cloud platform 124 may receive data from one or more operational sensors 116. The cloud 124 can be configured to accept new valid connections and can be elastic in capacity to accommodate fluctuation in data ingest rates and future scalability. Received data is analyzed in real-time as described herein. The result of the analysis can be stored in databases for consumption by upstream systems.

The mobile application 120 provides a user interface for the system. The mobile application 120 provides a series of real-time views that may allow the user(s) 122 to monitor a home, assess events, and report events. Other configurations and views can be provided to support the overall user experience. The mobile application 120 can be platform independent and adapted to run on modern electronic devices with various screen sizes and resolutions. The mobile application 120 may allow for the creation and maintenance of user accounts within the system. The web application 118 provides all the same features as the mobile application 120 but is designed to operate within a web browser. The web application 118 and the mobile application 120 are synchronized and can be used interchangeably. User(s) 122 can have different relationships and status with respect to the home but are assumed to be authorized by the legal homeowner to be consumers of the data and services provided by the system. To facilitate brevity in description, home may also refer to a business, non-residence building, property, or any other location of interest which a person may enter that the user may legally own or otherwise be tasked with securing.

The monitoring center web application 126 may provide a dashboard and management capability to external professional monitoring services. This capability aggregates the status of all monitored systems and provides alerts in the case of an intrusion event. The system can be configured to provide information about the intrusion and a percentage-based probability score that the intrusion should be reported. The presentation of the intrusion may allow the monitoring center web application 126 to help reduce the level of investigation required by traditional professional monitoring services 110. Additionally, the fidelity of the information and scoring system may also substantially reduce false reporting to law enforcement 128. The professionals monitoring all enrolled systems 110 may simply provide a backup to the system user 122 in the event they do not receive a notification on their mobile wireless device mobile application 120 or web browser web application 118.

System Usage

FIG. 1 illustrates a representative embodiment of the systems described herein. In this example, the sensor 116 is installed in the home 100 and detects wireless interfaces contained within wireless devices 112, 114. The sensor 116 may send detection information to the cloud services platform 124. Cloud services 124 can be used to establish relationships between wireless interfaces, wireless devices 112, 114, personas and the home. These relationships may drive the event and awareness services provided by the system. The web and mobile applications 118, 120, respectively, may provide an interface to the user 122 associated with the home 100 for the purposes of real-time awareness monitoring and executing a workflow to assess and report events. The monitoring web application 126 may provide external monitoring professionals 110 the ability to receive notifications, perform event assessment, and initiate intrusion reports on behalf of the user 122.

System Architecture

Figure 2A:
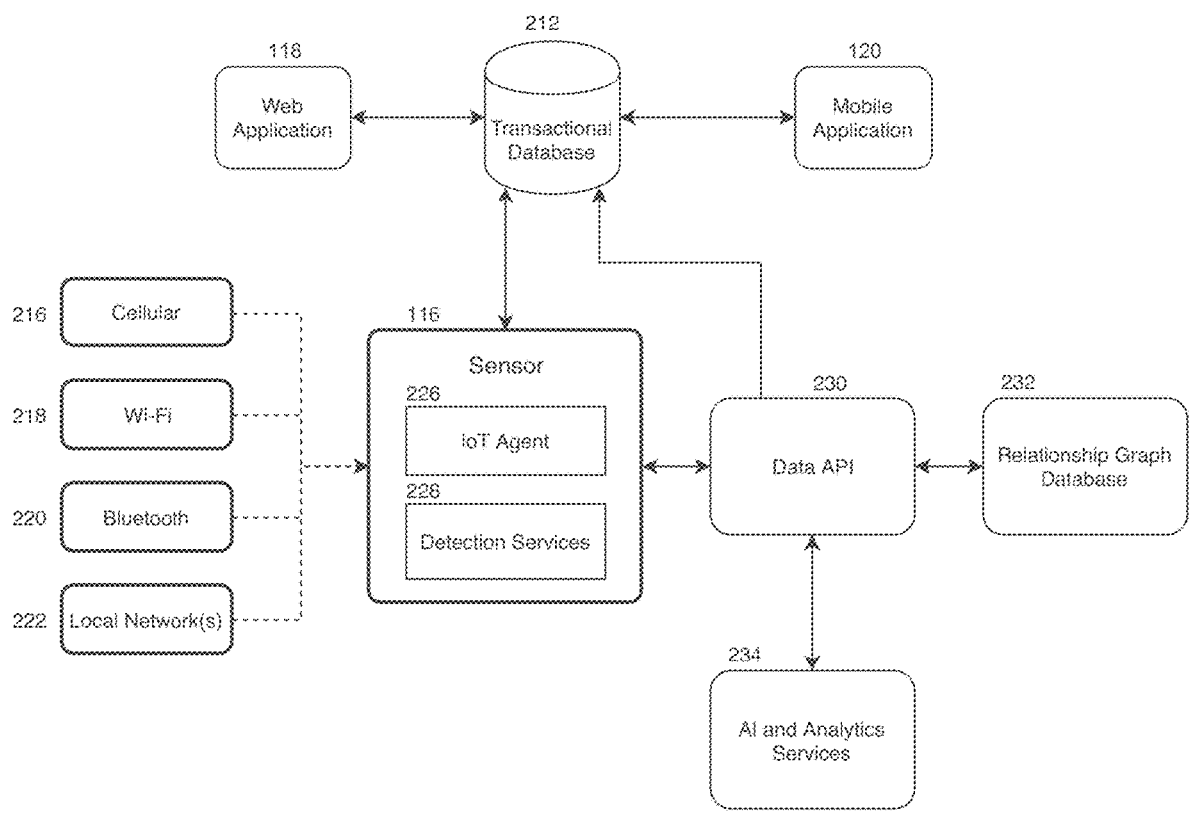
FIG. 2A illustrates an example of the components that comprise the functional and data architecture according to some embodiments of the disclosed technology.

FIG. 2A illustrates an example high-level architecture for the system according to a representative embodiment. The example architecture in this illustration also provides the general flow of information within the system architecture. In the depicted embodiment, the sensor 116 can be managed by a modern IoT framework and associated IoT services. These services provide the ability to remotely monitor, provision, configure and maintain all sensors 116. The IoT framework also provides automation of sensor management greatly reducing the operational costs associated with typical management of large-scale product deployment. Additionally, the IoT framework can employ an IoT agent 226 on each sensor that allows for dynamic updates to the detection services 228 running on the sensor 116. The detection services 228 running on the sensor 116 provide real-time detection of wireless signals within the protected home 100 (FIG. 1). These detection services 228 are continuously updated by the IoT agent 226 with improved detection capabilities, which can be the result of AI learning and analytic services 234.

The sensor 116 provides wireless interface detection services. These detection services can be categorized into two distinct detection methods: exploitive and cooperative. Exploitive detection is a method of passively detecting devices through their wireless interfaces (e.g., devices 112, 114, FIG. 1) through cellular 216, Wi-Fi 218, and Bluetooth 220 transmissions. Cooperative detection is a method of detecting wireless device details through local Wi-Fi network discovery. This method requires wireless devices to join one or more Wi-Fi Local Area Networks (LAN) 222.

The results of cooperative and exploitive detection can be transmitted to various cloud services, such as cloud platform 124 (FIG. 1), through a proprietary message format described more fully below. The IoT agent 226 is responsible for managing communications between the sensor 116 and upstream cloud services 212, 230. The example data flow provided by FIG. 2A illustrates two primary services within the cloud platform 124. Real-time detection services provided by the sensor 116 can be streamed to a transactional database 212 hosted in the cloud 124. The results of device detection are also streamed from the sensor 116 to the data API 230 also hosted in the cloud 124. These two data ingest services 212, 230 are agnostic to the cloud provider and may leverage multiple providers.

The primary purpose of the transactional database service 212 can be to store data structures and associated real-time services that require ultra-low latency transactions. The presentation of real-time monitoring and event data on the mobile application 120 and web application 118 can be examples of ultra-low latency transactions. The transmission of detection data 228 from the sensor 116 may also require ultra-low latency transactions, therefore, that data can be stored in the transactional database 212 and made available to the mobile 120 and web 118 applications, in real-time.

The primary purpose of the data API service 230 can be to receive, translate and manage data within the cloud infrastructure 124. The data API 230 may serve to ensure that the IoT agent 226 and transactional database 212 are synchronized with the learned data relationships stored in the relationship graph database 232. The data API 230 may serve as a data broker between instances of a relationship graph database 232 service, AI and analytic services 234, and the transactional database 212. This data path from sensor 116 to Data API 230 and between Data API 230 and the relationship graph 232 and AI Analytics 234 can deliver data to various services for the purpose of learning relationships between wireless interfaces 216, 218, 220, 222, wireless devices 112, 114, personas 306 (see FIG. 3), and homes 100. The relationship learning process 234 may not require real-time processing as it serves to continuously improve the fidelity of detection services 228 and relationships that link discovered devices 304 to personas 306 and their collective relationship to a home 100. A persona may have identifying attributes tracked by this system such as a name, phone number, relationship to the home, email address and other information used to positively identify, contact and categorize the persona's relationship to the home as defined by the user.

Figure 2B:
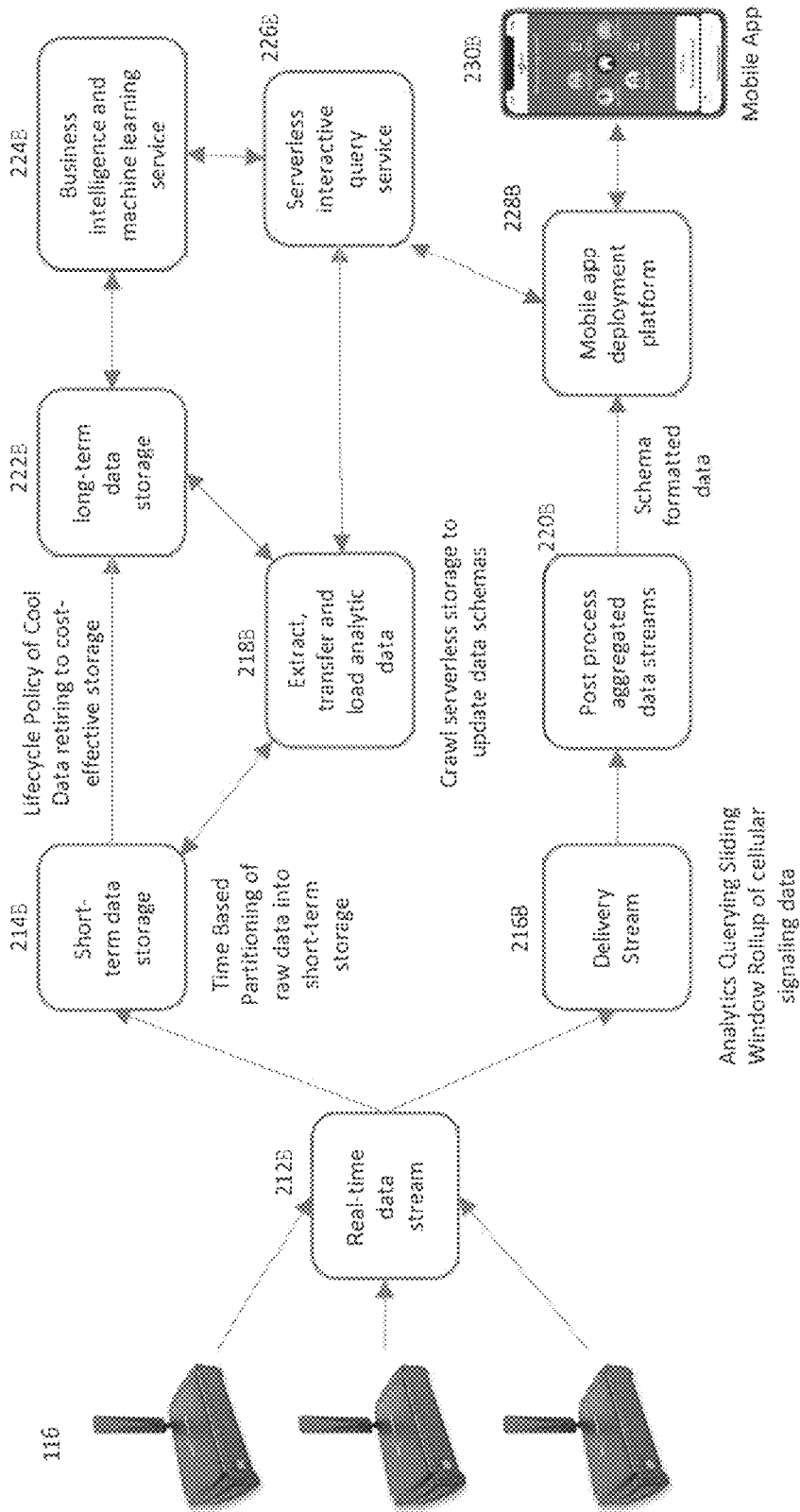
FIG. 2B illustrates an example of the cloud services and workflows supported by the system according to some embodiments of the disclosed technology.

FIG. 2B illustrates a cloud infrastructure and associated components and services according to a representative embodiment. The system can include a cloud infrastructure to support data operations that receive information from sensors, perform analytics and drive user interaction. The primary source of data can be from sensors 116. A real-time data stream 212B may receive messages from sensors 116 and may aggregate them into data streams. These data streams can be partitioned into time-based sessions and placed in short term storage 214B for future access. A delivery stream service may use a sliding time window to roll-up the signaling data 216B in real-time. This delivery stream can be formatted in a way that can be queried in real-time by analytic services within the cloud 216B. The real-time signaling streams are aggregated and then processed into specialized schemas 220B so that they can be consumed by the mobile application platform 228B. The mobile app deployment platform 228B may parse data based upon specific schemas and then present it to a mobile app 230B for user consumption. In some embodiments, the data delivery stream 212B, post processing 220B and mobile app platform 228B services work together to provide real time processed data to the mobile application 230B.

In addition to real-time services, the cloud infrastructure may provide advanced analytic services that do not require real-time processing. These functions may include geofencing, signal data correlation and other services. Short term data storage 214B can be used for fast access to data. Short term data services are more responsive but have a higher cost. Given the large amount of data processed by this embodiment, long-term data storage 222B may also be used to reduce costs for data that requires lower access times. A process monitors the activity of all data and will dynamically move data from short 214B to long 222B term storage as needed 218B. This service may also update data schemas as needed 218B.

Analytic services such as business intelligence and machine learning (AI) are deployed as needed to process specific types of data 224B. Functions such as dynamic geofencing may require AI to constantly improve the accuracy of home geofence boundaries over time. Signaling data correlation may require advanced analytic services to accurately identify and track devices based on sensor data 116. These functions are largely carried out by a series of analytic services in the cloud 224B and accessed using a serverless query service 2268.

Data Structures

Figure 3A:
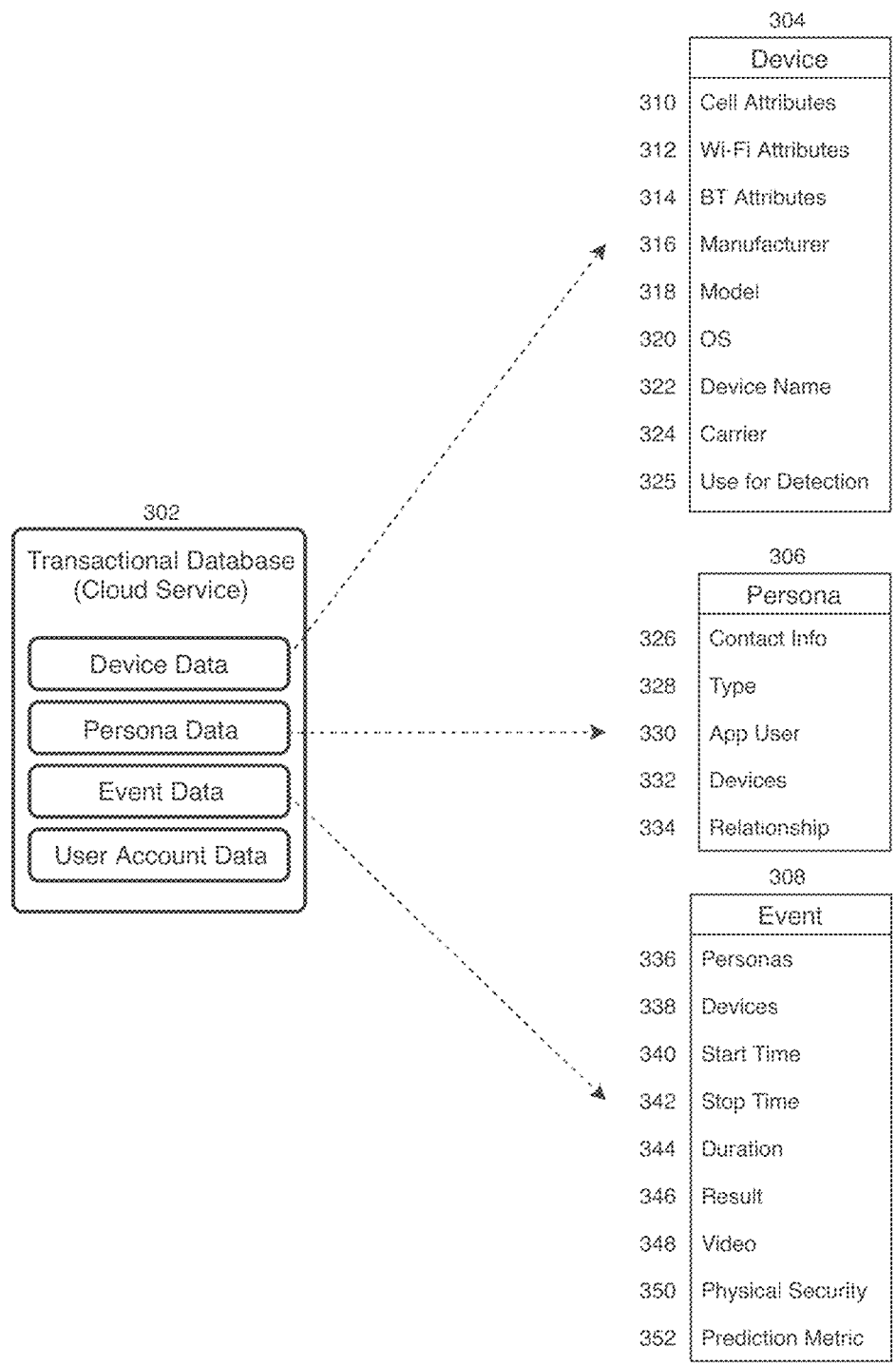
FIG. 3A illustrates an example of the primary data structures comprising the transactional data model employed by various embodiments of the disclosed technology.

FIG. 3A illustrates an example transactional data structure configuration according to various embodiments. The transactional database 302 can be configured to provide ultra-low latency access to data consumed by the mobile and web applications 120, 118 and provided by the sensor 116 and underlying services 228, 226. The data structures managed by the transactional database 302 that enable real-time services within the system are device data structures 304, persona data 306, and event data 308.

The transactional database top level data structure 302 can be configured with dedicated instances for each registered home 100 protected by the system. In some embodiments, a distinct instance of FIG. 3A component 302 can be configured to store data for a single protected home 100. The protected home data structure 302 and its corresponding data substructures can be updated with the results of the analytic and learning services 234 stored in the relationship graph database 232. These updates may serve to continuously improve the fidelity of device 304, persona 306 and event 308 data structure attributes.

In some embodiments, the system provides an innovative method of monitoring people via their respective devices 112, 114, within a home 100. The foundation of this monitoring can be directly tied to the ability of the system to learn relationships between devices 112, 114, via their respective device data structure 304, people, via their respective personas 306, homes 100 and events 308 that may occur within a particular home 100. The transactional database 302 can store a static version of these relationships and is continuously updated when changes occur within the relationship graph database 232.

The device data structure 304 may contain a record for each unique device 112, 114 detected by a sensor 116 of the system. Device data 304 can be the result of exploitative detection of one or more wireless interfaces 216, 218, 220 on that particular device. Alternatively, device detection can be the result of cooperative detection as previously described 222. Furthermore, the device data structure 304 attributes can be continuously updated over time. Updates to the attributes of a device data structure 304 can be the result of AI and analytic services 234. As an example, the cell attributes 310 may contain learned details of the cellular interface unique to that device. Similarly, Wi-Fi 312 and Bluetooth attributes 314 may contain learned details of these respective device interfaces. The disclosed system can leverage the continuous discovery of interface attributes 310, 312, 314 and by inclusion the host device to provide real-time detection of such devices 112, 114 within a home 100.

The device data structure 304 may contain attribute fields that uniquely characterize a distinct device 112, 114. The device manufacturer 316 can be among the easiest to discover as it is encoded in the MAC address associated with Bluetooth and Wi-Fi interfaces. Similarly, the carrier attribute 324 is relatively simple to discover as it is advertised frequently. Other device attributes such as the device name 322, Operating System (OS) 320, and the device model 318 may require more advanced methods to discover. The ability to discover attributes through analytics and learning are described more fully below. Aspects of the systems and methods described herein are directed to the process of identifying these attributes and leveraging the comprehensive characterization of a device 112, 114, to provide automated and high-fidelity home security monitoring. The results of device characterization are stored in the device data structure 304 and represented by the underlying fields 310-324.

The use for detection attribute 325 within the device data structure 304 can be used to indicate if a particular data structure 304 of a device 112, 114, should represent a persona's 306 presence in the home 100. The use for detection attribute 325 can be a Boolean value and can be set as a result of learned device behavior. For example, some devices may reliably be co-located with a persona 306 at all times, other devices can be sporadically co-located with a persona 306. The ability to monitor the presence of a persona 306 may directly rely on the ability to determine if the detected device 112, 114 is in the persona's possession when they leave or enter the home 100. Methods for leveraging the results of persona behavior learning and associated devices 112, 114, for the purposes of setting the use for detection 325 value is described herein. A persona 306 can be associated with one or more devices, such as devices 112, 114, or other associated devices contained in attribute 332, for example. A single device 112, 114, 332 currently containing a positive value in the use for detection field 325 will indicate the presence of that persona 306.

The persona data structure 306 can contain contact information 326, type 328, and app user 330 attributes. The persona data structure 306 can also contain a relationship attribute 334, which can be used to indicate the current status of that particular persona 306 to the home 100. The relationship field 334 can be used to trigger event 308 creation and corresponding notifications to the user 122 (FIG. 1) through the mobile or web application 120, 118. Additionally, different relationships 334 may correspond to schedules indicating specific dates or days of the week and times when a particular persona 306 is welcome in the home 100.

The following is an example set of relationships, schedule and event triggers:

Family
  Always allowed
    No event created
Friend
  Always allowed
    No event created
  Schedule allowed
    Event created outside of schedule
Visitor
  Always allowed No event created
Schedule allowed
Event created outside of schedule
Service Provider
Always allowed
No event created
Schedule allowed
Event created outside of schedule
Not Welcome
Never allowed
Always creates event An event 308 may also be created when an unknown device is detected within the home 100. The detection of a new device can be the result of the detection of an underlying wireless interface 310, 312, 314 not currently associated with an existing device data structure 304. In this case, the system may create a new device data structure 304 and associate the detected interface 310, 312, 314. A new persona 306 may also be created at this time. This persona 306 is a unique type, which can be associated with the new event 308 until such a time when the user 122 choses to assign this device using attribute 332 to a different persona 306. Alternatively, the user 122 may choose to report the event 308, in which case the device and associated data structure 304 may remain associated with the unique intruder persona 306.

Similar to devices data structure 304 and personas 306, event objects 308 can be continuously updated as more relevant data is discovered or learned by analytic and AI services 234. The event data structure 308 contains attributes 336-350 that characterize a distinct event 308. These attributes may include but are not limited to the personas 336 involved in the event, event timing 340, 342, 344, status of external security systems 350 and video footage links 348. The aggregation of these event attributes allows the system to provide important details of the event 308 culminating in the possible reporting of the event to law enforcement 128. The current status or result of the event 346 is stored and this value can be used to identify events indicating an actual intrusion for the purposes of informing future intrusion events.

Figure 3B:
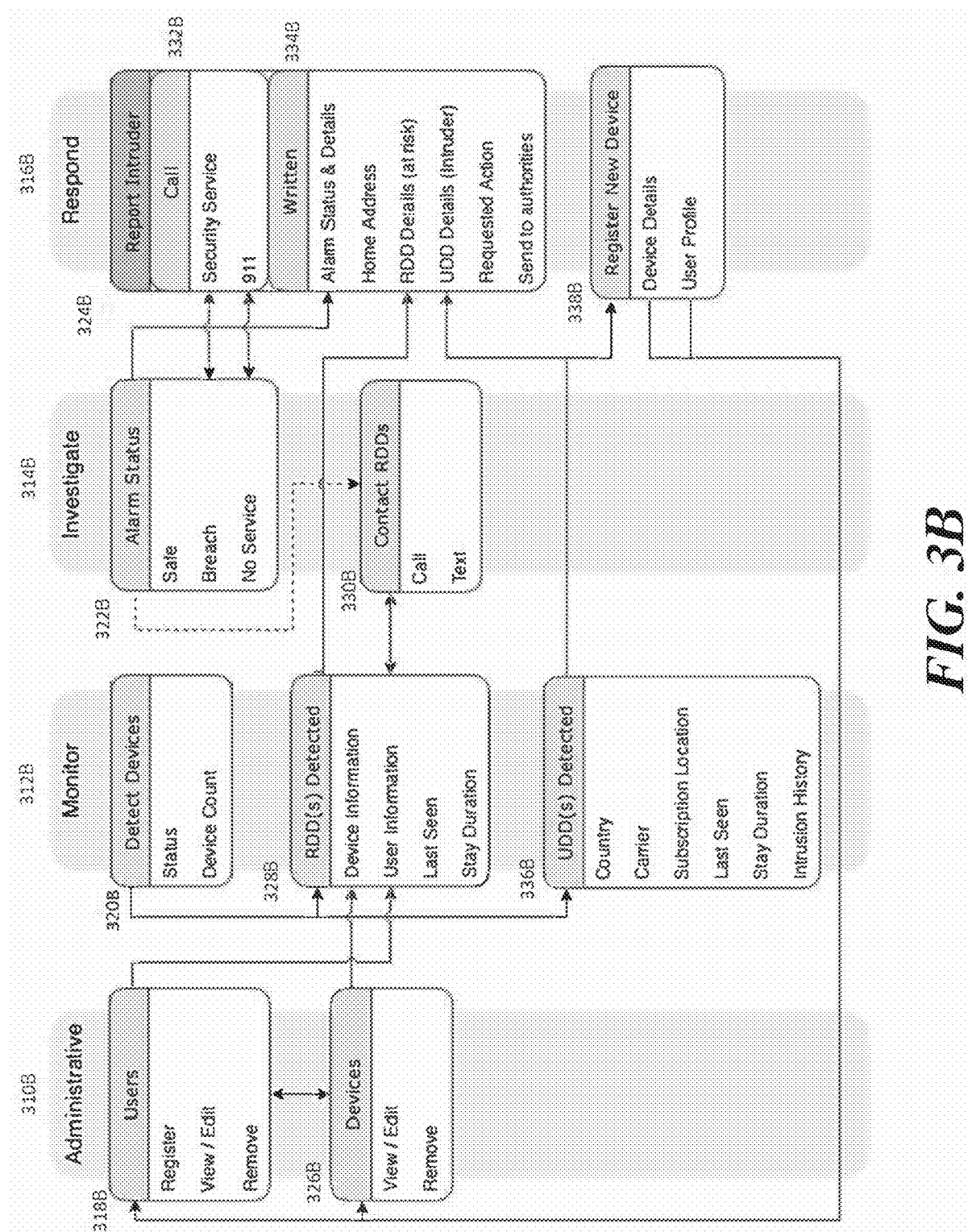
FIG. 3B details example data structures and relationships supported by the system according to some embodiments of the disclosed technology.

FIG. 3B illustrates an example transactional data structure configuration according to another representative embodiment. In this embodiment, the data structures can be categorized as follows: Administrative 310B, Monitor 312B, Investigate 314B, and Respond 316B. The administrative data structures 310B may provide profiles for unique devices and users of the system. The monitor 312B data structures may allow for devices that enter a home to be detected, categorized and tracked for presentation to the user. The investigate data structures 314B may provide information to the user for the purposes of determining if a device 112, 114 is indicative of an intrusion. The respond data structures 3168 may allow the user to take action once they have determined if a device 112, 114 belongs to an intruder or trusted person.

User profiles 3188 may contain information pertaining to a unique user of the system. These profiles may contain information that help identify the user of a particular device 112, 114. Key information may include information such as name, phone number, resident status (visitor or homeowner), photo and account information. This information can be used throughout the system to provide context as to an individual's activity within the home. Device profiles 326B may contain information specific to a unique device 112, 114. Such information may include device name, make, model, subscriber identifier, and carrier subscription which may allow the system to display meaningful data to the user.

As part of the monitoring service provided by the system, several data structures 3128 can be used to keep track of the devices 112, 114 that are active within the home or building. The devices 112, 114 are detected and tracked 320B as they enter the home. The status of each device 112, 114 and total number of active devices 112, 114 can be stored and presented to the user as part of a continuous monitoring service. When a device 112, 114 is detected in the home, the device profile 3168 can be used to determine if it is an Unregistered Detected Devices (UDD) 336B or Registered Detected Devices (RDD) 328B. If a device profile is found matching the signaling data of the detected device 112, 114, it can be categorized as a RDD 328B. The user can be presented with an icon of the RDD and profile details 3168 of the device 112, 114 and associated user profiles 3188. If the device 112, 114 does not have an associated profile 326B, it can be categorized as UDD. In this case the user can be presented with device information derived from the signaling data alone 336B. When any device 112, 114 is detected (RDD or UDD) the time the device 112, 114 entered the home, the last time the device 112, 114 was detected, and the duration of the current stay can be tracked within the RDD 328B and UDD 336B data structures, respectively.

The system provides timely information to the user allowing them to investigate 3148 the disposition of a UDD. The system is capable of interfacing with third-party security services. These services provide traditional home intrusion detection through contact, motion and glass break sensors. They typically have an optional monitoring service that detects and responds to traditional security breaches. The third-party alarm status can be tracked 322B as it provides additional context to the user. The presence of a traditional alarm breach that coincides with a UDD increases the chances that an intruder is in the home. If a trusted person is in the home simultaneously with a UDD the system provides a direct call and text capability allowing the user to contact any registered device 328B active in the home 330B. This allows the user to gain additional information from someone who can be witnessing a break-in or intrusion while they are home. It also provides information to the user and authorities if a resident is in danger because they are at home with an intruder.

This embodiment provides several ways the user can respond to the detection of a UDD and possible home intrusion 3168, 324B. The user can also register a new device 338B in the case that a UDD is safe but has not been previously seen in the home by the system. The reporting capabilities may include a voice call 332B and written report 334B. Voice calls can be automated by the mobile application and allow the user to directly report 332B an intrusion to a third-party security service and/or law enforcement directly. The voice call serves to accelerate the response to a possible intrusion. Written reports 334B may also be automated. These reports may contain a complete forensic description of the entire intrusion event including alarm status, home address, details of trusted people in the home, details of the UDD(s) in the home, exact time and duration of the intrusion and what action should be taken (334B). This written report 334B can also be used by authorities to subpoena the identity of the intruder as part of the ensuing investigation. In some embodiments, mobile wireless device and cellular subscription details can be automatically documented and transmitted to authorities for the purpose of investigating a home break-in.

When a UDD type of device 112, 114 belongs to a person trusted to be in the home, the user can be directed to register that device 112, 114 and the owner 338B. An example workflow is provided to capture the signaling details of that device 336B and automatically create a device profile 326B. The user can then create a user profile 318B, which will provide context the next time that person (and their device 112, 114) is detected 320B in the home. When the newly registered device 338B, 326B is detected in the home, it can be presented as an RDD 328B and the user will not be alerted to a possible intrusion 320B.

Operational Processes

The following sections provide example detailed descriptions of the various processes that can be used by the system. These sections include the following representative embodiments: a high-level digital monitoring process (FIG. 4A), an alternative digital monitoring process (FIG. 4B), an event and awareness monitoring process (FIG. 5A), a device identification and data analytics process (FIG. 5B), an intrusion prediction process (FIG. 6), an event assessment process (FIG. 7), and an event reporting process (FIG. 8), and a persona update process (FIG. 8).

High-Level Digital Monitoring Process

Figure 4A:
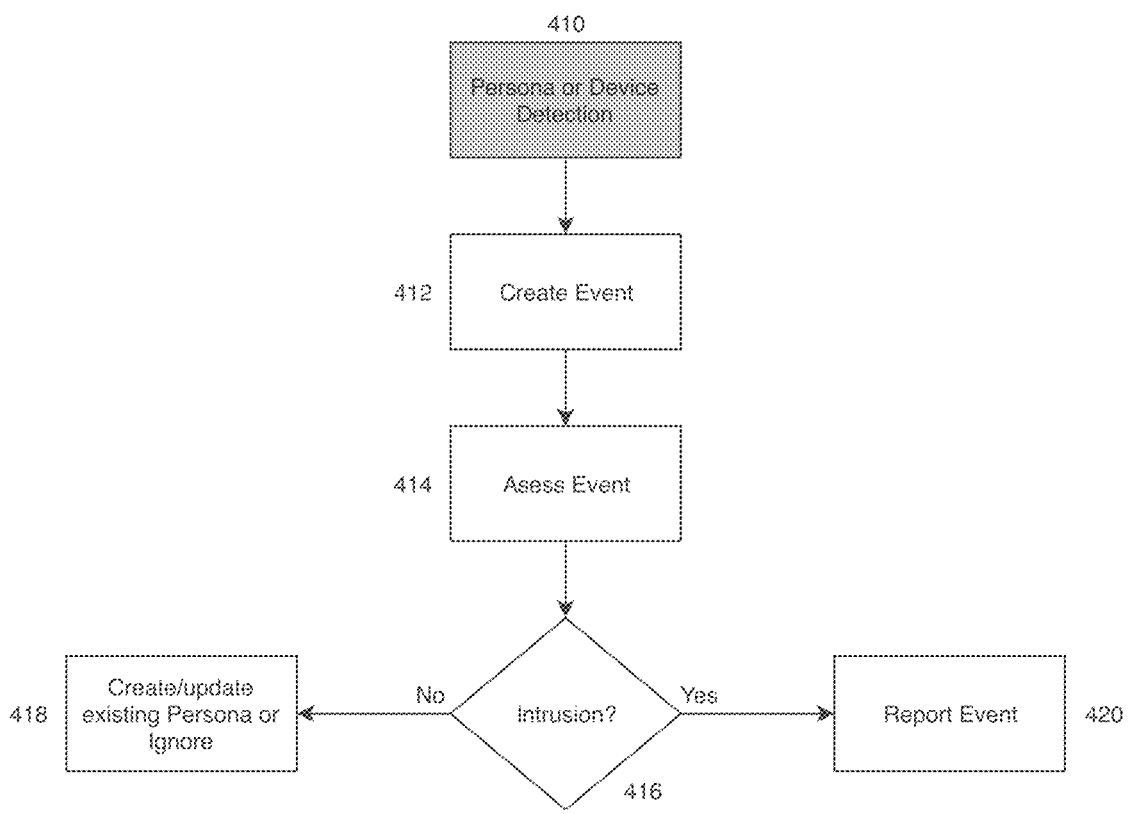
FIG. 4A depicts an example of a high-level digital monitoring process supported by various embodiments of the disclosed technology.

The system's operation can be described by the process as illustrated in FIG. 4A and such a process may correspond to a workflow supported by the mobile and web applications 120, 118. The process entry point 410 is the detection of an unwelcome persona 306 or an unknown device 304. If either of these occur, a new event 308 can be created at step 412. When a new event 308 is created a corresponding notification can be sent to the user 122. The user 122 may assess the details of that event 308 in step 414 to determine if the event 308 is a home intrusion in decision block 416. If the user determines the event 308 is an intrusion in decision block 416 the user 122 and/or system may report the event at step 420. Alternatively, the user 122 may determine the event 308 is not an intrusion in decision block 416. If the event 308 was triggered by an unknown device 304, the user 122 may choose, at step 418, to create a new persona 306 and associate it to the new device 304. If the event 308 was triggered by an unwelcome persona 306, the user 122 and/or system may choose to update the relationship of the persona 334 or simply ignore the event 308.

Figure 4B:
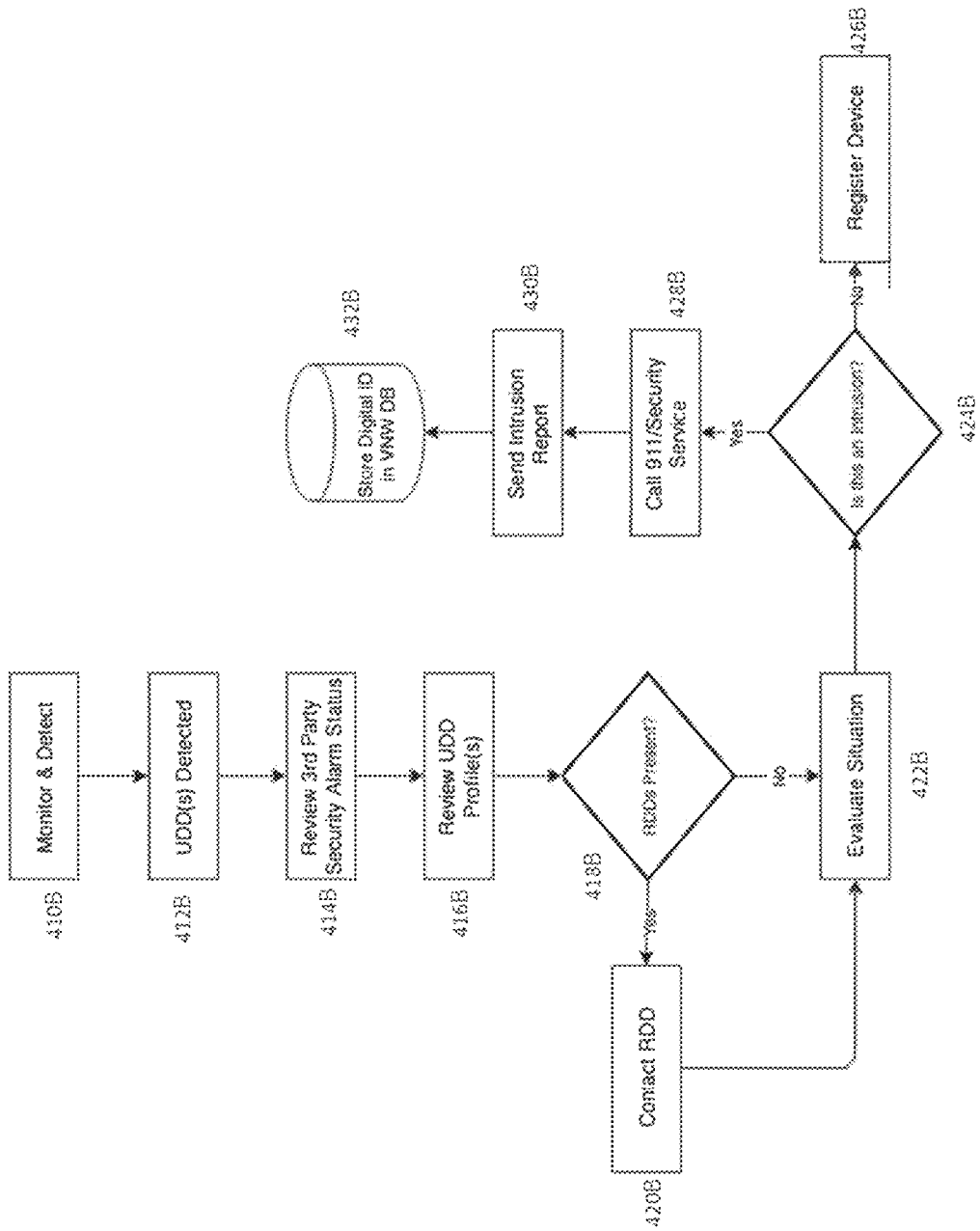
FIG. 4B details an example of a primary use case of the system according to some embodiments of the disclosed technology.

FIG. 4B provides a flow diagram of an example use case of the systems and methods described herein according to another embodiment. The use case described here is generally related to the cloud infrastructure of FIG. 2B and the data structures described above with respect to FIG. 3B. The systems and methods can be used to monitor a home and detect unregistered mobile or electronic devices, such as wireless devices 112, 114. Undetected wireless devices 112, 114 are either registered or the homeowner can be prompted to report an intrusion via the app 230B (FIG. 2B) running on their electronic device 112, 114. The detection service 228 continuously runs to detect wireless devices 112, 114 within a home or any other building in step 410B. When a device 112, 114, such as a UDD is detected by the system, it verifies that the device 112, 114 has been registered and is trusted. The presence of a UDD can indicate a possible intrusion.

When the user is prompted with a UDD in step 412B they use the mobile app 230B to determine if the UDD is identified as an intruder or authorized visitor. In some embodiments, the user can check the status of any third-party security alarms in step 414B to see if the UDD is associated with an alarm breach event. The profile details of the UDD are provided to the user in step 416B so they can review them and determine if the electronic devices 112, 114 are recognized but unregistered. The system also provides the user with all electronic devices 112, 114 that are RDD currently active in the home in decision block 418B. This can serve two functions: a local trusted point of contact and indication that a trusted person in the home may be in danger. The system may provide an automated call and SMS feature directly to any trusted device 112, 114 within the home 100 at step 420B. In this manner, voice calls and texts can be automated to RDD for the purposes of collecting situational awareness and threat levels associated with a home intrusion.

The user can be provided with information that may include security alarm status, UDD details, and information from people that are in the home at the time of a possible intrusion. From here the user can effectively evaluate the situation in step 422B and determine if there is an intrusion in decision block 424B. From here the system may provide two options: register the devices 112, 114 that are UDD at step 426B or report an intrusion at step 428B. If the user determines the UDD belongs to a trusted person with authorization to be in the home, they can register that device 112, 114 in step 426B. Registering the device 112, 114 ensures that if this person visits again, they system will not provide an alert and categorize their wireless devices 112, 114 as trusted. If the UDD is not recognized, the user can choose to report an intrusion at steps 428B, 430B. The system can automate the emergency call to both law enforcement and security monitoring service (if applicable). While the call is being placed the system may also generate an emergency report. This report can be sent via text or email to law enforcement and the security service (if applicable). Once the call and report are completed the user can submit the UDD details to a Virtual Neighborhood Watch (VNW) cloud 432B. This will provide details of the intruder in the case they attempt future break-ins in this home, or any home protected by this system. The VNW cloud 432B may also collect and process data in a manner that allows interconnected data sharing between communities. When digital IDs (e.g., TMSI see FIG. 5B) are detected that have been associated with any home invasion events, they'll be shared throughout the cloud network. Thus, in the event the Digital ID is detected in any community that is protected by this system, the VNW cloud 432B can proactively alert the community users to be conscious of home security.

Event and Awareness Monitoring Process

Figure 5A:
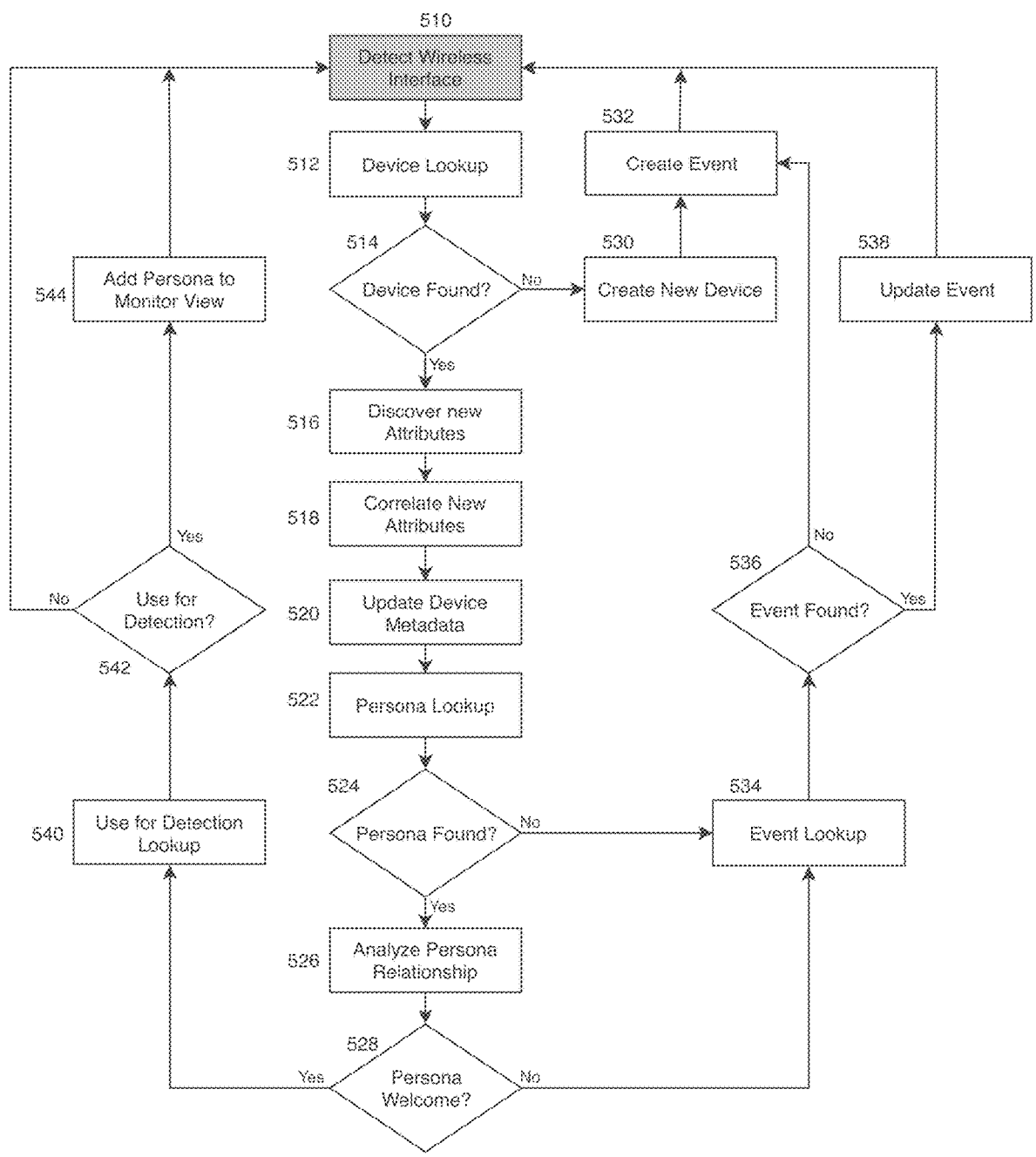
FIG. 5A depicts an example of a real-time monitoring process for events and awareness supported by various embodiments of the disclosed technology.

FIG. 5A provides an example event detection process that can be implemented by the system for an event driven monitoring architecture. The event detection process can be initiated by the detection of a wireless interface 510, 216-222. When a wireless interface is detected by the sensor 116, the system performs a lookup function at step 512 on the device table 304 (data structure) within the transactional database 302 using one or more attributes of the detected interface 310-314. If a matching device data structure 304 is not found at step 514, the system may create a new device data structure 304 at step 530 and an event 308 (e.g., unknown device event) at step 532 as the unknown device detection is a trigger for a possible intrusion.

If a matching device data structure 304, for the electronic device 112, 114 is found at step 514, the system initiates a process to discover new attributes of the detected interface or associated device 112, 114 at step 516. If new attributes are discovered at step 516, the system initiates a process to correlate those attributes with previous characterization of the interface or device at step 518. In some embodiments, this correlation can include analytic analysis of all available attributes collectively. Additionally, the correlation process at 518 may provide inputs into AI and learning services. If the correlation process at step 518 results in changes to the relationship graph, the system may refresh the transactional database 302. Subsequently, the metadata (attributes) of any associated data structure can be updated within the transactional database at step 520. Given that the correlation process 518 is enabled by a real-time streaming service, it can be pipelined within a process such as the one illustrated in FIG. 5A.

Following the completion of updates to the metadata model at step 520, the system may perform a lookup function at step 522 on the persona table 306 within the transactional database 302 using one or more attributes associated with the identified device. If an existing persona is not found at step 524, the system performs a lookup on the event table at step 534 to see if there is current and active event in the system. If an active event exists at step 536, the system may update that event at step 538. If an active event does not exist at step 536, the system may create a new event (e.g., unknown persona event) at step 532.

If the persona lookup at step 522 finds an existing persona at step 524, the system initiates a process to analyze that persona at step 526 and the associated relationship to the home 100 (contained in relationship attribute 334). The relationship value, as previously described, may indicate if the persona is currently welcome in the home 100 based upon the corresponding relationship category and schedule configured by the user. In the case where the persona is currently not welcome in the home at step 528, the system may perform a lookup on the event table at step 534 to see if there is an active event in the system. If an active event exists at step 536, the system may update that event at step 538. If an active event does not exist at step 536, the system may create a new event at step 532 (e.g., unwelcome persona event).

In the case where the persona is currently welcome in the home at step 528, the system initiates a device lookup at step 540 to determine if one or more devices associated with the persona are currently flagged for detection 304. If the device lookup at step 540 returns one or more devices associated with the persona at step 542, the system may add the persona to the monitoring view presented by the mobile or web applications at step 544. In the case where the device lookup 540 does not find a device flagged for detection at step 542, the system will ignore the detection and restart the process at step 510.

Figure 5B:
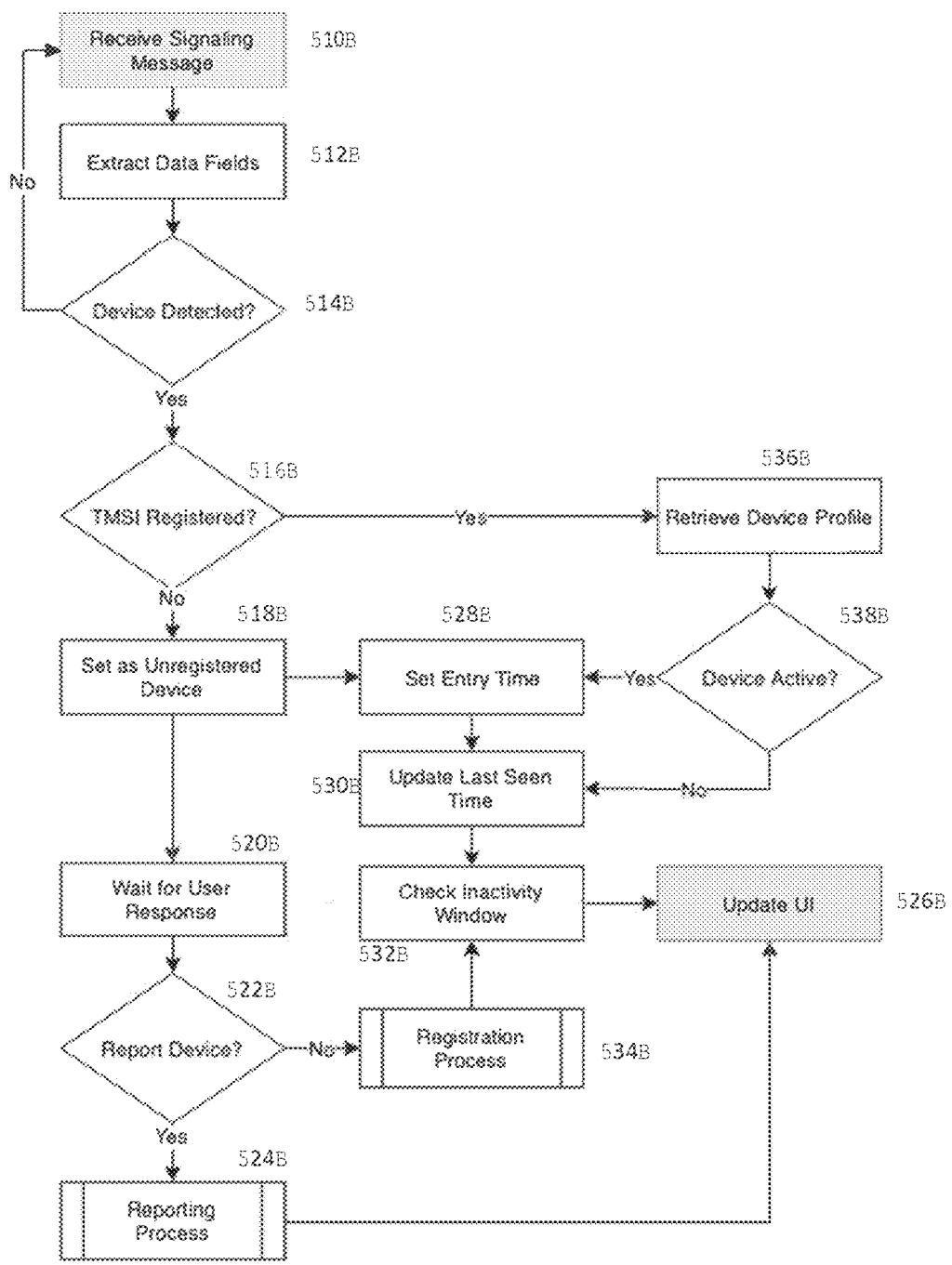
FIG. 5B is a system level process flow diagram of an example method of an electronic device identification and data analytics powered home security system according to some embodiments of the disclosed technology.

FIG. 5B is a flow diagram illustrating a device identification and data analytics process according to another embodiment. The device identification and data analytics process described here is generally related to the cloud infrastructure of FIG. 2B, the data structures described above with respect to FIG. 3B and the use case described above with respect to FIG. 4B. Captured wireless signaling data can be provided by sensors 116. Wireless signaling data is decoded on a session by session basis. Sessions are generally isolated to a single wireless device, such as a wireless device 112, 114. The sensors 116 may encapsulate select decoded fields into a message set with a one-to-one relationship with the cellular signaling session. This is an important aspect as session identification and the underlying data fields can be attributed to a single detected wireless device 112, 114.

The cloud infrastructure receives the proprietary encoded messages in step 510B. The data fields are extracted for processing and downstream activities in step 512B. In general, if a message is received in step 510B it is indicative of a detected device in decision block 514B. Despite this condition, a decision point in the process (block 514B) can be included to cover that case where messages are malformed or for future functionally that will leverage this message stream for in-band system configuration or other services. In the case where a message is received in step 510B, and the data fields do not indicate a detected device in decision block 514B, the message can be dropped, and the system may wait for the next message to be received in step 510B. In further embodiments, this process can be extended with parallel processing for purposes previously described.

The example embodiment of the process depicted in FIG. 5B relies on the Temporary Mobile Subscriber Identity (TMSI) field within the cellular signaling. The TMSI can be used as an identifier for a mobile wireless device. The system may perform a lookup in the registered device database using the TMSI as a key in step 516B. If the device 112, 114 has been previously registered the system may go through a series of steps to update the device status and the UI. The next several paragraphs describe an example process for updating the device status.

TMSIs can be transmitted with a predictable regularity, which allows for reliable, near real-time detection of a mobile wireless device 112, 114. The timing of TMSI transmissions may also be used within this system to detect when devices 112, 114 enter 528B and leave 530B the area.

The TMSI can be used as a keep-alive for the system to continuously check to see if the device 112, 114 is still active. At this stage in the process, the system has determined that the device 112, 114 has been previously registered. This means that the user has approved this device 112, 114 as a result of a previous detection. As part of this approval process the user may complete a series of steps to establish a profile for that device 112, 114, such as by an associated device profile in step 536B. A device profile may contain pertinent information which may include a plain language name and activity details. From this profile the system can determine the time the device 112, 114 entered a geofenced area of a building that a sensor array is monitoring and the last time the device 112, 114 was detected by the system in order to calculate if the device 112, 114 has exceeded the inactivity window at step 532B.

If the device 112, 114 is not currently active in decision block 538B, the system may set the entry time using the current system time of step 528B. This state may occur when a device 112, 114 was previously detected and registered but has exceeded the inactivity window and was removed from the UI monitoring view in step 526B. If the device 112, 114 is currently active in step 538B, the system may update the last seen timer in step 532B. From there the system may reset the inactivity counter in step 532B, since the device 112, 114 was just seen.

In some embodiments, the inactivity counter is a mechanism used by the system to remove inactive devices 112, 114 from the UI monitoring view without having to go through the complete operational process depicted in FIG. 5B. The inactivity timer of step 532B can be a subprocess that may comprise a counter and trigger. The counter can start at the value configured in the inactivity window setting. It may count down to zero at which time it may signal the system to remove the associated device 112, 114 from the UI monitoring view 526B.

The past several paragraphs detailed an example process for updating the status of a previously registered device 112, 114, which can be interpreted as the normal operating mode for the system. The following several paragraphs will describe example system operations in the event a device 112, 114 is detected but has not been previously registered at steps 516B, 518B.

In some embodiments, when a device 112, 114 has been detected but not registered, the user can be guided through a series of steps to determine if the device 112, 114 belongs to an intruder or someone who is authorized to be there. If the TMSI lookup in the registration database is null at step 518B, the device 112, 114 can be flagged, and an unregistered device profile can be created. This profile can be similar to the registered device profile; however, it may contain information derived from the device's TMSI which may assist the user in determining if the unregistered device 112, 114 belongs to an intruder.

At this point in the process, the user has been presented with details regarding the device 112, 114 that is a UDD in steps 518B, 526B. If the user verifies at steps 520B and 522B that the UDD is safe, they can choose to register that device 112, 114 in step 534B. This will ensure the device 112, 114 does not suggest a future breach. If the device 112, 114 is determined to belong to an intruder, the user and/or the system can report the breach to the proper authorities 524B and/or other entity. The reporting process 524B may automate voice calls to law enforcement and/or a third-party security service. A report can also be sent to the security service and text-to-law enforcement. This report may contain granular details that include information recorded by the system of the entire crime event. This may include property address details, time of break-in, trusted people in the home during the breach, perpetrator's digital ID and other intrusions that were discovered or detected by the VNW cloud service 432B, and/or any other information.

Intrusion Prediction Process

Figure 6:
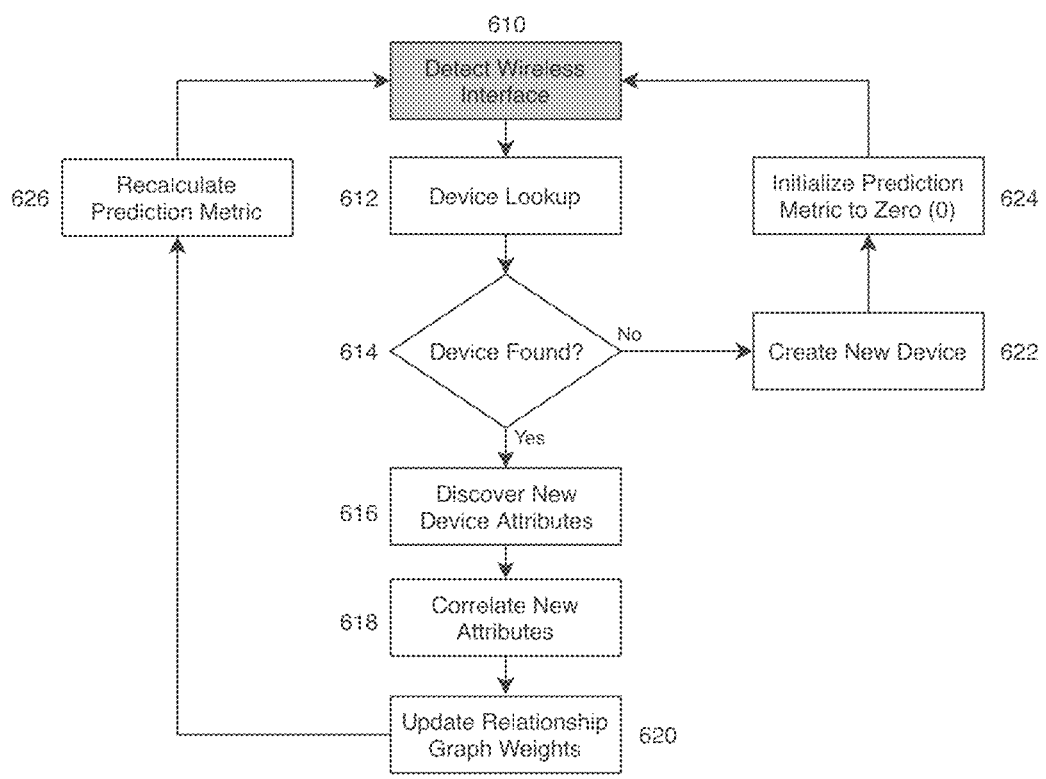
FIG. 6 depicts an example of an intrusion prediction process to calculate metrics for quantifying the likelihood that a particular event is a reportable intrusion according to some embodiments of the disclosed technology.

FIG. 6 provides an illustration of an example intrusion detection process that can be implemented by the system. The process illustrated in FIG. 6 is an extension of the event and awareness process illustrated in FIG. 5 and has been provided to highlight processes specific to the intrusion detection service.

The example process illustrated in FIG. 6 can be initiated by the detection of a wireless interface 610, 216-222. When a wireless interface is detected by the sensor 116, the system may perform a lookup function at step 612 on the device table 304 within the transactional database 302 using one or more attributes of the detected interface 310-314. If a matching device is not found at step 614, the system may create a new device at step 622. The event table 308 maintains a prediction metric 352, which serves to provide the user with the quantifiable probability that a particular event is a valid intrusion. In some embodiments, this metric is presented to the user as a percentage where 100% is the highest probability the event is an intrusion. When a new device is created the system may initialize the prediction metric and set the value to zero (0) at step 624.

If a matching device data structure 304, for the electronic device 112, 114 is found at step 614, the system initiates a process to discover new attributes at step 616 of the detected interface or associated device. If new attributes are discovered at step 616, the system may initiate a process to correlate those attributes, at step 618, with previous characterization of the interface or device. This correlation may result in changes to the relationship graph. These changes may include adjustments to the weighted edges of nodes within the relationship graph. Relationship graphs are described more fully below with respect to FIGS. 32A-34B. Subsequently, the metadata of any associated data structure within the transactional database can be updated at step 620. When a change in the relationship between one or more nodes occurs, the system may recalculate the intrusion prediction metric at step 626.

Event Assessment Process

Figure 7:
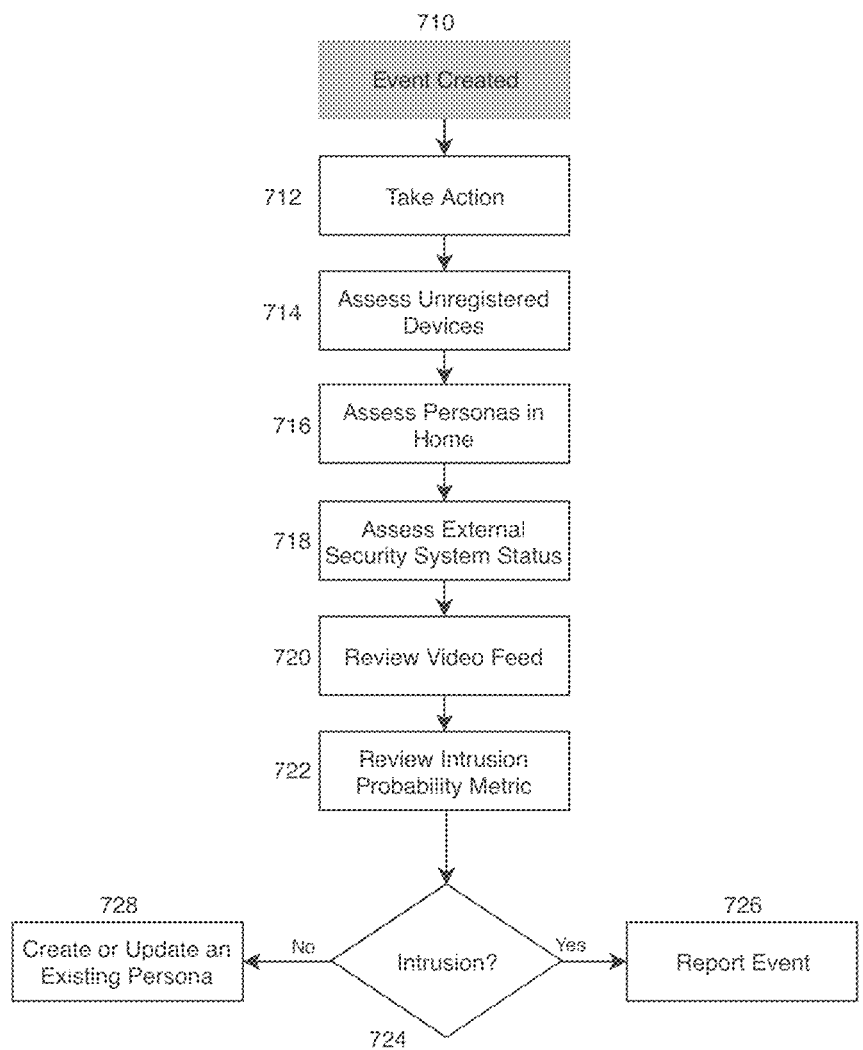
FIG. 7 depicts an example of an event assessment process provided to the user to inform the decision to report a potential intrusion event according to some embodiments of the disclosed technology.
Figure 8:
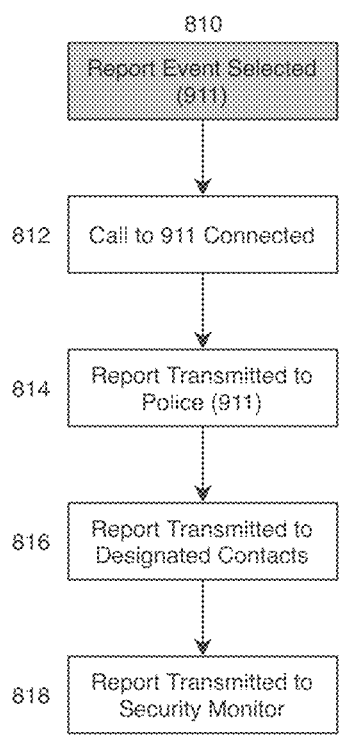
FIG. 8 depicts an example of an event reporting process executed when the user determines an event is an intrusion and elects to report the event according to some embodiments of the disclosed technology.

The process illustrated in FIG. 7 represents a representative method for accurate and reliable event assessment, which informs the user's decision to report such an event. The event assessment process can be initiated when the system creates a new event at step 710. The system may initiate a process that guides the user through the process of assessing the event at step 712. This process corresponds with a view in the mobile 120 and web 118 applications which includes real-time information associated with the event. The system may present all unregistered devices and the pertinent attributes at step 714 enabling the user 122 to determine if the devices 112, 114, in question are recognized. The system may present all personas 306 currently detected in the home at step 716 enabling the user 122 to contact people present in the home 100 to further assess the event. The system may present the status of a third party security system at step 718 enabling the user 122 to associate a physical home breach with an unrecognized device 112, 114, or unwelcome persona 306. The system may present video feeds at step 720 clipped to the timeframe corresponding to the event enabling the user 122 to visually identify a possible intrusion. The system may present the intrusion probability metric at step 722 informing the user 122 of the likelihood this particular event is indicative of a valid intrusion. The system may prompt the user 122 at step 724 with the option to initiate an intrusion report at step 726, create a new persona 306, update an existing persona 306 at step 728 or ignore the event entirely.

Event Reporting Process

FIG. 8 provides an illustration of an example event reporting process. The event reporting process can be initiated when the user 122 selects the option to report an event at step 810. When an event is reported a series of communication actions can be taken by the system. The intent of these actions can be to automate the dissemination of a digital written version of the intrusion report and connect the user to local law enforcement emergency response (911). The system may automatically initiate a call to law enforcement (911) at step 812. Emergency response services (911) can be localized and the origination of this call service can be tied to the current location of the user 122 reporting the event. In some cases, the user 122 can be located in a different district or coverage area than the protected home 100. In some embodiments, the system may or may not be configured to contact 911 call services; however, it may directly rely on the ability to originate a 911 call to the protected home 100. The system may choose to initiate calls to a direct emergency number for a particular location rather than 911. Alternatively, several technologies are available to enable call origination and include but are not limited to Voice over IP (VoIP), in-home auto dialing and other services and products. These products can be integrated with the system to originate the call from the protected home address rather than the location of the user 122 at the time of reporting. A one-click calling feature using a non-interconnected VoIP service can be integrated with this system and enabled by the mobile application. Alternatively, this system may signal an auto-dialing product installed within the protected home to initiate 911 calls. Other methods of originating 911 calls may also be employed in various embodiments.

In some embodiments, the system may automatically transmit the event report to law enforcement (911) at step 814. Most municipalities provide a digital emergency reporting service such as text-to-911. The system will discover the appropriate method of transmitting a digital report to law enforcement and automatically execute the transmission. The report can be transmitted with the protected home as the originating source to ensure that the report is transmitted to the appropriate 911 call center. The system may automatically transmit the event report to people designated by the system account owner or delegates at step 816. If an external security monitoring service is employed, the system may transmit the event report to the security monitoring service at step 818.

The system may support a monitoring center web application 126. This web application 126 may provide a dashboard and management capability to external monitoring services. This capability aggregates the status of all monitored systems and may provide alerts in the case of an intrusion event. The system can be configured to provide information about an intrusion through the web application 126. The information provided to external monitoring entities can be similar to the information presented to the user 122 through the mobile application. In the event a user 122 does not receive a notification or is unable to use the mobile application to initiate an intrusion report, the monitoring center web application 126 may enable a third party 110 to act on the user's behalf to initiate a report or establish a relationship with a known persona.

Persona Update Process

Figure 9:
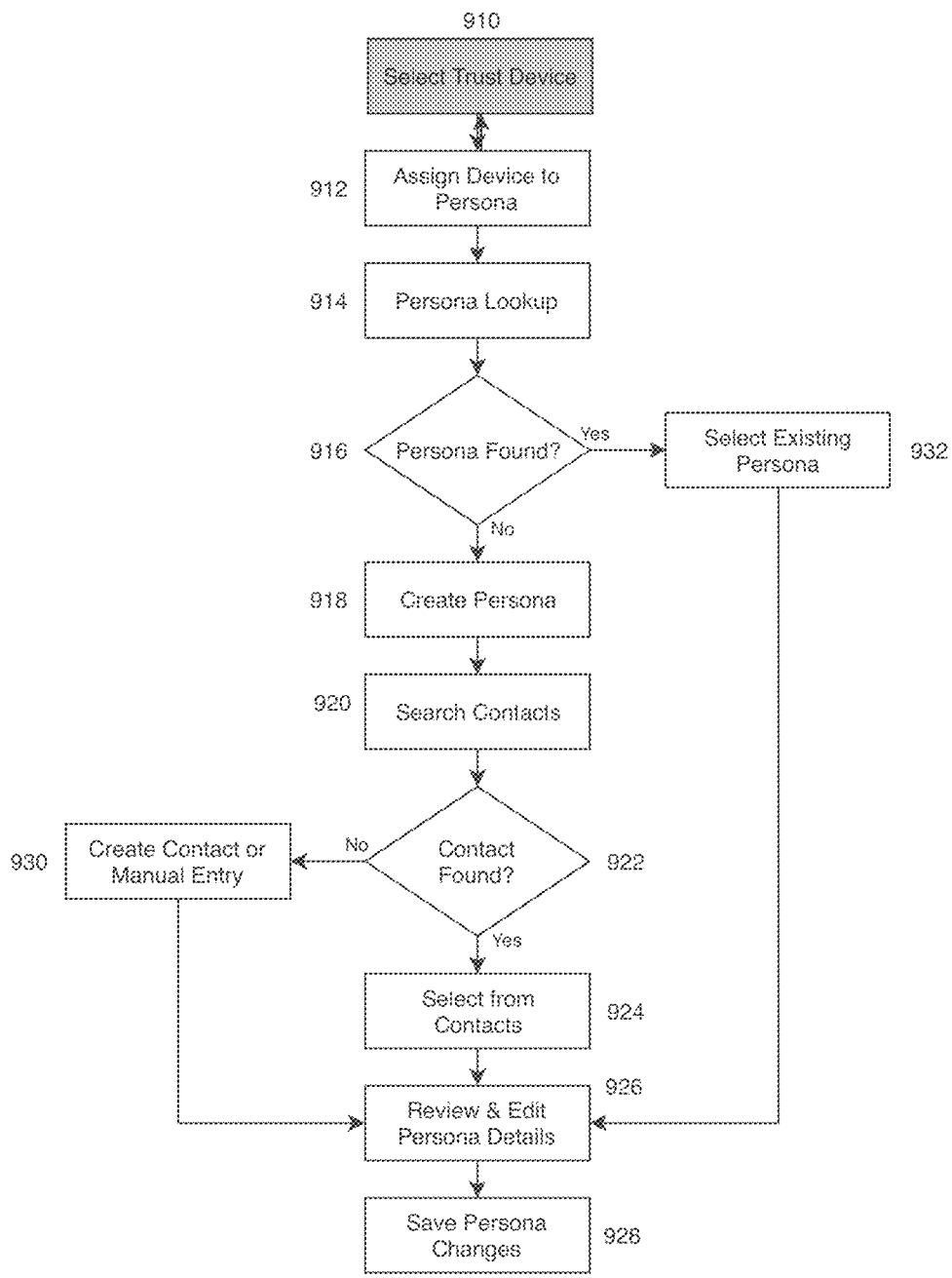
FIG. 9 depicts an example of a process to establish a relationship between one or more detected devices and a persona according to some embodiments of the disclosed technology.

FIG. 9 provides an illustration of an example persona update process for updating persona attributes to improve real-time monitoring, event creation and awareness services provided by the system. The persona update process can be initiated when the user 122 selects to trust a device at step 910. Trusting a device 112, 114, can include assigning that device 112, 114, to a persona 306 in step 912. The system may perform a lookup function at step 914 on the persona table within the transactional database 302 using one or more attributes of the detected device. If a matching persona 306 is found at step 916, the system may present the user 122 with an option to select the existing persona at step 932 for device assignment. If a matching persona is not found at step 916, the system may prompt the user 122 to create a new persona at step 918. To expedite the creation of a new persona, the system may allow the user 122 to search the contacts at step 920 stored on their wireless device or other contact location. If the contact is found at step 922 the user 122 may select the existing contact at step 924. Alternatively, if the contact is not found at step 922, the system may prompt the user 122 to create a new contact or manually enter the new persona information at step 930. In some embodiments the system can suggest who (e.g., from contacts list) should be mapped to a detected device. In some embodiments, the system can automatically generate a new persona when enough information is available to make a match via contact information, related devices, etc. In this case, the user is prompted to confirm the automatically generated persona is valid.

Following the selection of an existing persona at step 932, contact assignment at step 924, or the creation of a new contact at step 930, the system can prompt the user 122 to review the persona details at step 926. The user may also be provided a view to edit the persona details at step 926. When the persona changes are deemed accurate by the user, the system can save all changes at step 928.

An awareness score can also be provided to the user, which encourages the user to map and update personas. The awareness score can be calculated based on number of devices mapped and the richness of each persona profile. For example, in some embodiments, the awareness score can be calculated by summing the number of mapped devices. In some embodiments, the awareness score can be calculated by summing the number of completed persona attributes for all of the mapped devices.

Web Applications

This embodiment may employ a variety of User Interfaces (UI) 118, 120, 126 to enable multiple types of users 122, 110 to interact with the system. The primary user of this system can be a homeowner or other entity 122 trusted by the account holder of the system. A secondary user of this system can be a trusted agent 110, who may provide professional monitoring services on behalf of the user. The views rendered by UIs can be different depending on the role of the system user 110, 122. Examples of distinct UIs include a web application 118 and monitoring service web application 126.

The primary UI for the users 122 can be the mobile application 120. For users who do not have access to the mobile application 120, a web application 118 may provide an alternative method of interacting with the system. Such a web application may provide similar features as the mobile application 126 as previously described in this embodiment.

The professional monitoring service web application 126 may provide views and workflows enabling a third party 110 to serve as a surrogate for the primary user 122. Conventional security monitoring services are typically provided through a staff of dedicated professionals trained to perform manual assessment and verification of possible intrusion events. These professionals may also attempt to provide details of a particular intrusion to law enforcement 128. Assessing a potential intrusion manually based on minimal binary input from conventional security systems may result in a low fidelity service and lead to a high rate of false alarms. The technology disclosed herein can provide systems and methods enabling third-party monitoring professionals 110 to provide higher fidelity service to a user. Additionally, the system may reduce the costs of third-party monitoring services by limiting the scope of duties performed by professionals employed in a monitoring center. A web application 126 and associated views can be provided to enable the system to perform centralized monitoring functions 110. Such views may include but are not limited to global monitoring of all or a subset of protected homes 100, aggregated notifications and drill-down from global monitoring to individual event assessment and reporting views.

Mobile Applications

The following sections provide detailed descriptions of various mobile application views which can be provided to the user 122 by the system. These sections include the following: Real-time monitoring (FIGS. 10 and 11), Event assessment (FIG. 12), Event Reporting (FIGS. 13 and 14), and Persona Management (FIGS. 15-18, respectively. In addition, alternative mobile app views according to another representative embodiment are depicted in FIGS. 19-23. The mobile application provides a platform independent user interface that can be accessible on most modern smartphones and tablets. In some embodiments, the mobile application 120 can be used as the primary user interface for the system. It can provide real-time status of who is in the home at any given time. In the event that a UDD enters the home the mobile app may use native notification frameworks to alert the user of suspicious activity. Other alert methods such as sounds, vibrations, texts and emails are also provided.

Real-Time Monitoring

Figure 10:
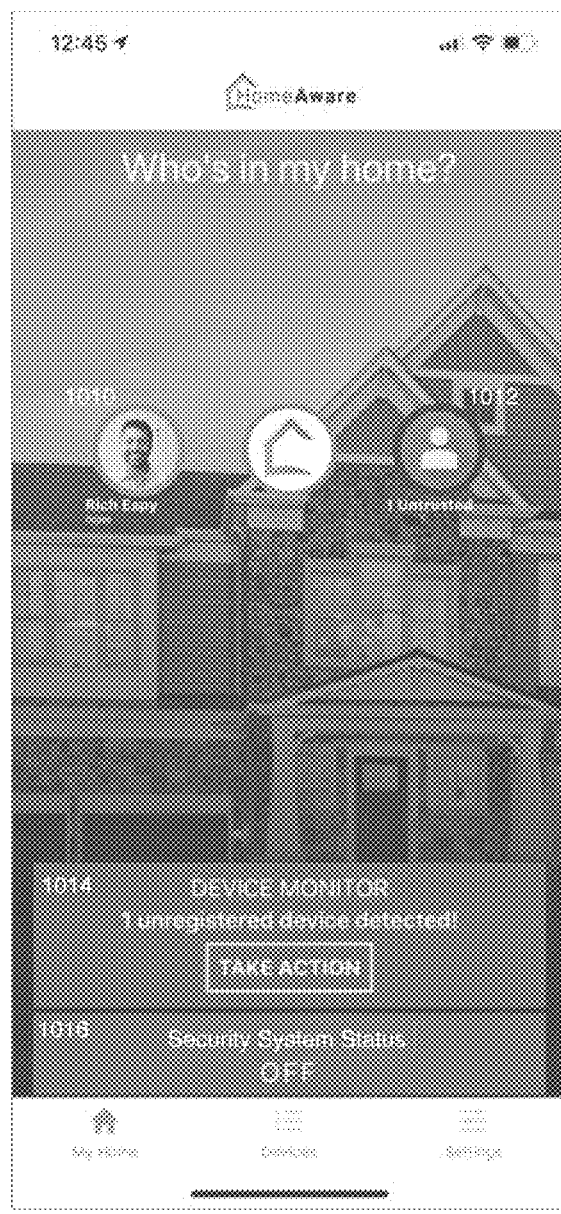
FIG. 10 illustrates a screenshot of an example of the monitoring view provided by the mobile application according to some embodiments of the disclosed technology.

FIG. 10 provides an example of a real-time monitoring view that can be rendered on the mobile application 120. The monitoring view can be the default view for the user's interaction with the system. A real-time monitoring view, as shown, can be provided to the user that may visualize all personas 1010, 1012 currently present in the home. The visualization of personas within the monitoring view may serve to provide the user 122 with awareness of activity within the home 100. In the event an unregistered device is detected within the home 100, an event will be created, and an untrusted persona can be dynamically created and rendered in the monitoring view. The user 122 can be presented with an alert 1014 and prompted to take action. The "Take Action" button in alert 1014 rendered in the monitoring view can serve as a link to the Event Assessment view discussed below with respect to FIG. 12.

FIG. 10 depicts the rendering of two distinct personas 1010, 1012 of different statuses. The persona 1010 can depict a persona that is known by the system and has been configured with at least a minimum set of persona attributes. The user may select the icon 1010 corresponding to a configured persona to contact one or more people represented by that persona. In the case a persona represents a single person, a call, text message, etc. can be initiated to the electronic device 112, 114, of that individual. In the case a persona represents a group of people (one or more), a call or text message can be initiated to one, many or all of the electronic device 112, 114, of the people associated with the persona. In the case an unknown device was detected, the corresponding dynamically generated persona 1012 may not have contact information configured. In this case it may not be possible to contact the new persona or underlying person or people.

Personas rendered within the monitoring view can be labeled with a basic set of information that can be useful to the user 1010, 1012. Such information may include but is not limited to persona name, time the persona was last seen in the home, relationship category, relationship status and a graphical image of a person associated with the persona. Persona icon 1010 labeling may include but not limited to dynamic text, color coding, icons, animation and sound. The system may provide an accessibly framework allowing users 122 with certain disabilities to effectively use the system. Examples features of the accessibility framework may include but are not limited to audible icon generation and labeling, animated icon labeling and generation, additional rendered text and audibly presented text.

Figure 11:
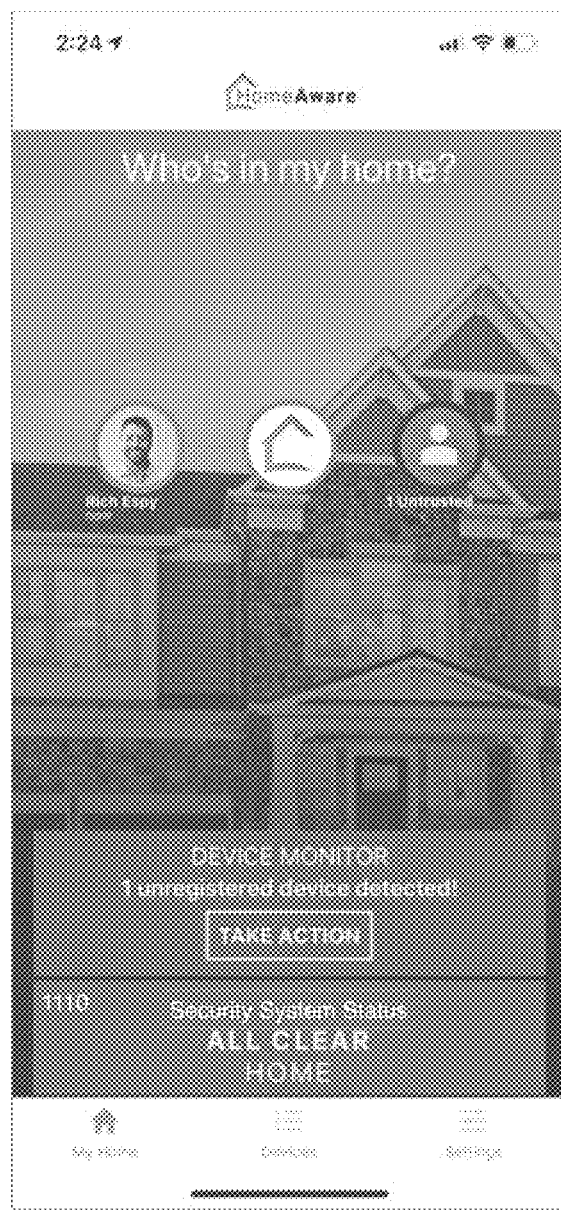
FIG. 11 illustrates a screenshot of an example of the monitoring view provided by the mobile application indicating the external security system status is armed and set to home according to some embodiments of the disclosed technology.

In some embodiments, the system may support the integration of external (third party) security systems. These systems may provide physical security monitoring through contact, motion and glass break sensors. The system may support the rendering of external security system status 1016 in the monitoring view. FIGS. 10 and 11 depict examples of visual rendering of external security system status. FIG. 10 depicts an external security system status where such a system is set to "OFF" 1016. FIG. 11 depicts an external security status where such a system is set to "HOME" 1110. Other external security system status labels may include but are not limited to "ARMED", "AWAY", "DISARMED", "ALARM" and "BREACH".

Other external security system status labels can be rendered by the system including but not limited to zones, individual sensor status and test modes. In some cases, the external security system may support compound status labels. Compound status labels are typically used for activity in particular zones or individual sensor status. Examples of external system compound labels that can be supported and rendered include but are not limited to: "Motion in Zone 1", "Front Door Open", "Bedroom Window 2 Open", "Bathroom Window 1 Broken", and others. The actual rendering of such labels can be directly dependent on the external security systems internal labeling methods. In some embodiments, labels retrieved through an external API can be mapped to standard label terms.

In some embodiments, the system may support control of the external security system. Such controls can be accessible to the user within the monitoring view. The extent of the functionality provided as it pertains to external security systems can be dependent upon the architecture of such external systems. Some external security systems expose an Application Program Interface (API), which may allow instances of this embodiment to reliably control such a system. Alternatively, some external security systems are configured to explicitly block integrations with other systems. External security systems that currently do not support integration or have End User License Agreement (EULA) clauses that prohibit such an integration may not be supported by the system.

Event Assessment

Figure 12:
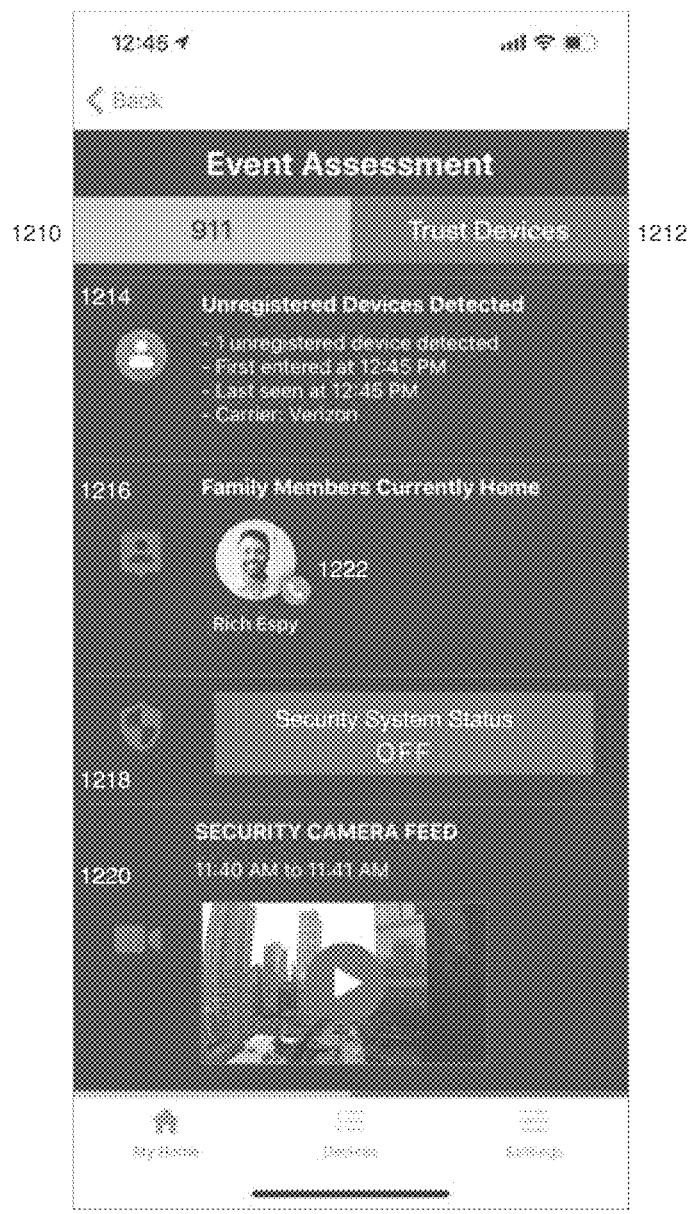
FIG. 12 illustrates a screenshot of an example of the event assessment view provided by the mobile application according to some embodiments of the disclosed technology.

FIG. 12 depicts an example event assessment view that can be rendered on the mobile application 120. The event assessment view enables the user 122 to quickly and reliably assess an event to inform follow-on actions. The event assessment view can serve as an integral function of the system. An event assessment view can be provided to the user 122 that allows the user to investigate the details of a distinct event 308. Events 308 are not static in nature as the details of a given event might change over time. In some embodiments, the system may implement a dynamic event assessment workflow and associated views. The event assessment view may provide real-time updates of event details. The real-time rendering of such details may allow the event assessment view to provide increasingly more accurate and current details. Events 308 presented to the user 122 may not be indicative of a valid intrusion. The primary purpose of the event view and associated workflow can be to enable the user 122 to better understand the details of activity within the home for the purposes of taking the appropriate action.

The event assessment view can be comprised of several sections 1214, 1216, 1218, 1220, each of which provides specific types of information to the user 122. The details pertaining to the detection of an unrecognized device 112, 114, or an unwelcome persona 306 can be rendered in a distinct section 1214. The system may collect a plethora of information pertaining to device and persona detection 1214; however, the assessment view may provide a distilled and concise version of these details. Examples of detection details 1214 may include but are not limited to: a count of unrecognized devices detected, a count of unwelcome personas detected, entry time, time last seen, persona details and device details. The details provided for detected unrecognized devices may include but are not limited to cellular carrier, device manufacturer and device type. The details provided for detected unwelcome personas may include but are not limited to persona name and persona picture. If an unwelcome persona is configured with contact information, the system may enable the user 122 to click on the persona icon to contact a person associated with the persona.

The details of welcome people currently in the home at the time of a particular event can be grouped into a distinct trusted section 1216. An example of welcome people currently in the home are family members 1216. Displaying welcome and thereby trusted personas informs the user of the present danger to people they care about. For example, if an intrusion event occurs and children are home, the user 122 will be informed of the added danger associated with the potential intrusion and may take more aggressive actions. The details for detected welcome personas can include but are not limited to persona name, persona picture, entry time and time last seen. Each welcome persona detected by the system can be rendered in a separate icon and the associated details can be specific to each detected persona. If an unwelcome persona is configured with contact information, the system may enable the user to click on the persona icon to contact a person associated with the persona 1222, for example. The system may also render a phone icon within the persona icon to inform the user if the persona is configured with contact information 1222. The ability to expedite contact with people in the home 100 during a potential intrusion may allow the user 120 to better assess the situation or warn such people they can be in danger.

The details and status of an integrated external security system can be grouped into a distinct section 1218. Details and status of an external security system can be updated in real-time and may inform the user of changes within the status reporting provided by such a system 1218. The details of an integrated external camera view 1220 can be grouped into a distinct section. Details included by this system pertaining to an external camera include, but are not limited to, the time frame for each rendered clip and video clips for one or multiple integrated cameras. Video footage for all integrated cameras can be dynamically clipped to a duration corresponding to the event duration. This feature may expedite the review of one or more camera feeds and exclude irrelevant camera footage occurring before or after the event. Each clip can include an in-app click-to-play feature which may allow the user to quickly preview the clip 1220 in the context of the entire assessment view FIG. 12. Alternatively, the system may provide the ability to render a full screen view of any clip, which may improve the experience while watching a clip. This full screen rendering may also provide full video review controls including but not limited to play, rewind, fast forward and pause.

The goal of the event assessment workflow and associated mobile app view FIG. 12, can be to take the appropriate action. The most typical actions can be to report the event with a button 1210 or to establish a trust relationship with one or more detected devices with button 1212. The process of establishing such a trust relationship was detailed above with respect to FIG. 9. In the event the outcome of an event assessment informs the user 122 that a detected persona was mislabeled as unwelcome, the system may allow the user 122 to directly update that persona ensuring future detections will not result in false notifications and event creation via button 1212. In the example provided by FIG. 12, the 911 button 1210 may initiate the reporting of this event. Conversely, the "Trust Devices" button 1212 can initiate the process of creating a new persona if necessary and mapping the detected devices to a persona respectively. The user may also choose to ignore the event completely; however, that is not a recommended course of action.

Event Reporting

Figure 13:
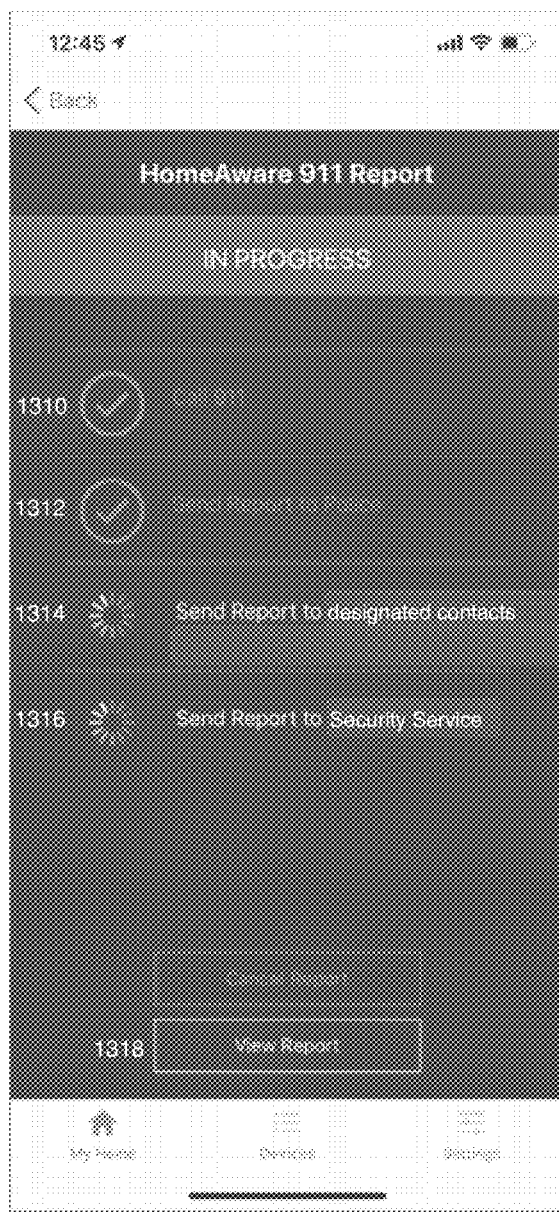
FIG. 13 illustrates a screenshot of an example of the event reporting progress view provided by the mobile application according to some embodiments of the disclosed technology.

FIG. 13 depicts an example event report progress view that can be rendered on the mobile application. The event report progress view may inform the user 122 of the progress and status of each phase of the reporting process. The primary purpose of the report progress view can be to inform the user 122 of progress made for transmitting reports to various entities. Additionally, the reporting progress view informs the user when report transmissions are complete. The reporting view may provide reinforcement to the user 122 that the reports have actually been transmitted and limit concerns that the reporting transmission feature provided by the system failed.

The report progress view can provide distinct progress indicators for each category of report recipient. Automated reports can be transmitted to authorities 1312 through supported digital emergency report service which may include but are not limited to text-to-911, local email addresses and others. In some embodiments, a dynamic report (e.g., webpage) can be linked in the text-to-911 message, for example. Automated reports can be transmitted to a list of designated trusted people 1314 configured by the user 122. Transmissions to trusted people may use a variety of delivery methods including but not limited to text, email and social media direct message. If an external security monitoring service is configured within the system, reports can be transmitted to a monitoring center, designated agent or other entity capable of receiving digital reports on behalf of the security monitoring service 110, 1316. Transmissions to external security monitoring services can be dependent upon the methods supported by that particular service.

In addition to the transmission of digital versions of an event report, the system can be configured to initiate a call to 911 (or other emergency response numbers) 1310. Emergency services, such as 911, route calls to a local emergency response or call center. The call routing is based on the current location of the phone initiating the call. In many cases the user 122 is not located in the same service area as the protected home. To ensure emergency calls are routed to the appropriate reporting entity for the location of the protected home, the system may use a direct call number for that location rather than 911. Alternatively the system may employ various technologies to manage call routing and origination as previously described. The report progress view depicted in FIG. 13 can provide status of event report transmissions. The user may exit this view at any time by selecting the "View Report" button 1318, which will render a mobile version of the report being transmitted.

Figure 14:
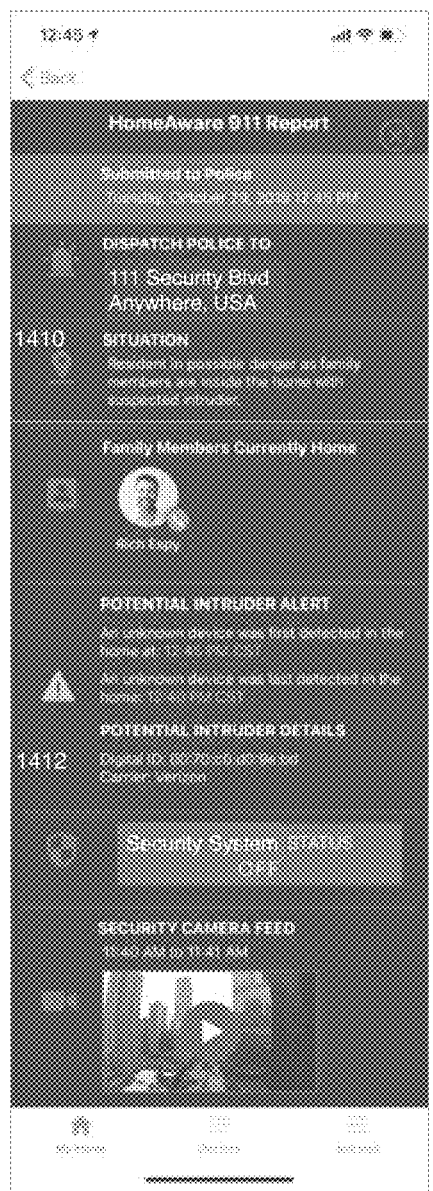
FIG. 14 illustrates a screenshot of an example of the event report provided by the mobile application according to some embodiments of the disclosed technology.

FIG. 14 depicts an example event report view that can be rendered on the mobile application 120. The report view enables the user 122 to review report details, such as a situation report 1410 and intruder details 1412. The report view can be updated in real-time; therefore, changes to the event details can be dynamically rendered. The report can evolve over the lifetime of the event providing greater depth and more accurate data. The real-time nature of the reporting can increase the effectiveness of home security monitoring by providing details to law enforcement, first responders and other entities involved in a response to an intrusion event. As law enforcement responds to an intrusion report, they can be armed with information such as status of intruder(s), status of trusted people in the home, pictures of trusted people in the home, contact information for trusted people in the home and focused video footage from installed cameras.

The reporting capability of the system can provide real-time, accurate and concise reports to law enforcement, designated contacts and external security monitoring services represent a new and innovative approach to high-fidelity home security monitoring.

Persona Management

Two of the benefits of the disclosed digital monitoring systems are to provide real-time awareness and intrusion detection within the protected home. Awareness services allow the user to monitor people via their electronic devices 112, 114, who enter and exit the home 100 in real-time. Awareness services are relevant to both authorized (trusted) and unauthorized (untrusted) people who are present. Intrusion detection services allow the user 122 to be notified of events and take appropriate action for unauthorized entry to the home 100. A core service of the system is detecting wireless devices 112, 114, present in a home 100; however, awareness and intrusion services are most effective when notifying the user 122 of people in the home rather than devices 112, 114. Additionally, notifications and other services provided as part of a monitoring and awareness can be far more effective when they take into account the relationship between people and the protected home.

FIGS. 15-18 provide a series of rendered views that enable a user 122 to effectively manage the relationship between detected devices, personas and the current relationship of those personas to the protected home. The views depicted in FIGS. 15-18 may enable the user 122 to assign a device 112, 114, to an existing or new persona 306 and update the details of a persona 306 within the system. The ability to manage devices, personas and corresponding relationship to the home using views rendered within the mobile application may serve as an integral function of the system.

Figure 15:
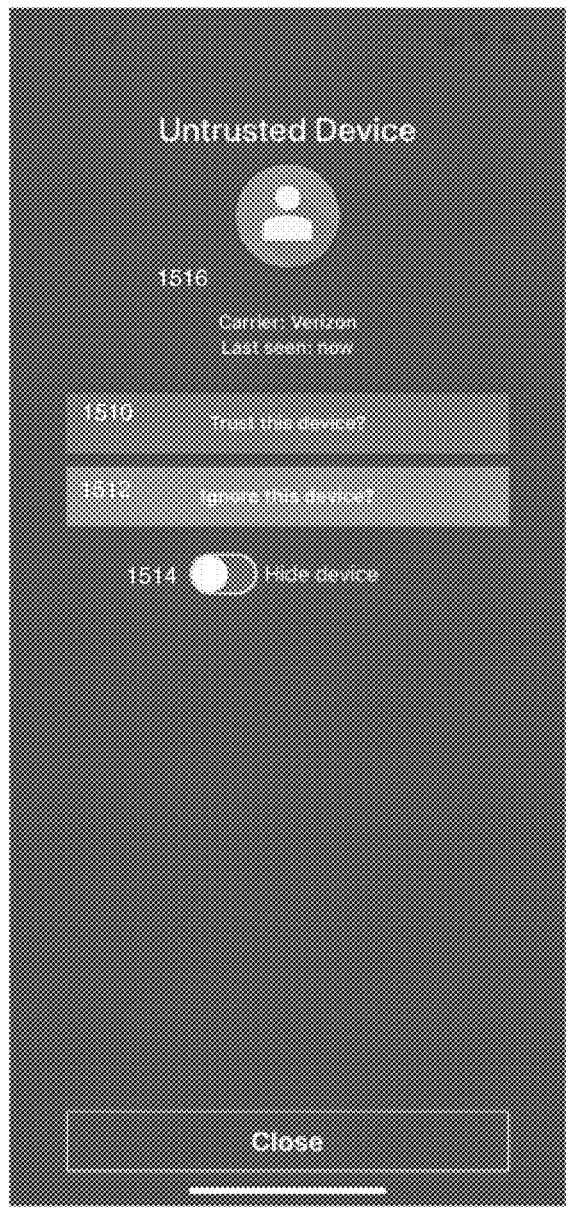
FIG. 15 illustrates a screenshot of an example of the untrusted device view presented by the mobile application according to some embodiments of the disclosed technology.

FIG. 15 provides an example view that may enable a user 122 to assign a device 112, 114, to one or more existing or new personas 306. The process of "trusting" or assigning a device 1510 can be initiated through the creation of a link and associated relationship between the device and one or more personas. The device assignment view may provide the user 122 with details and attributes of the device 1516 to aid in the decision to trust (assign) a particular device. Additionally, the device assignment view may provide the user 122 with details and attributes of an existing assigned persona 1516 to aid in the assignment of the detected device or updates to the persona in general. The user 122 may also choose to ignore a detected device; however, this may not be a recommended course of action. A detected device may also be "hidden" 1514, which may inform the system to not use this device for detection and rendering of the associated persona within the real-time monitoring view.

Figure 16:
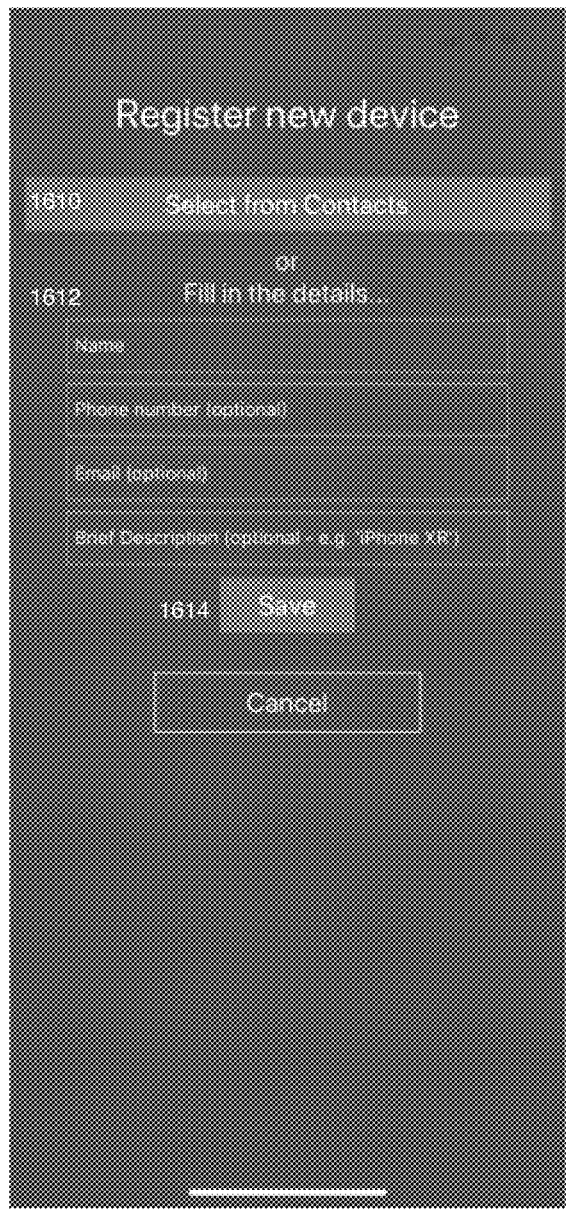
FIG. 16 illustrates a screenshot of an example of the device registration view presented by the mobile application according to some embodiments of the disclosed technology.

FIG. 16 provide an example view that may enable the user 122 to "register a new device" within the system. The process of registering a new device 112, 114 includes the assignment to an existing or new persona 306. The details of that persona can be provided from the user's contacts 1610 or by manually entering the details 1612. The device registration view may also be rendered to allow the user to update an existing persona's details by saving 1614 at any time.

Figure 17:
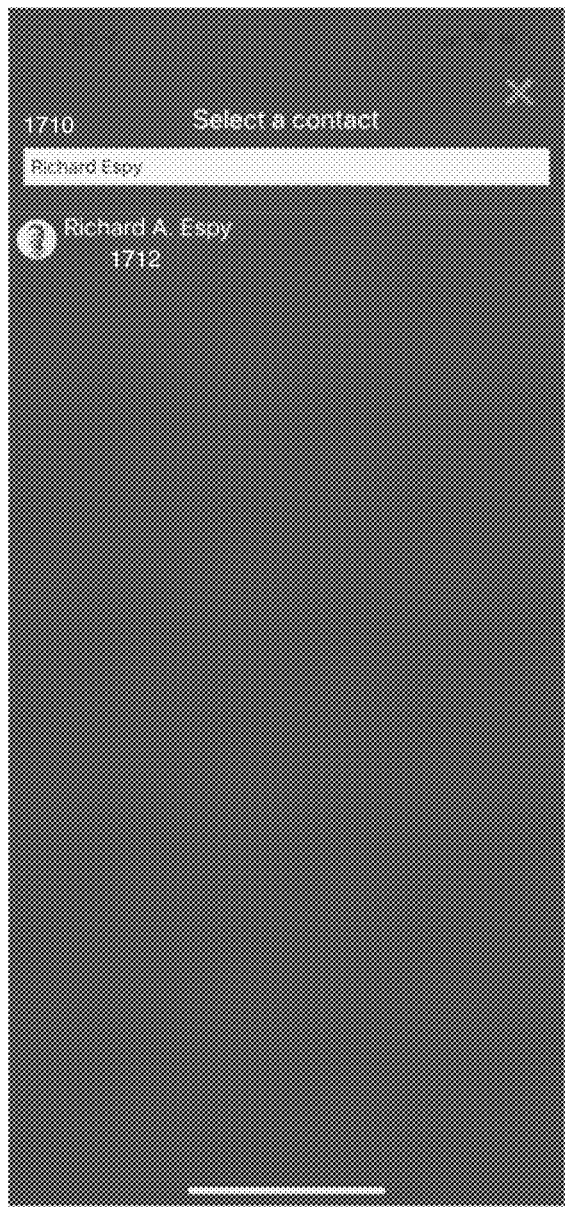
FIG. 17 illustrates a screenshot of an example of the contact selection view presented by the mobile application according to some embodiments of the disclosed technology.
Figure 18:
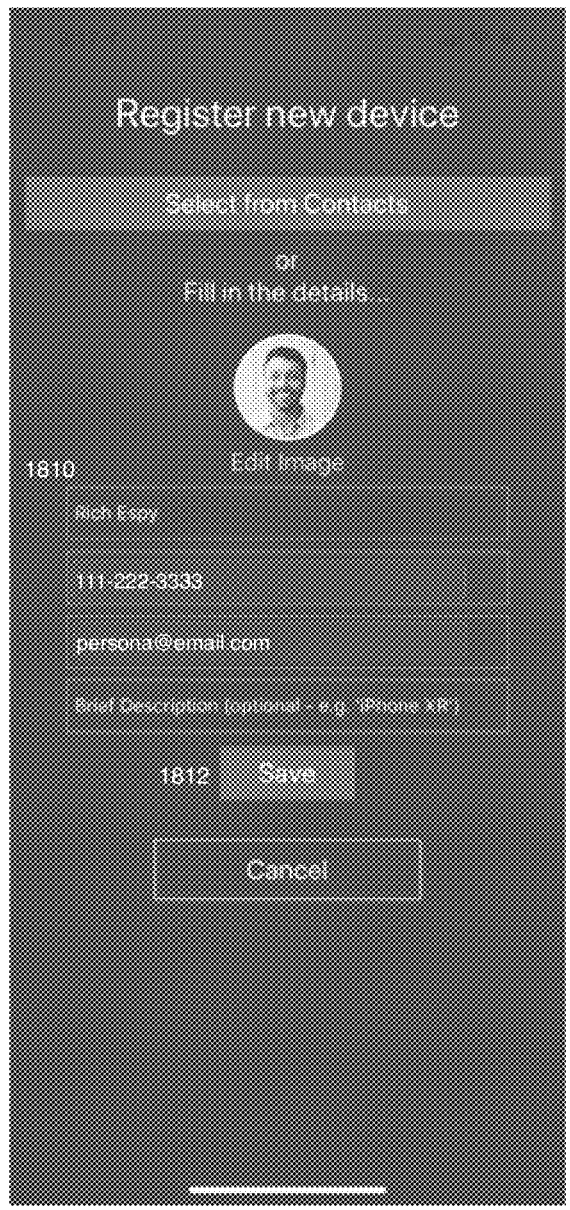
FIG. 18 illustrates a screenshot of an example of the edit persona view presented by the mobile application according to some embodiments of the disclosed technology.

FIG. 17 provides an example view and associated tool that may enable the search 1710 and selection of a user's contacts 1712 and may expedite the creation or update of a persona 306. This view can be rendered as a result of the user clicking "Select from Contacts" 1610 as shown in FIG. 16. Personas within the system can be dynamically updated from changes to the user's contact details. For example, if the user 122 updates the picture, phone number, email address or other details 1810 (see FIG. 18) of a contact in their mobile wireless device or other contact storage location, the persona may also be updated as a result. The privacy of individuals can be preserved by the redaction or omittance of any field in a user's contacts. FIG. 18 illustrates an example rendering of a persona following the selection of a contact. This view may also allow the user 122 to further update information 1810, 1812 provided by the contact or enter information that may not have been provided. After reviewing and updating the persona details the user 122 may select save to store the persona information within the system.

Alternative App Views

The alternative mobile app views depicted in FIGS. 19-23 are generally related to the cloud infrastructure of FIG. 2B, the data structures described above with respect to FIG. 3B, the use case described above with respect to FIG. 4B, and the device identification and data analytics process described above with respect to FIG. 5B.

Figure 19:
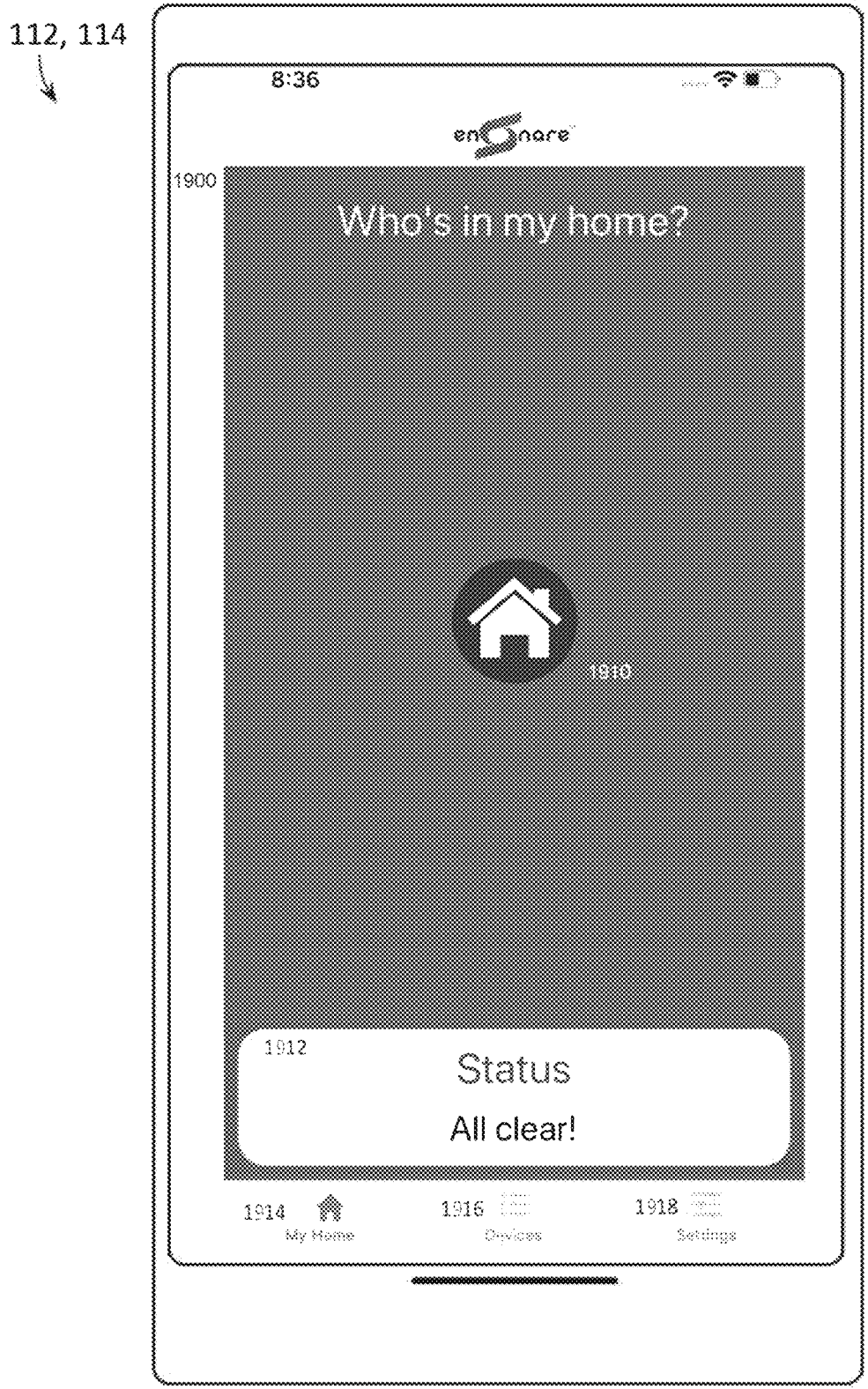
FIG. 19 depicts an example of a default mobile application view according to some embodiments of the disclosed technology.

FIG. 19 depicts an example of the main mobile app view 1900 in a state where there are no devices 112, 114 currently detected in the home 1912. The home icon in center view 1910 provides status of the sensor 116. In normal operation, the sensor 116 is active and connected to the cloud infrastructure via the internet 1910. If the sensor 116 is not active and detecting wireless signals, or it does not have an active internet connection, the center home icon 1910 may change colors and/or alert the user that the system is offline. When no devices 112, 114 are currently detected, the status may read "All Clear" 1912. The main view 1900, 2000 may also provide links to a list of registered devices 1916 and general settings 1918.

Figure 20:
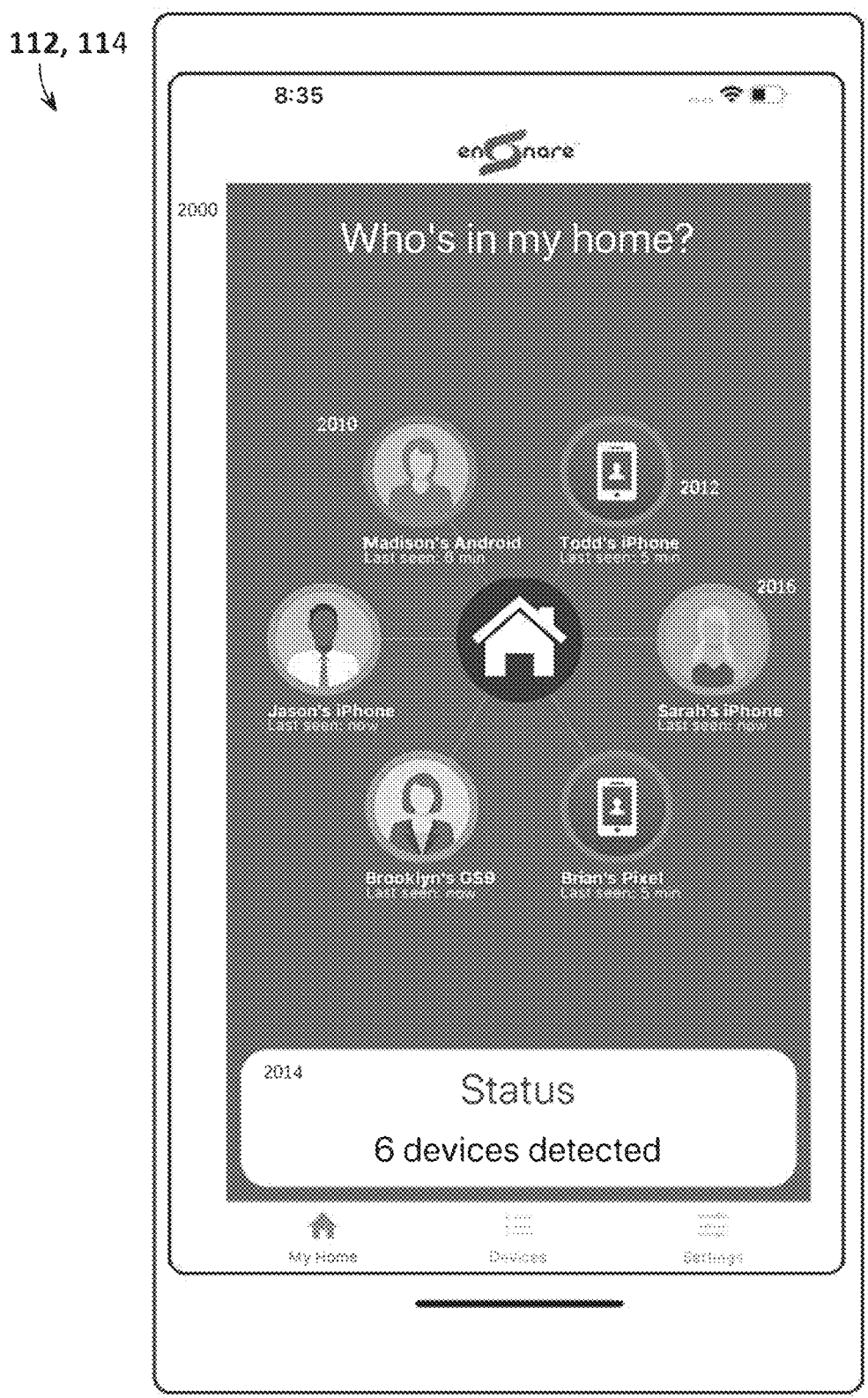
FIG. 20 depicts an example of a monitoring view presented by the mobile application when one or more devices have been detected according to some embodiments of the disclosed technology.

FIG. 20 depicts an example of the main mobile app view 2000 when one or more RDDs are detected 2010, 2012, 2016. RDDs require a device profile 326B that contains detailed information of each unique device 112, 114. When a RDD 328B is detected that is also associated with a user profile 318B, the mobile app may present an icon that includes the user's picture and name 2010. When a RDD 328B is detected without an associated user profile 318B the mobile app may present a generic device icon 2012 with the device name. Each RDD icon 2010, 2012, 2016 may also show the last time that device 112, 114 was detected. If the device 112, 114 is not currently being detected, the last seen value may show how long it has been since a sensor detected that device 2010, 2012. A configurable time window may allow the user to set how long a device 112, 114 icon may remain in the main view 2000 since the last detection. The RDD icon can be removed from the main view 2000 after this time window has elapsed. If the RDD is currently active and detected by a sensor, the last seen value can be set to "Now" 2016. The status object in the main view may provide a count of all RDDs currently detected and within the activity time window 2014.

Figure 21:
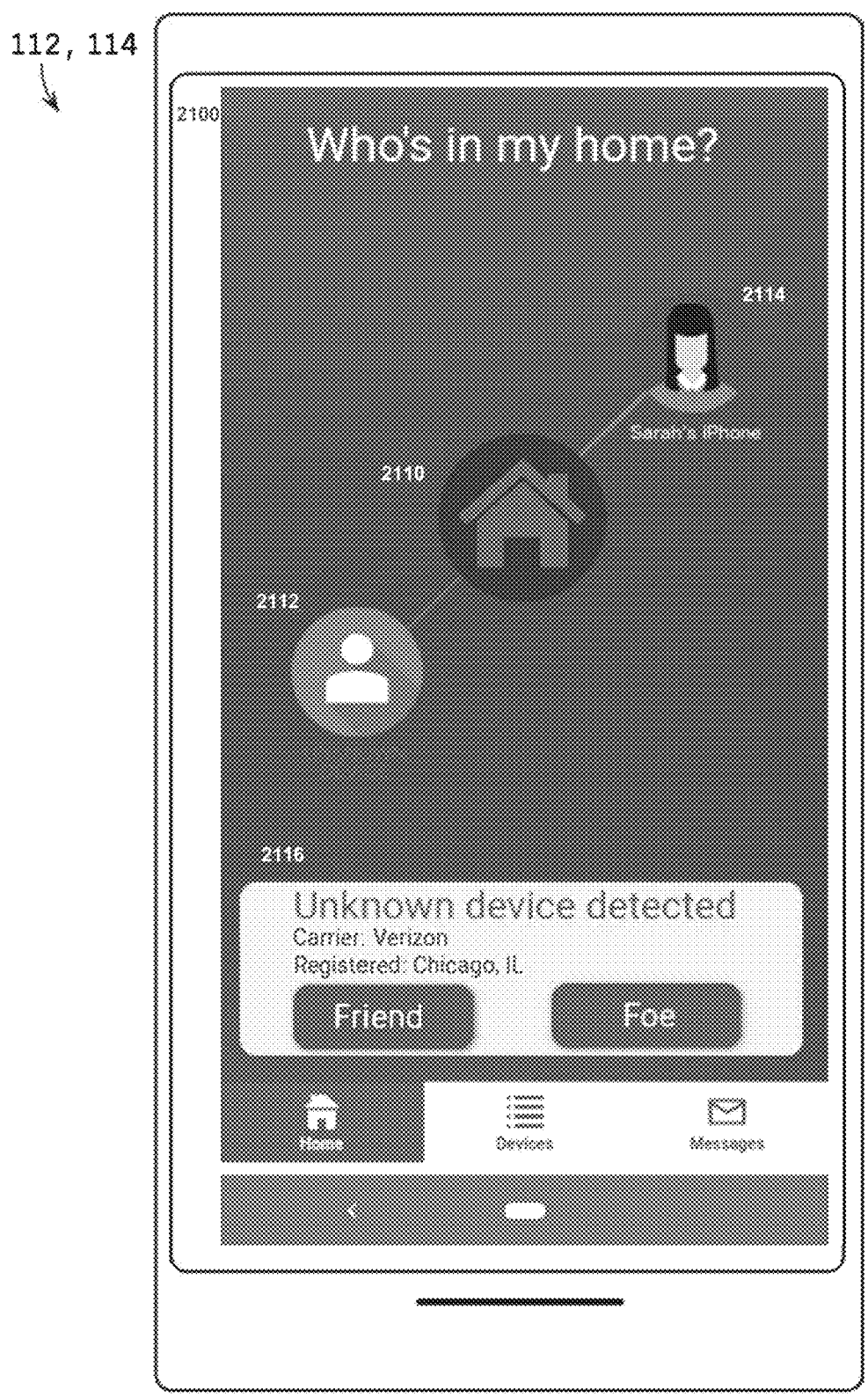
FIG. 21 depicts an example of a monitoring view presented by the mobile application when an unregistered device is detected according to some embodiments of the disclosed technology.

FIG. 21 depicts an example of the main mobile app view 2100 when one or more UDDs are detected 2112. If one or more RDDs are active in the home, their icons will also appear 2114. The information in this view is intended to allow the user to investigate the UDD and determine if they are an intruder or a trusted visitor 314B. If an RDD is present 2114, the user can click to call or text that device (see e.g., FIG. 3B, 330B). This provides an automated contact capability for the user to see if the trusted person is in the home, if they are witnessing an intrusion and if they are safe. The details of the UDD may also be provided 2116 in this view. These details may include the carrier and the origin of the subscription 2116. This may provide further context to determine if the UDD is indicative of an intrusion. When a third-party security service is present, the main view 2100 may show the status of the security alarm as well. In some embodiments, combining the ability to contact a trusted person in the home, the detailed of the UDD and status of the security alarm provides the user a great level of detail to determine if there is an intruder.

Figure 22:
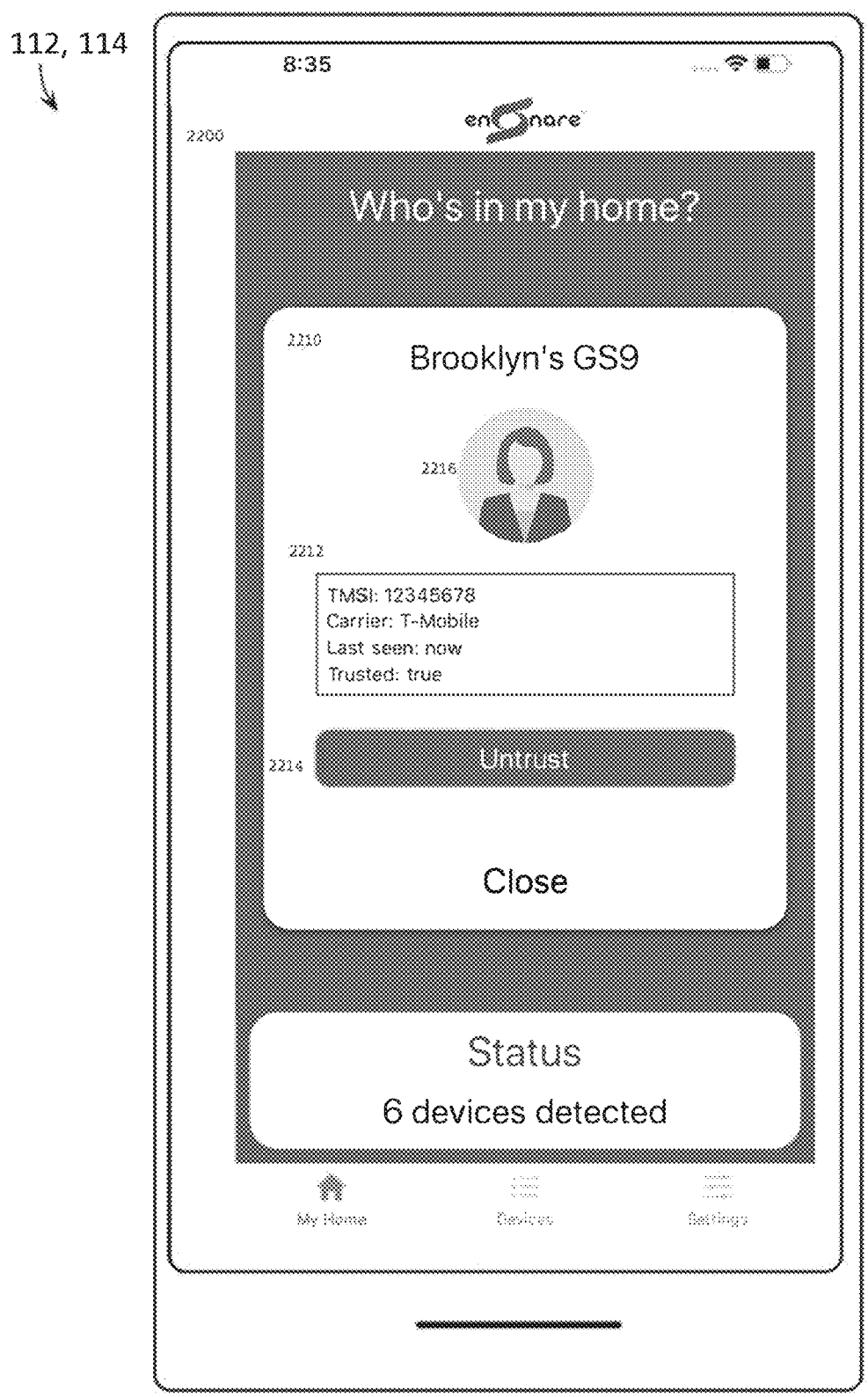
FIG. 22 depicts an example of a device profile view presented by the mobile application according to some embodiments of the disclosed technology.

If the user determines that a UDD 2112 belongs to a trusted person, the user can select to register 2116 the device 338B. FIG. 22 depicts the device profile 326B view in the mobile app. From this view 2200, the user can review and edit the device details 2212 including the subscriber ID, carrier, and when the device was last seen in the home. They can also choose to remove the trust relationship of this device 2214. The user profile 318B, 2210 may also be linkable from this view. This will allow the user to update the user information associated with this device 2216.

In the event the user determines a UDD is indicative of an intruder, they can select the report button 2116. This will activate the reporting workflow 324B. From here the user can chose options which may include to call a third-party security service or law enforcement directly 332B. A report may automatically be compiled 334B and transmitted using Text-to-911, email, third-party security service reporting and other means available for reporting.

Figure 23:
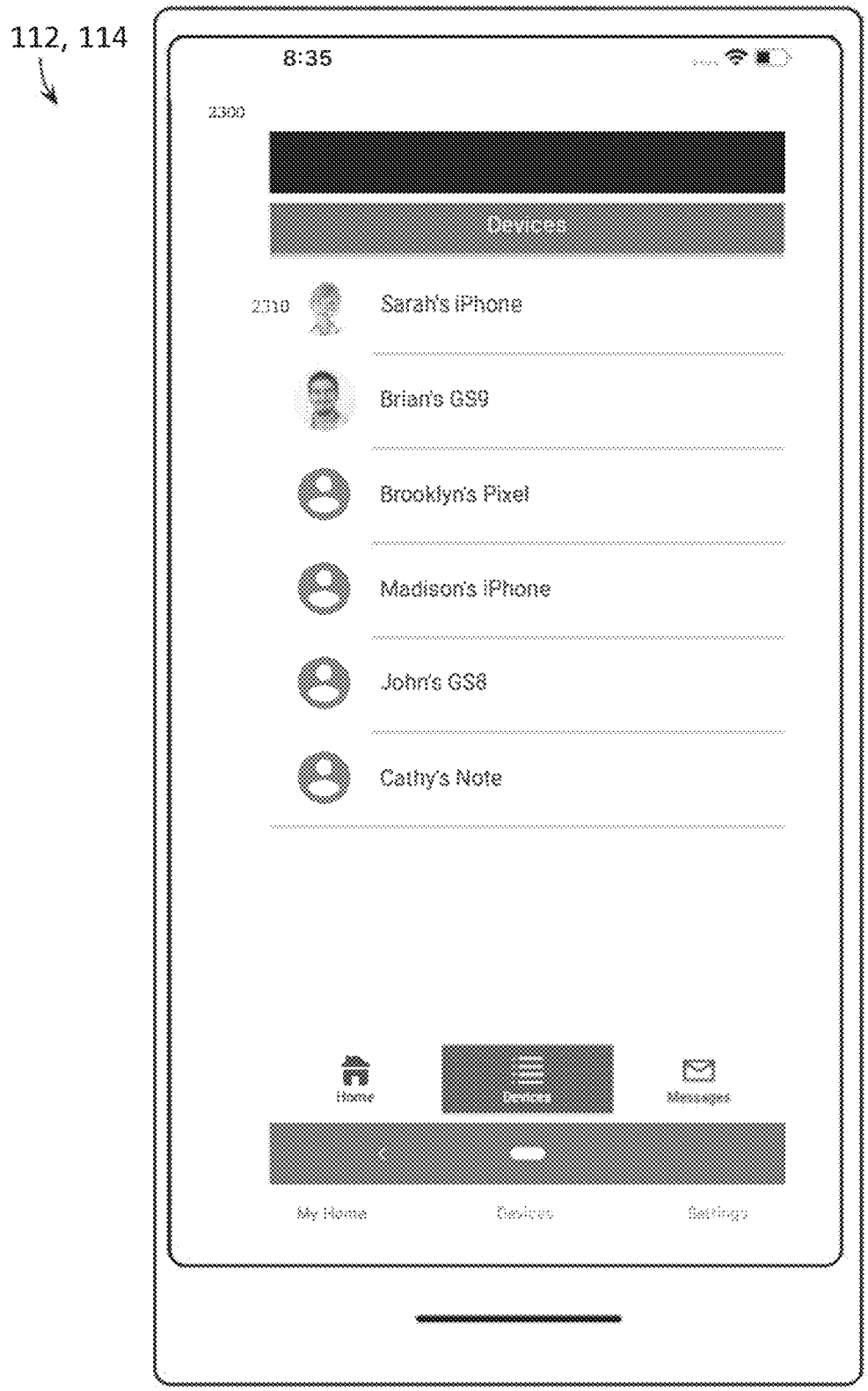
FIG. 23 depicts an example of a registered devices view presented by the mobile application according to some embodiments of the disclosed technology.

FIG. 23 depicts an example of the device list view 2300. This provides a linkable list of all devices 112, 114 that have been registered 2310. From here the user can select any device 2310 and this will bring up the device profile of FIG. 22.

Sensors

In some embodiments, an electronic device identification system may include a distributed array of sensor apparatuses which can be deployed to collect transmissions from any mobile electronic device that implements wireless connectivity for communications. All wireless devices transmit data on specific signaling channels to join and maintain a presence on a particular network. This system collects and processes these cellular, Bluetooth and Wi-Fi transmissions and decodes the underlying signaling data for the purpose of identifying an electronic device (digital identity) and its location. This data can be analyzed by upstream systems to identify the owner of the electronic device and their proximity to a crime, other event, or location.

The disclosed sensors can passively intercept wireless signals and interrogate local area networks to collect network connected device data. The sensors perform collection on many distinct and disparate data sources simultaneously. The following is an overview of the data collection sources supported by the sensor:

Local Network(s)—Requires connection to all relevant networks (cooperative)
  Network Discovery
    ARP Scanning
    Network mapping (Nmap)
    DNS Resolution
  Traffic Analysis
    Packet header fields
    Packet size
    Transmission rates
    Transmission timing channels
Wireless Signaling—Does not require local network connection (exploitive)
  Cellular
    Uplink from mobile wireless device to tower
    Downlink from tower to mobile wireless device
    Signaling protocol fields
  Wi-Fi
    Probe messages
    Association messages
    Authentication messages
  Bluetooth
    Paring messages FCC regulations prohibit transmissions on frequencies used by cellular communications. While it is theoretically possible to obtain permission to transmit on a given frequency, it is not realistic to rely on such permissions from all cellular carriers to transmit across the entire cellular spectrum. This system can use passive collection techniques to identify digital identities, rather than active transmission and interaction with cellular and other electronic devices. The benefits of this approach are compliance with FCC transmission regulations, and avoiding interference with carrier services and detection by cellular device users. The sensor apparatuses can be compliant to all applicable regulatory standards including FCC Chapter 47, Part 15.

Figure 24:
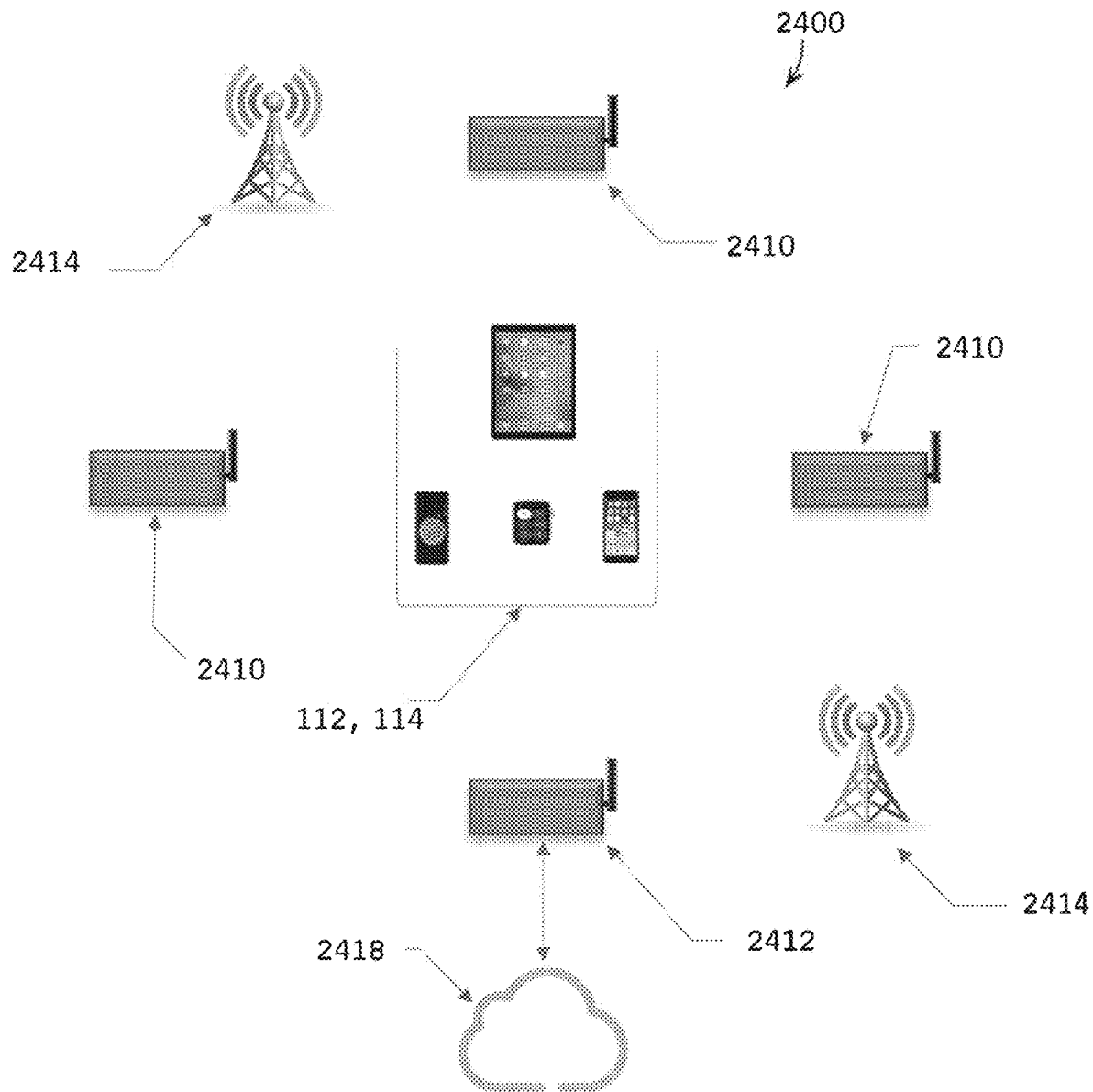
FIG. 24 depicts an electronic device identification system architecture and components according to some embodiments of the disclosed technology.

FIG. 24 illustrates an example of an electronic device identification system 2400 architecture and components according to various embodiments. In some embodiments, the system 2400 may comprise one or more connector sensor apparatuses (connector sensors) 2410 and core sensor apparatuses (core sensors) 2412 which can be configured as an array, and which may passively interact with an existing cellular network architecture by introducing an array of the sensors 2410, 2412, into proximity of the existing cellular network architecture. In some embodiments, the sensors 2410, 2412, may work as an interconnected network of collection points that are strategically deployed within a large area to ensure full coverage of all cellular transmission from any cellular enabled electronic devices 112, 114 in the large area.

In some embodiments, these sensors 2410, 2412, can be or comprise internet of things (IoT) devices, such as which may align well with modern IoT management frameworks. In further embodiments, a primary difference between a core sensor 2412 and connector sensor 2410 is that the core sensor 2412 may additionally include an LTE cellular modem, other modem or other network connection, which can be used for backhauling data through the internet to a cloud infrastructure 2418 that may provide data analytic services.

A sensor 2410, 2412, may receive transmissions from both cell towers 2414 (eNodeB) and cellular enabled electronic devices 112, 114 (UE) to effectively collect and process signaling data. The sensors 2410, 2412, can be fixed devices and once they are operational, they begin detecting which cell towers 2414 are in range. After a cell tower 2414 is detected, the array of sensors 2410, 2412, can be dynamically configured to listen on the frequency band(s) used by that particular cell tower 2414. The sensors 2410, 2412, then use the tower's 2414 frequency band(s) to listen for electronic devices 112, 114 in the area. Once a new electronic device 112, 114 is found by a sensor 2410, 2412, the sensor 2410, 2412, configures the array to collect signaling data transmitted by that device 112, 114.

After the array of sensors 2410, 2412, is configured to listen for a particular electronic device 112, 114, it can reliably process the signaling data transmitted over dedicated channels to one or more cell towers 2414 by the electronic device 112, 114. These signaling channels are comprised of layers of metadata used by network and electronic device 112, 114 to maintain a reliable and authenticated connection. Within this metadata are fields that can be used to identify an electronic device 112, 114 (digital identity) and that device's 112, 114 location at a specific time. The sensor 2410, 2412, decodes the signaling data to extract specific protocol fields. The extracted data fields are then normalized and packaged for efficient transmission to the cloud infrastructure 2418 for the purpose of detecting digital identities of a particular electronic device 112, 114.

The system 2400 may include any number of sensor apparatuses 2410, 2412, which can be configured to provide cellular and other wireless data collection coverage over a large area. This is especially helpful in an urban environment in which a large number of carriers operate in an area. Electronic devices 112, 114 within the United States connect to a wireless network typically operated by one of five service providers. Each of these wireless network service providers utilizes more than one access technology across a number of frequency bands. There are also a large number of mobile "virtual" network operators within the United States. These virtual network operators do not operate a unique physical network but utilize the network of one or more of the five active network operators. Currently there are over 16 distinct frequency bands for LTE providers alone. Each of the bands may also use unique uplink and downlink frequencies.

In some embodiments, a sensor apparatus 2410, 2412, may comprise one or more Software Defined Radios (SDR). A SDR is a radio communication system where components such as mixers, filters, amplifiers, modulators/demodulators, detectors and others are implemented in software or firmware. An SDR can be dynamically "tuned" using software processes and provide the versatility needed to address a larger frequency spectrum.

For a receiver to effectively collect signaling data it must be tuned to a specific frequency. A SDR can only be tuned to one frequency at any given time. For a sensor to receive on all frequencies operating in a heavily populated area, it must have the ability to receive on the entire cellular frequency spectrum. Traditional cellular equipment uses separate receiver cards for each frequency band. This is sufficient for typical cellular receivers because they don't have to cover the entire spectrum. Covering the entire spectrum using separate SDR cards would make the sensor cost prohibitive. To solve this problem, a sensor apparatus 2410, 2412, may comprise a customized SDR receiver card SDR card (2512) and process for efficiently tuning multiple receivers.

Figure 25:
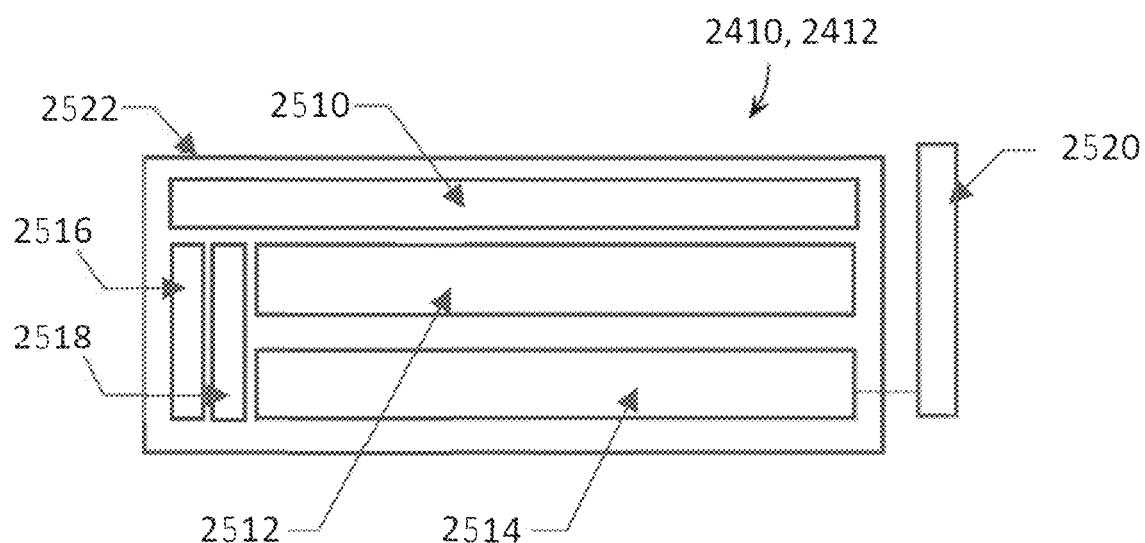
FIG. 25 illustrates a block diagram of an example of a sensor apparatus according to some embodiments of the disclosed technology.
Figure 26:
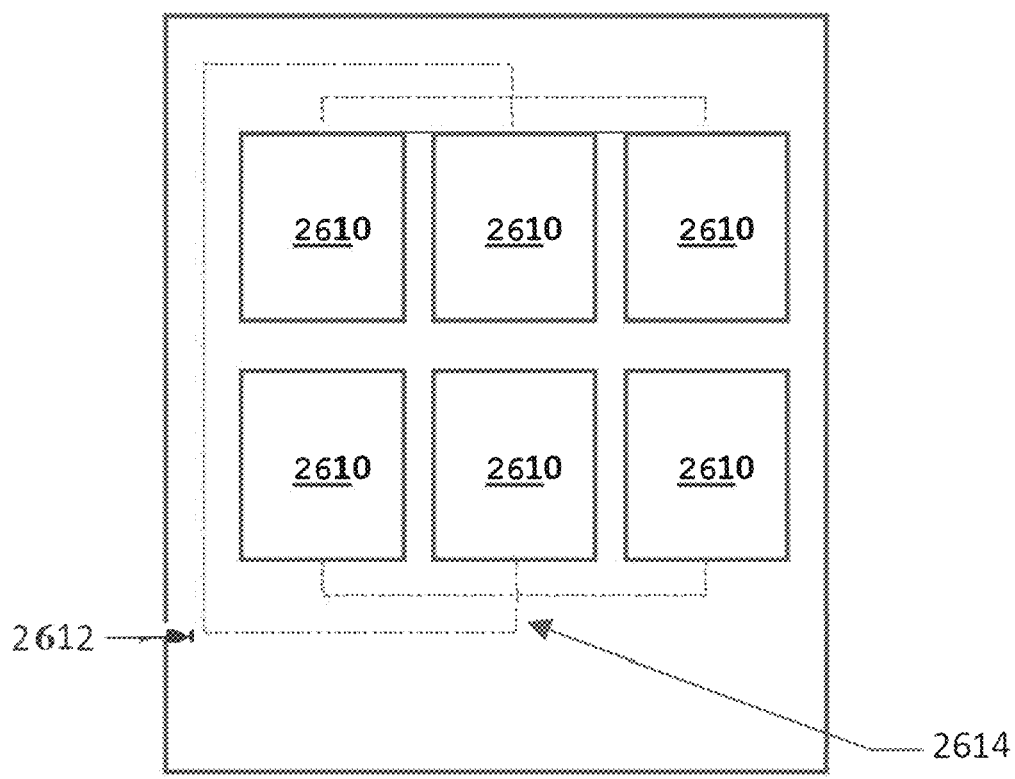
FIG. 26 shows a block diagram of an example of a Software Defined Radio (SDR) board of a SDR card according to some embodiments of the disclosed technology.

Referring to FIGS. 25 and 26, in some embodiments, a sensor apparatus 2410, 2412, may comprise a SDR card 2512, a controller card 2514, a controller backplane 2518, a power module 2516, a cellular and/or other wireless communication antenna 2510, a Wi-Fi and/or other wireless communication antenna 2520, and a sensor housing 2522.

In some embodiments, a SDR card 2512 may comprise one or more individual SDR receivers 2610. The SDR receivers 2610 are capable of being individually tuned to separate frequencies. In some embodiments, a single SDR receiver 2610 can be systematically tuned to receive transmissions on multiple bands. The SDR receivers 2610 are interconnected 2614 to allow the SDR board 2612 to effectively sequence tuning for each receiver 2610. The SDR controller card 2514 is driven by a process that uses timing channels to systematically tune each SDR receiver 2610. This reduces the number of receivers required to provide full spectrum coverage. In some embodiments, two or more SDR receivers 2610 may work in parallel through inter-process communications.

The controller card 2514 provides processing power, storage and data I/O services. A sensor apparatus 2410, 2412, does not process data at line rate as raw captures may need to be stored briefly while the sensor configures itself to listen to the transmitting electronic devices 112, 114. Once the signaling is successfully decoded and transmitted to the cloud, the sensor apparatus 2410, 2412, may purge all relative data.

The Controller backplane 2518 provides data connectivity, clock and sequencing for the controller 2514 and SDR 2512 cards. The cellular antenna 2510 can be directional or omnidirectional depending upon the requirements of a specific installation area. The cellular antenna 2510 can be used to receive transmissions from cell towers 2414 and electronic devices 112, 114. The controller card 2514 may include an integrated Wi-Fi adaptor, which can be used to interconnect all sensor apparatuses 2410, 2412, in the array. The Wi-Fi antenna 2520 may provide point-to-point reception to the onboard Wi-Fi adaptor.

In some embodiments, in order to provide maximum installation flexibility, a sensor apparatus 2410, 2412, can be powered by AC voltage. For example, if the target area is the United States; the sensor apparatuses 2410, 2412, can be powered by 110-127 VAC/60 Hz.

In some embodiments, a sensor apparatus 2410, 2412 may have a power consumption of less than 50 Watts. The sensor apparatuses 2410, 2412 may comprise a durable housing 2522 which may allow the sensor apparatuses 2410, 2412 to operate in harsh environments and to be protected from damage due to electrical transients. In some embodiments, a sensor apparatus 2410, 2412 may tolerate an ESD voltage of 2000V, human body model on all exposed pins. In further embodiments, a sensor apparatus 2410, 2412 may support a two-terminal wired external trigger input.

It is expected that sensor apparatuses 2410, 2412 can be installed in locations that are not environmentally controlled. Thus, the operating temperature range can be −40 to 50° C. with no solar load. Solar loading will reduce the operating temperature range. In some embodiments, the storage temperature range can be −40 to 85° C. The sensor apparatuses 2410, 2412 may operate with a relative humidity between 10 and 95% that is non-condensing. The sensor housing 2522 may support an environmental protection level of IEC IP-67. The sensor apparatuses 2410, 2412 can be capable of operating up to an altitude of 15,000 feet.

In some embodiments, sensor apparatus 2410, 2412 application requires a sensor apparatus 2410, 2412 that can be small in size and that can be mounted in a wide variety of locations. In some embodiments, a sensor apparatus 2410, 2412 can be less than 0.5 cubic feet in volume and weighs less than 5 pounds. In order to minimize maintenance, a sensor apparatus 2410, 2412 may not use fans for cooling but rather may utilize convection or passive cooling.

In order to minimize cost, the cellular antenna 2510 can be integrated within the housing 2522. Given the point-to-point connectivity between sensor apparatuses 2410, 2412 the Wi-Fi antenna 2520 can be externally mounted to the housing 2522 and can be directional.

In some embodiments, the sensor apparatuses 2410, 2412 can be mountable on a pole, on a wall, or on any other object or surface in order to simplify installation. To prevent someone from easily defeating the protection provided by a sensor apparatus 2410, 2412 the housing 2522 can be tamper-proof. The sensor apparatuses 2410, 2412 can be designed to support UL listing.

Figure 27:
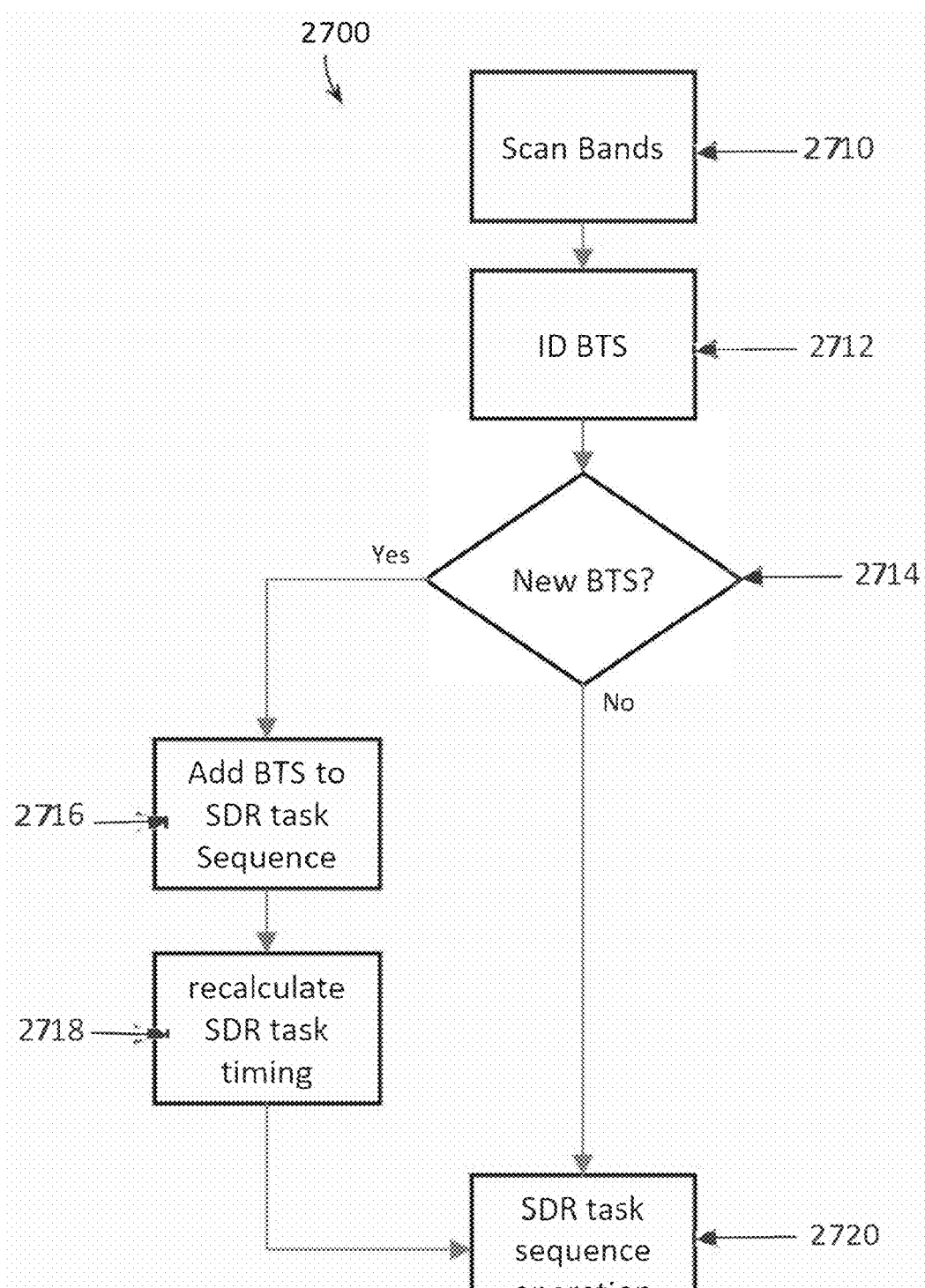
FIG. 27 depicts a block diagram of an example of a method for learning base stations according to some embodiments of the disclosed technology.

In some embodiments, the system 2400 includes software performed methods which can be used to identify a new cell tower 2414 or Base Transmit Station (BTS) bands and dynamically tasking the SDR receivers 2610 of the sensor apparatuses 2410, 2412. In some embodiments, a sensor 2410, 2412 may monitor transmission bands from an eNodeB and dynamically tasks one or more SDR receivers 2610 for newly discovered bands. For the purposes of this description the terms cell tower 2414, BTS and eNodeB are used interchangeably. In some embodiments, as part of the automated configuration process, each sensor apparatus 2410, 2412 may monitor the respective frequency spectrum to identify new base stations 2414. In some embodiments, when a sensor apparatus 2410, 2412 is powered on, it initiates a method 2700 for learning base stations that are within range of the sensor apparatus 2410, 2412. A block diagram of the method 2700 is depicted in FIG. 27. Once the initial learning process is completed, the sensor 2410, 2412 may continue to monitor for foreign base stations 2414 or changes in known base station configurations 2710. Given that base stations 2414 are stationary and rarely change band configurations, the monitoring and tasking process will use very few resources under normal operation 2720.

In some embodiments, the sensor 2410, 2412 may continuously monitor a list of known frequencies looking for transmissions from foreign base stations 2414 in step 2710. After a foreign base station 2414 is detected in step 2710, the sensor 2410, 2412 may identify the frequency band(s) the base station 2414 uses for its signaling channel transmissions in step 2712. If the detected base station 2414 has already been processed via steps 2716 and 2718, then the method 2700 may proceed to step 2720. If the sensor 2410, 2412 detects a new base station 2414 on a known transmission band 2712 in step 2714, it may then add them to the SDR tasking sequence in step 2716. This sequence is used by the sensor 2410, 2412 to systematically tune each of the SDR receivers 2610 based on time slots calculated in step 2718. These time slots can be calculated in step 2718 based on several factors influenced by the frequency of particular signaling messages, number of bands currently being monitored, overlapping coverage for neighboring sensors 2410, 2412 in the array and other factors. Once the timing sequence is calculated, the SDR receivers 2610 can be tasked and resume normal operation in step 2720. Each base station broadcasts a list of neighbor cells. In some embodiments, a sensor 2410, 2412 may receive neighbor cell broadcast advertisements and dynamically tasks one or more SDR receivers 2610 for newly discovered neighbor bands.

This list is also used by the sensor 2410, 2412 to register known base stations 2414 rather than having to detect them directly. In some embodiments, a sensor 2410, 2412 may receive cellular transmissions over multiple bands and corresponding frequencies concurrently without a one-to-one relationship between a frequency band and SDR receiver.

Figure 28:
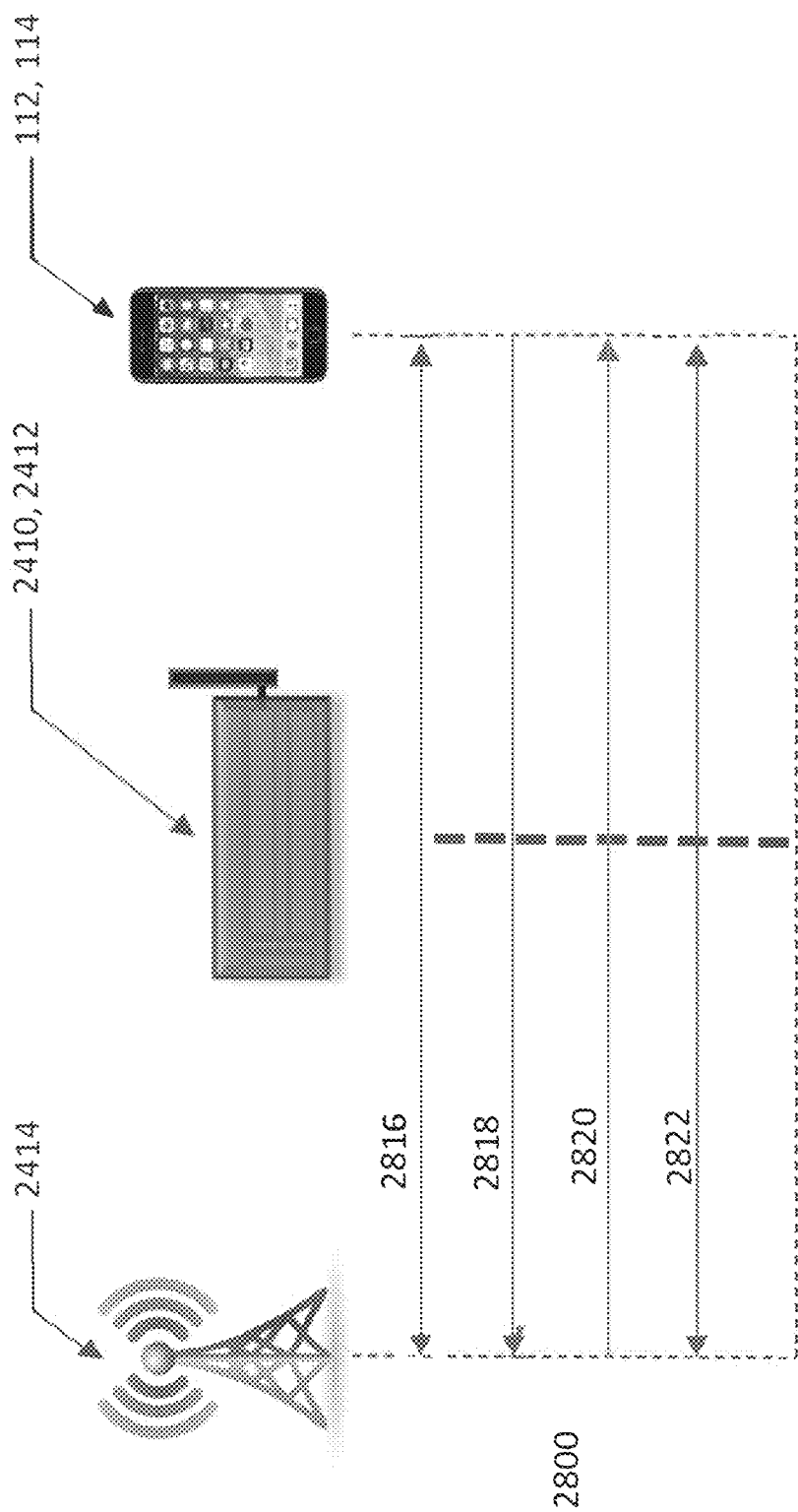
FIG. 28 illustrates an example of a software stack which can be utilized by an electronic device identification system according to some embodiments of the disclosed technology.

Existing open source and commercial LTE software stacks are not designed for passive collection and processing of signaling data. For example, OpenLTE is designed to function as a cellular base station. It expects explicit parameters based on active requests to operate. With passive collection and processing, the sensors 2410, 2412 included in the system 2400 may determine configuration parameters without the aid of active communication with electronic devices 112, 114 or base stations 2414. To accomplish this a custom LTE software stack 2800, as shown in FIG. 28, can be utilized by the system 2400. The term passive refers to methods that do not require the sensor to actively transmit and operate in receive only mode.

Typically, when an electronic device 112, 114 joins a cellular network, it uses a handshaking protocol. This protocol requires a series of messages communicated between the electronic device 112, 114 and the cell tower 2414 of the cellular network. Some of these messages are also communicated to other infrastructure components deeper in the cellular network. It is not necessary to discuss the details of cellular network operations beyond the base station or cell tower 2414.

In some embodiments, the process of an electronic device 112, 114 joining a cellular network starts with a random-access advertisement 2816 which can be received by a sensor 2410, 2412. This alerts the electronic device 112, 114 that a network is in range. When an electronic device 112, 114 finds a base station 2414 via a random-access advertisement 2816, it initiates the attachment process using an AttachRequest message 2818 which can be received by a sensor 2410, 2412. The attach request 2818 provides key information for the network to establish a connection with the electronic device 112, 114. This includes information specific to location and channel timing for this particular electronic device 112, 114. The sensor 2410, 2412 uses this information to configure parameters such as timing offset. In some embodiments, the timing offset between an eNodeB and UE is set without explicit parameters provided by the infrastructure of the system 2400. The base station 2414 then sends an IdentityRequest 2820 to the electronic device 112, 114 which can be received by a sensor 2410, 2412. The electronic device 112, 114 responds with an IdentityResponse message 2822, which can be received by a sensor 2410, 2412, that contains information to help verify the subscriber account and authenticate the electronic device 112, 114. The protocol fields contained in the IdentityRequest 2820 and IdentityResponse 2822 are decoded by the sensor 2410, 2412 and used by the cloud infrastructure 2418 to determine the digital identity and subscriber information of the electronic device 112, 114. These signaling messages 2816, 2818, 2820, and 2822, also contain data that is used to determine the location of the electronic device 112, 114 at a specific time.

Figure 29:
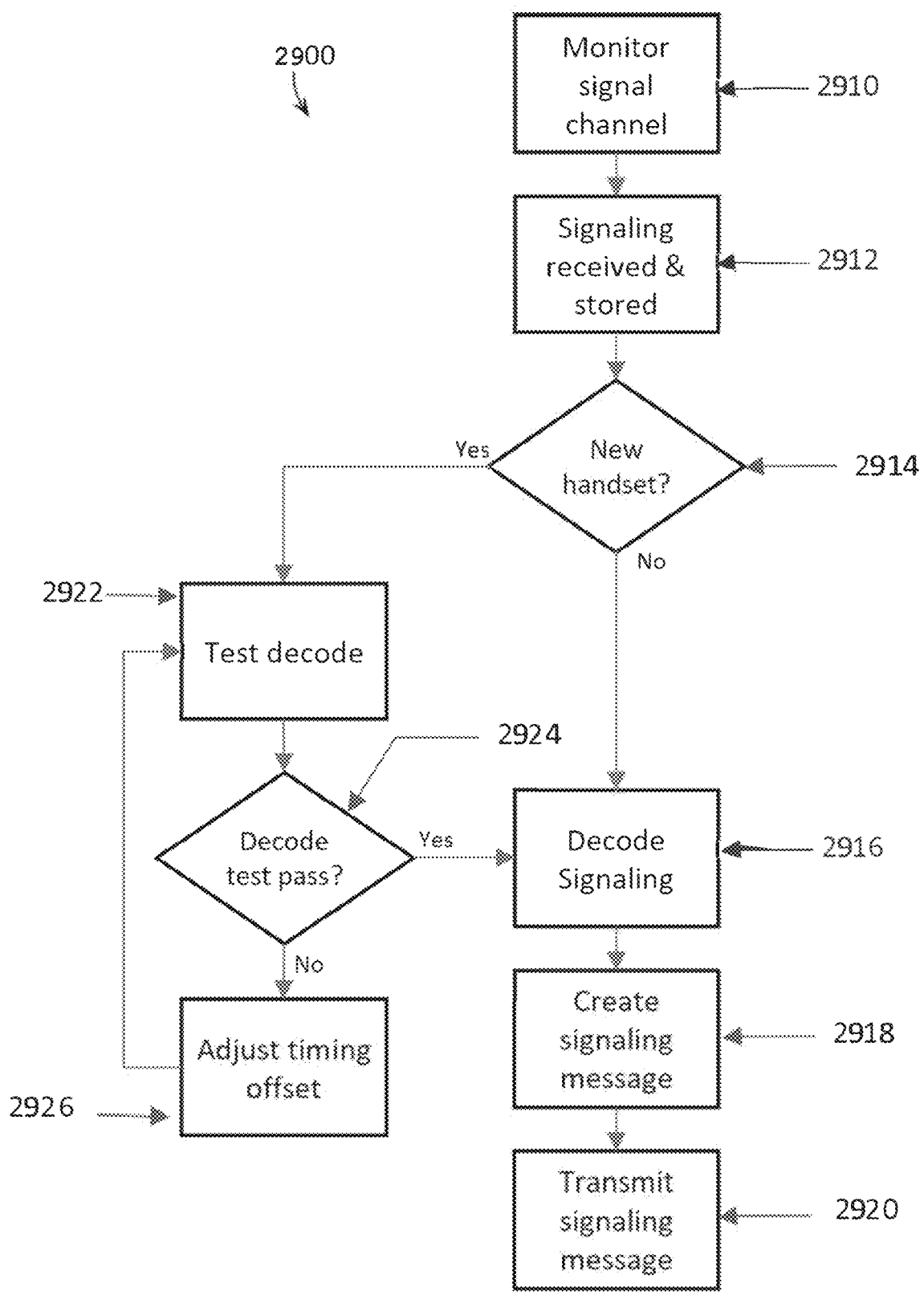
FIG. 29 shows a block diagram of an example of a method for decoding signaling messages according to some embodiments of the disclosed technology.

Electronic devices 112, 114 use a timing offset value to adjust for latency in data transmissions. Without the correct offset value, the sensor 2410, 2412 cannot properly process and decode signaling messages. In normal cellular network operations, the electronic device 112, 114 provides the base station 2414 with the offset value. If the sensor 2410, 2412 receives the offset value, it can set timing explicitly 2926 (FIG. 29). In many cases, the sensor 2410, 2412 does not receive the offset value prior to attempting to decode messages. This causes the decode to fail.

As shown in FIG. 29, the system 2400 may utilize a method 2900 for decoding signaling messages which can be used to prevent or avoid decoding failures. In some embodiments of the method 2900, a sensor 2410, 2412 can monitor the signaling channel in step 2910. When signaling messages are received, the sensor 2410, 2412, may temporarily store them in step 2912. In decision block 2914, the sensor 2410, 2412 may determine if the handset or electronic device 112, 114 is new by checking to see if the timing offset is configured for the handset or electronic device 112, 114. If the offset is present, the handset or electronic device 112, 114 can be determined to not be new, the method 2900 may proceed to step 2916, and the sensor 2410, 2412, may decode the received messages. If the timing offset is not configured, the handset or electronic device 112, 114 can be determined to be new and the sensor 2410, 2412, may use a default timing offset and test the decode process in step 2922. If the decode passes, the method 2900 may proceed from decision block 2924 to step 2916, and the sensor 2410, 2412, may keep the existing timing offset value and continue to decode signaling messages under normal operation. If the decode test fails, the method 2900 may proceed from decision block 2924 to step 2926, and the sensor 2410, 2412, may adjust the timing offset and retest in step 2922. The sensor 2410, 2412, may repeat this process systematically incrementing the timing offset in step 2926 after each failed attempt until the correct timing offset value is identified.

During normal operation, the sensor 2410, 2412, may decode signaling data in step 2916, extract the decoded field values and create a composite decoded signaling message in step 2918. This message may then be sent or transmitted to the appropriate neighbor sensor(s) 2410, 2412, in step 2920 or in the case of a core sensor 2412, the message can be transmitted over the internet to the cloud infrastructure 2418.

The system 2400 may utilize a method by which signaling information can be used in conjunction with triangulation and base station 2414 locations to determine the location of electronic devices 112, 114. The "location" information can be extracted from random-access messages decoded in cellular signaling received by sensors 2410, 2412. When multiple sensors 2410, 2412 receive the same location information from a base station 2414, the sensors 2410, 2412, may triangulate the location of the electronic device 112, 114. This triangulation relies on knowing the precise location of all base stations 2414 from which the signaling was received. The location of these base stations 2414 can be discovered through public record or through the survey process used to deploy sensors 2410, 2412 in a given area. In some embodiments, location information can be extracted from random access messages received on multiple sensors 2410, 2412 and used in conjunction with triangulation and eNodeB locations to determine an electronic device 112, 114 location. In further embodiments, multiple sensors 2410, 2412 can share UE and eNodeB parameters to extend the area of collection coverage.

Sensor Communications

An array of sensors 2410, 2412 can provide ubiquitous access to cellular infrastructure parameters within the coverage area. This can be accomplished with network connections between two or more, and each, sensor(s) 2410, 2412 in the array and cloud services. Network connectivity deployment configurations which can be used to accomplish a fully connected array of sensors 2410, 2412 may include: direct connection using Wi-Fi; internet connection using cellular; hybrid of direct and internet connection; and/or any other suitable method.

In some embodiments, the direct connection configuration may use point-to-point Wi-Fi links between each sensor 2410, 2412 and its neighbors. In this configuration, message routing can be accomplished using a Shortest Path First algorithm. The routing process measures hop count, bandwidth and latency to choose the optimal route for message traffic from the primary processing sensor 2410, 2412 to the internet using adjacent sensors 2410, 2412 to forward messages. In some embodiments, an array of sensors 2410, 2412 may route data messages to the internet using the most efficient path based on detected latency and bandwidth parameters.

The advantage of this configuration is that only one cellular connection service is needed to provide ubiquitous connectivity to the internet and cloud services. This configuration requires every sensor 2410, 2412 to have a stable Wi-Fi connection to at least one neighbor sensor 2410, 2412. If any sensor 2410, 2412 lacks a connected neighbor, then the hybrid configuration can be used.

In some embodiments, the internet connection configuration uses a dedicated cellular connection between each sensor 2410, 2412 to route traffic through the internet. This configuration can be used where obstructions or sensor 2410, 2412 deployments do not support Wi-Fi connectivity. The primary disadvantage to this configuration is limited bandwidth and latency for message transmission. Another disadvantage to this configuration is added cost to support a dedicated cellular service for each sensor 2410, 2412. Cellular backhaul transmissions occur on the same dedicated channel as though not to interfere with cellular signaling collection. In some cases, an additional directional antenna might be employed for the dedicated backhaul channel.

In some embodiments, the hybrid connection configuration may use Wi-Fi point-to-point, cellular connections, and/or any other communication method to interconnect the sensor array. This model can be used where one or more sensors 2410, 2412, is out of Wi-Fi range or other communication method range of the other sensors 2410, 2412 in the array. In the hybrid configuration, additional sensors 2410, 2412, or Wi-Fi repeaters can be added to as location and fiscal constrains are lifted.

Wireless Signaling Data Analytics

Wireless signaling data is used to detect the presence of a device 112, 114, identify the subscriber/owner of the device 112, 114 and provide details of the device 112, 114 itself to the user of this system. There are many data fields that can be used to detect, characterize and report unauthorized devices 112, 114 within a home. For example, analytics described in this embodiment can use wireless signaling data fields like International Mobile Subscriber Identity (IMSI), Temporary Mobile Subscriber Identity (TMSI), Radio Network Temporary Identifier (RNTI), and MAC Address to identify devices. It should be noted at the outset that a particular application (e.g., phone location services) is not required to be installed on the device of interest to detect, characterize, and report an unauthorized device using the disclosed technology.

Figure 30A:
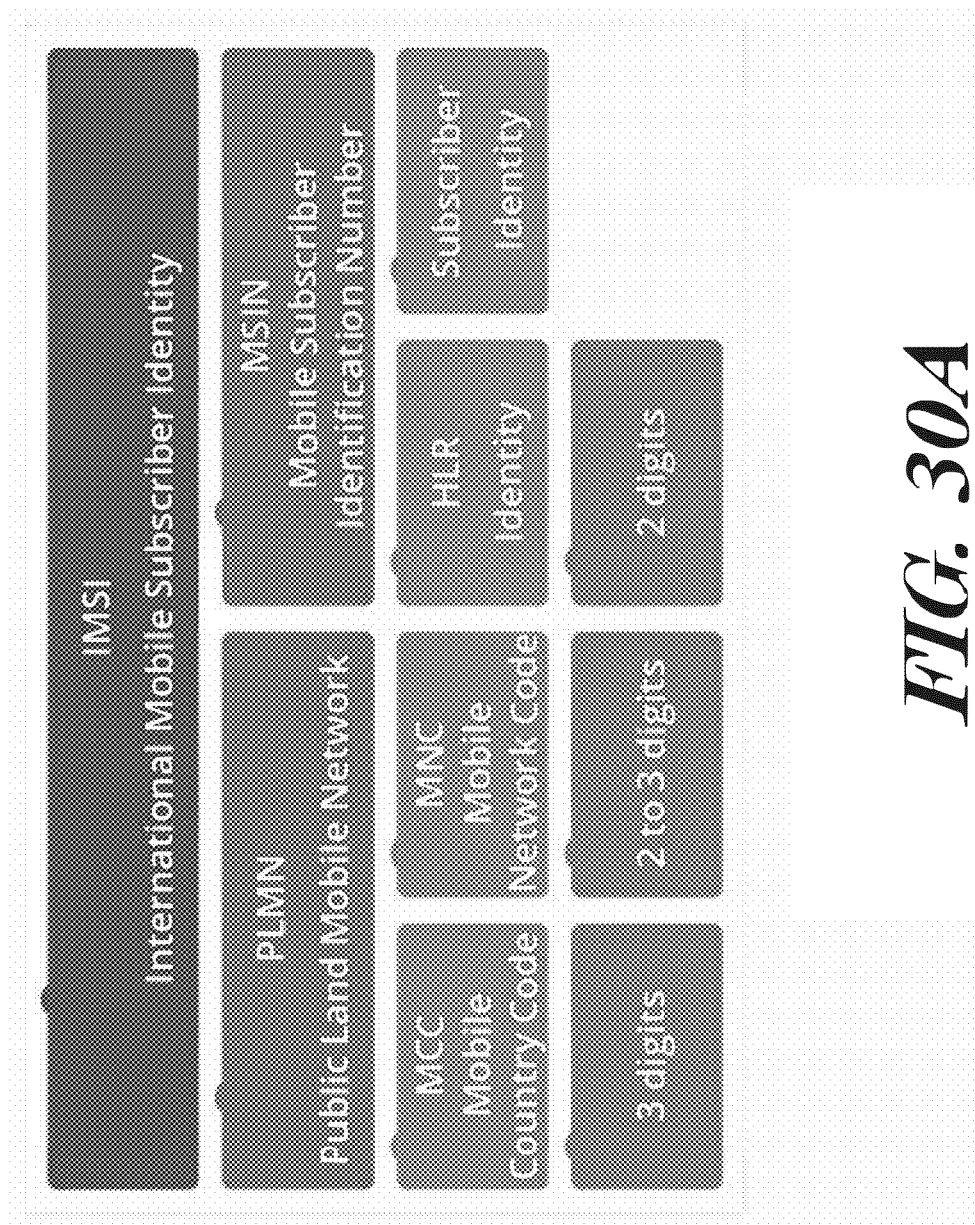
FIG. 30A illustrates an example of an International Mobile Subscriber Identity (IMSI) field and subfields as they apply according to some embodiments of the disclosed technology.

In some embodiments, the IMSI is the most direct way to uniquely identify a device. An IMSI contains coded subfields that can be used to identify the owner of a cellular subscription and assigned device. The wireless digital signaling data can be used to uniquely identify an individual through a cellular subscription. FIG. 30A provides a breakdown of the IMSI field and its subfields.

In some embodiments, the TMSI is a method for detection and monitoring of a mobile wireless device. The TMSI was designed to limit the transmission of the IMSI over unencrypted wireless channels. Available conventional products rely exclusively on the IMSI to attribute a device to an individual. Given the 3GPP specification of a TMSI to limit the transmission of IMSIs, the IMSI is not transmitted frequently enough to achieve real-time detection of digital IDs with conventional products.

Figure 30B:
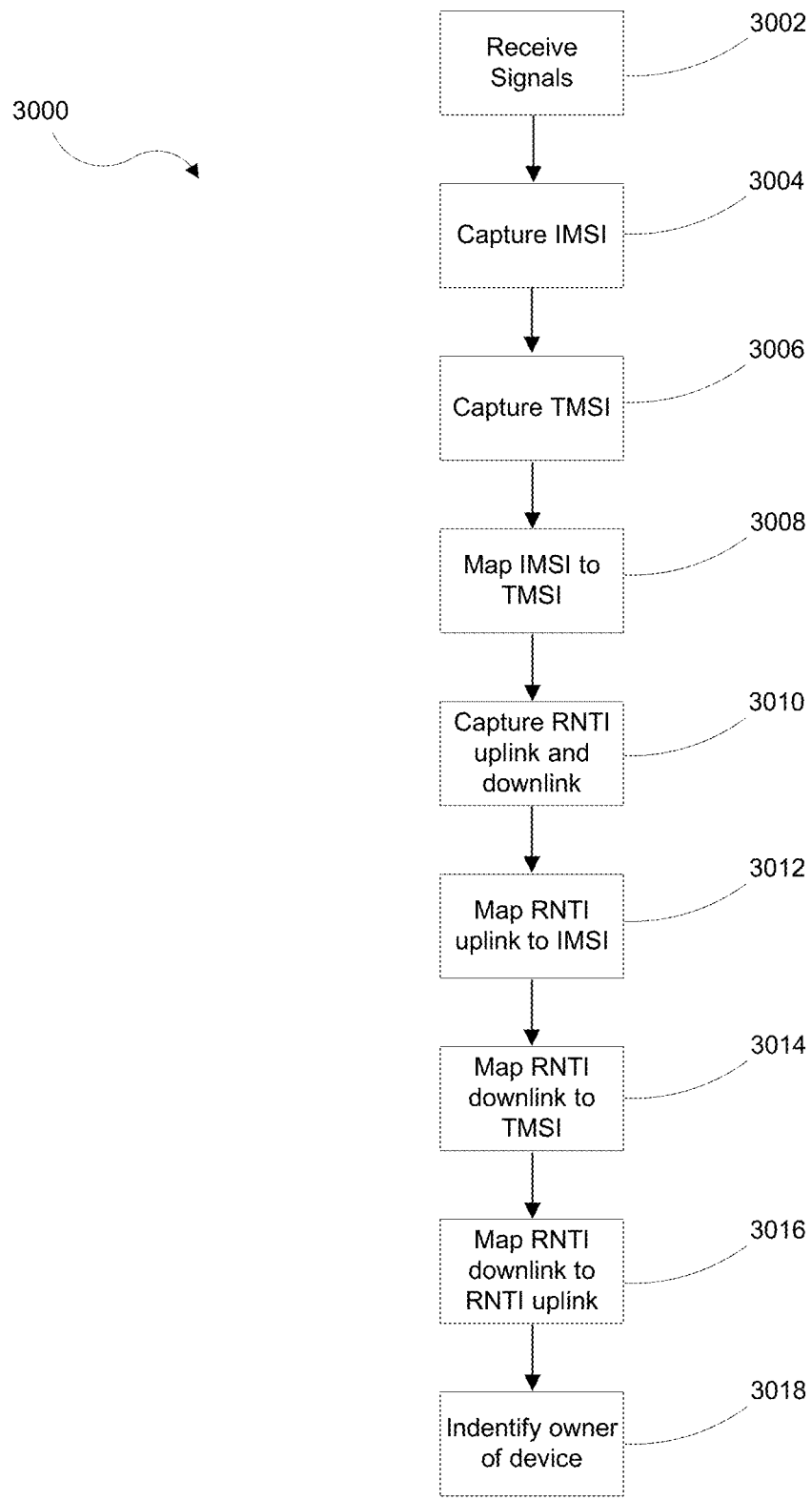
FIG. 30B shows a block diagram of an example of a method for determining the identity of a mobile wireless device according to some embodiments of the disclosed technology.

The disclosed technology uses one or more sensors to capture cellular signaling during the initial registration of a device 112, 114 on the cellular network. During this registration a series of messages are transmitted including the IMSI. Once the registration is complete, the IMSI is no longer transmitted and a TMSI is used instead. FIG. 30B illustrates a method 3000 for identifying a mobile wireless device. The system can receive the signals transmitted between a mobile wireless device and a base station, such as a cell tower at step 3002. The system captures both the IMSI at step 3004 and the TMSI at step 3006 and maps them at step 3008 so that future identification of a device 112, 114 can be accomplished using the TMSI. In order to map an IMSI to a TMSI, the system captures the RNTI from both the downlink and uplink at step 3010. All messages include an RNTI value; however, the uplink and downlink messages use a different and distinct RNTI value. The system maps the uplink RNTI value to the IMSI at step 3012, then maps the downlink RNTI value to the TMSI at step 3014. Then by pairing the down and uplink values at step 3016, the system can also pair the TMSI with the IMSI. For future detections, the TMSI can now be used in place of the IMSI to identify a device at step 3018.

The TMSI introduces several complexities if a system is attempting to use it as a one-to-one replacement for an IMSI. The primary complexity is that TMSIs can be recalculated over time. During this recalculation the IMSI may not be transmitted. Unlike the TMSI, the RNTI is persistent and does not get recalculated. Therefore, the RNTI uplink and downlink pairing can be used to identify the new TMSI if it is recalculated. Since the system has the RNTI pairing already mapped to the IMSI, it can now map the new TMSI to the IMSI.

The TMSI may also be used in some embodiments along with the RNTI to determine when a device 112, 114 has entered a home and how long it has stayed. Since the RNTI and TMSI are transmitted consistently and frequently by both the base station and the mobile wireless device, the system can use these values as a signaling heartbeat for the presence of the device 112, 114. When the sensor is receiving a steady cadence of the RNTI and TMSI values, the system knows that the device 112, 114 is still present in the home. When RNTI and TMSI values have not been received for more than some predetermined period of time (e.g., five seconds), the system knows the device 112, 114 is not being detected. This process drives reporting to the user of when the device 112, 114 entered the home, when it left and how long it stayed.

Since the IMSI is only transmitted during the initial registration, a sensor in the home may not receive the IMSI value. One method for capturing the IMSI when the home sensor is unable to do so is to use a fixed neighborhood sensor or array of sensors that service all homes in a given area. Neighborhood sensors provide coverage to capture mobile wireless device 112, 114 registration with base stations. This method is still a completely passive approach to capturing cellular signaling. The neighborhood sensor array provides large area persistent coverage for a given neighborhood or community. When a mobile wireless device 112, 114 leaves one cell neighborhood and enters another it reregisters with the network and transmit its IMSI. The neighborhood sensor captures this registration and the IMSI. The home sensor can then obtain the IMSI value from the cloud and use the mapping method previously described to track the device using the TMSI and RNTI.

In some embodiments, the TMSI, device location, and time are enough to identify a device. Thus, the TMSI is another independent method for identifying a device even without a corresponding IMSI. Changes to the TMSI (e.g., recalculation) can still be tracked using the uplink and downlink RNTI, as explained above.

Geofencing

In some embodiments, the system may use a geofencing technique to create a signaling perimeter around a home or building. The geofence limits device 112, 114 detection to within the perimeter excluding signaling from outside the geofence. A geofence requires the system to determine the proximity of a mobile wireless device 112, 114 to the one or more sensors of the system and relate that proximity to the geographical coordinates of the home 100. In some embodiments, proximity detection can be accomplished through the collection of cellular signaling measurements and signal strength at the receiver.

Proximity detection may use two primary fields that can be transmitted within the cellular signaling channel of a mobile wireless device 112, 114. These fields are Measurements Signal to Interference plus Noise Ratio (SINR) and Received Signal Strength Indicator (RSSI). These fields are used by the cellular network to determine which base station a cellular device 112, 114 should connect to. They are a measurement of how strong a signal is between a device 112, 114 and any given base station (e.g., base station 2414, FIG. 24). They can also be used to determine location of a cellular device 112, 114 through triangulation. In some embodiments, the values of these fields and the strength of the signal received by the sensor 116, 2410, 2412 can be used to determine how far away the mobile wireless device 112, 114 is from the sensor. When combined with GPS data of the perimeter of a home, the proximity value can be used to create a geofence.

Establishing a geofence may require a few steps during the setup of the sensor. In some embodiments, once a sensor is operational and detecting any compatible LTE cellular device 112, 114, the user can enter geofencing mode. Once in this mode, the user systematically positions the cellular device 112, 114 at each corner of the property perimeter. The user indicates they are at each corner with the mobile application 120. The system takes measurements from the device 112, 114 at each corner and combines it with the signal strength reading and from the sensor. The system may also log the GPS coordinates of each corner of the property. Once all corners of the perimeter have been measured the system can calculate the perimeter of the geofence. This calculation results in a value range for the SINR, RSSI and signal strength.

In some embodiments, during operation the system may detect a new mobile wireless device and evaluates the SINR, RSSI and signal strength values. If the values are within the range the system may process the detected device 112, 114. If they are out of the range, the system may assume that device 112, 114 is outside the geofence and ignore the device detection. A learning (AI) algorithm can be used to improve the accuracy of the geofence by adjusting the acceptable range of measurement values. Over time, the system may continue to record SINR, RSSI and signal strength values of registered devices 2212, 326B every time a device is located at a corner GPS location. If the values at the GPS coordinates are different, the system may update the learning algorithm and adjust the range. Through this method of learning the acceptable range of power and noise measurements, the system improves the accuracy of device 112, 114 detection over time. A user can accelerate this learning process by going through the geofencing process several times as part of the setup process.

Data Ingest and Processing

Figure 31:
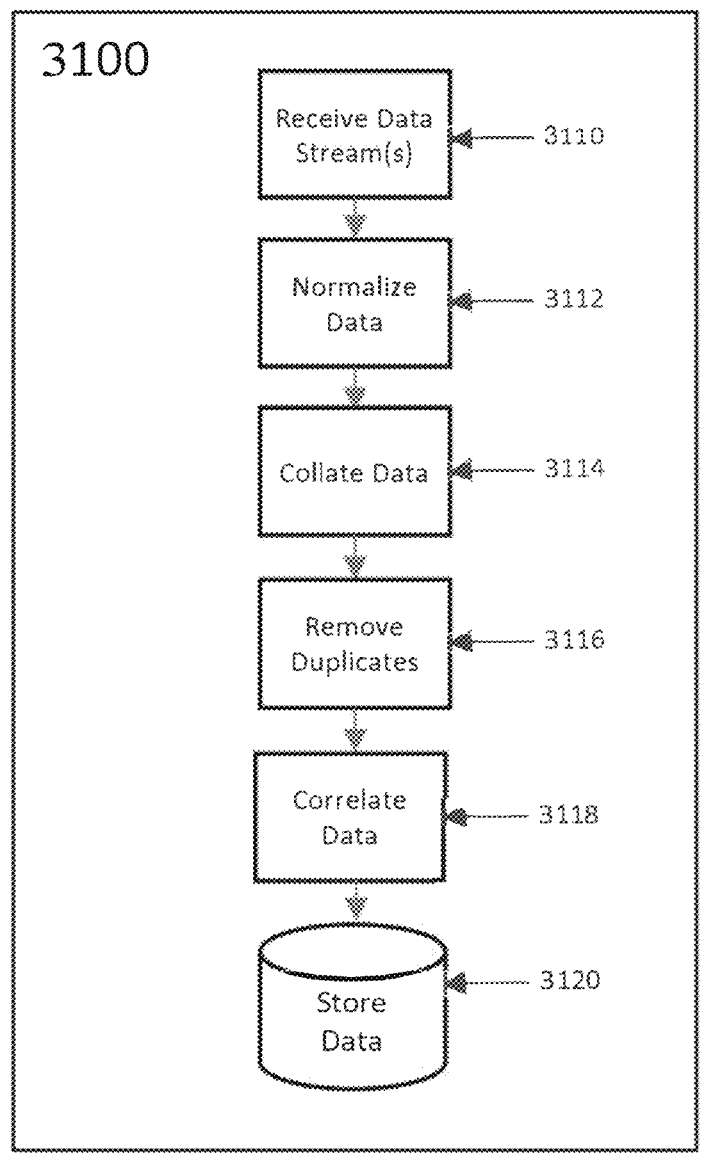
FIG. 31 illustrates an example of a data ingest and processing model according to some embodiments of the disclosed technology.

The example of a data ingest model depicted in FIG. 31 is capable of taking raw wireless signaling data and systematically processing it for use by real-time cloud services. This process can be agnostic to the type of wireless signaling data and only requires a field driven message format. To this end, it can process new sensor data without changes to the processing model. All data processing can be achieved through parallel series of pipelined data streams in real-time. Stated a different way, the functions in the data processing model 3100 can operate on multiple streams simultaneously and each function 3110, 3112, 3114, 3116, 3118, can execute independently. In some embodiments, a wireless signal data processing model implements a pipelined parallelized processing to normalize, collate, deduplicate and correlate data in real-time. In further embodiments, a single data processing method can be capable of ubiquitous processing of various types of wireless signaling data.

This data ingest model is capable of receiving and processing a large number of independent data streams 3110 from sensors 116 (FIG. 2B). The data streams may extract the data fields from the received messages on each stream to create a session object. This session object can be passed to the normalization function 3112 where the data is placed into data fields based on a chosen schema. Data can be analyzed and adjusted to comply with schema parameters.

Once data is normalized, the collation function 3112 may organize the data by wireless device 112, 114 and sequences the data by time. Sensor signaling and the resulting messages may result in duplicate sessions. A deduplication function ensures that only unique sessions are processed 3116. Correlation 3118 allows for data from multiple sessions can be linked. This may provide a complete set of information for a specific device. Once data is processed each function in the processed data stream(s) 3110 it can be indexed and stored 3120 and made available to real-time streaming services.

Relationship Graph

Figure 32A:
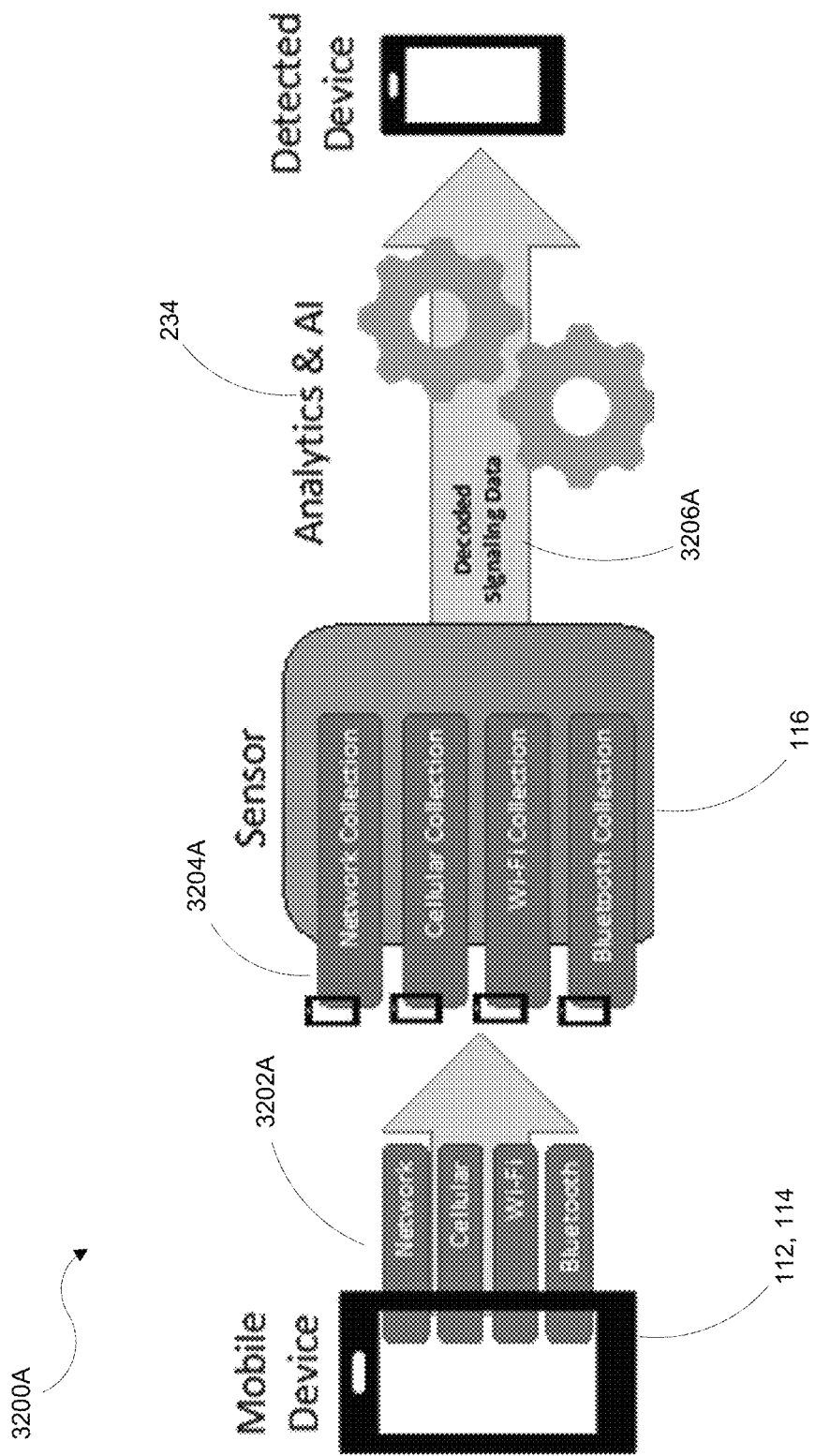
FIG. 32A illustrates an overview of signal collection and processing for the purposes of detecting a device according to some embodiments of the disclosed technology.

As shown in FIG. 32A, each device 112, 114 typically has more than one wireless interface 3202A. The sensor 116 passively intercepts wireless signals and interrogates local area networks to collect network connected device data 3204A such as data from local network(s), Cellular, Wi-Fi, and Bluetooth data sources. The ability to detect devices based on more than one wireless technology offers greater fidelity but can also complicate the process. One complication is that each of these wireless technologies operate independently. The signaling in each of the wireless protocols have no shared data fields or direct coupling. Thus, each of these interfaces can appear, at least initially, as a separate device.

To address the challenges associated with detecting devices through multiple interface types, the system enlists a series of analytic and AI services 234. These analytics characterize device, network, and human behavior to accurately monitor a person's presence based on the devices they currently have with them at any given time.

The sensor supports the raw collection of wireless signaling and network discovery data. It also performs decoding and protocol field value extraction. The decoded data is aggregated and packaged into a message stream 3206A. This message stream includes data specific to a collection source (e.g., cellular, Wi-Fi). The data stream at this stage is not enough for the system to perform monitoring or awareness functions. To generate actionable intelligence from this data, a series of analytic services provide three distinct functions: detection, characterization and persistence (DCP). The DCP functions are defined as follows:

Detection—The initial or subsequent presence of a device.

Characterization—The process of learning device attributes through AI or other analytic methods.

Persistence—The receipt of consistent timely signaling from a device for the purpose of identifying if a device has left or remains in a protected area. This function is sometimes referred to herein as a heartbeat.

In order to determine which detected interfaces belong with a particular device the DCP services create relationships between entities within the system. Examples of entities are wireless interfaces, devices, people, homes, etc. These relationships are created through data correlation and machine learning (ML) functions applied to the data provided by the sensor.

Both Discovery and Characterization within the DCP methodology leverage a series of analytic and learning services. These services may be categorized using the following methods:

Protocol Field Values—The extraction of specific values within wireless signaling protocol fields. These values are specific to the interface time such as cellular, Wi-Fi and Bluetooth. Examples of protocol field values for cellular are TMSI, RNTI, RSSI, Timing Advance, Cell ID, MCC, MNC, IMSI and others. Examples for Wi-Fi field values are MAC address, RSSI, SSID, Channel ID, Data Rate etc. Examples for Bluetooth field values are MAC address, Paired device MAC address, etc.

Inference—Inferring a field value using a combination of one or more different values. Examples of inferred field values are determining the manufacturer of a wireless adaptor from the MAC address, Other more involved inference include the ability to learn device model from the MAC address from learning common encoding used by a specific manufacturing plant or location. The system can also infer the make and model of a wireless device that implements MAC randomization prior to joining a Wi-Fi group through learning repeated MAC encoding within the random MAC address assignment.

Reduction—Removing known devices and corresponding interface data thereby limiting the set of data to be analyzed. When a device is fully characterized and assigned to a profile, this device may be removed from the data set used to characterize new unknown devices. In most cases, a single device or limited set (average is 2) devices are actually not known at any time. The signaling received when a new device is found is vast; however, if the signaling related to known characterized devices is removed only a small very manageable signaling set remains. This smaller data set makes detecting and characterizing the new device more manageable given the reduced data set.

Correlation—linking one or more data structures using a common field (or key) contained within each data structure. An example of correlation within cellular signaling is linking the TMSI in various messages to align signal processing to that particular device. This is similar to using the TMSI as a key to all received cellular signaling so that the system knows it is processing signaling data for a distinct device. Correlation is also used to map the TMSI to the RNTI and Cell ID to learn new TMSI values (if renewed) by looking up the RNTI and/or Cell ID. Another example is using the MAC address learned during network discovery to map Wi-Fi signaling received with the same MAC address. A further example is using the pairwise MAC addresses found between two devices discovered to assign them to the same profile. If a cell phone is paired to a BT headset the system can correlate the phone BT and headset BT addresses and now begin using them both for detection independently.

Timing Channels—Leaning relationships from the timing of wireless transmissions of different types. When a device such as a mobile phone enters a home, the system will potentially see four distinct and disparate interfaces (cell, W-Fi, BT and network). These interfaces will be discovered within an established window of time and therefore can be mapped to a single device. At a higher level, timing channels can be used to map devices to existing profiles. For example, if a mobile phone is linked to a profile of a known person, and a tablet and watch are consistently detected within a known time window, over time the relationship weight of these collective devices to the person will reach a threshold where the system can reliably assign the additional devices to that person's profile.

Figure 32B:
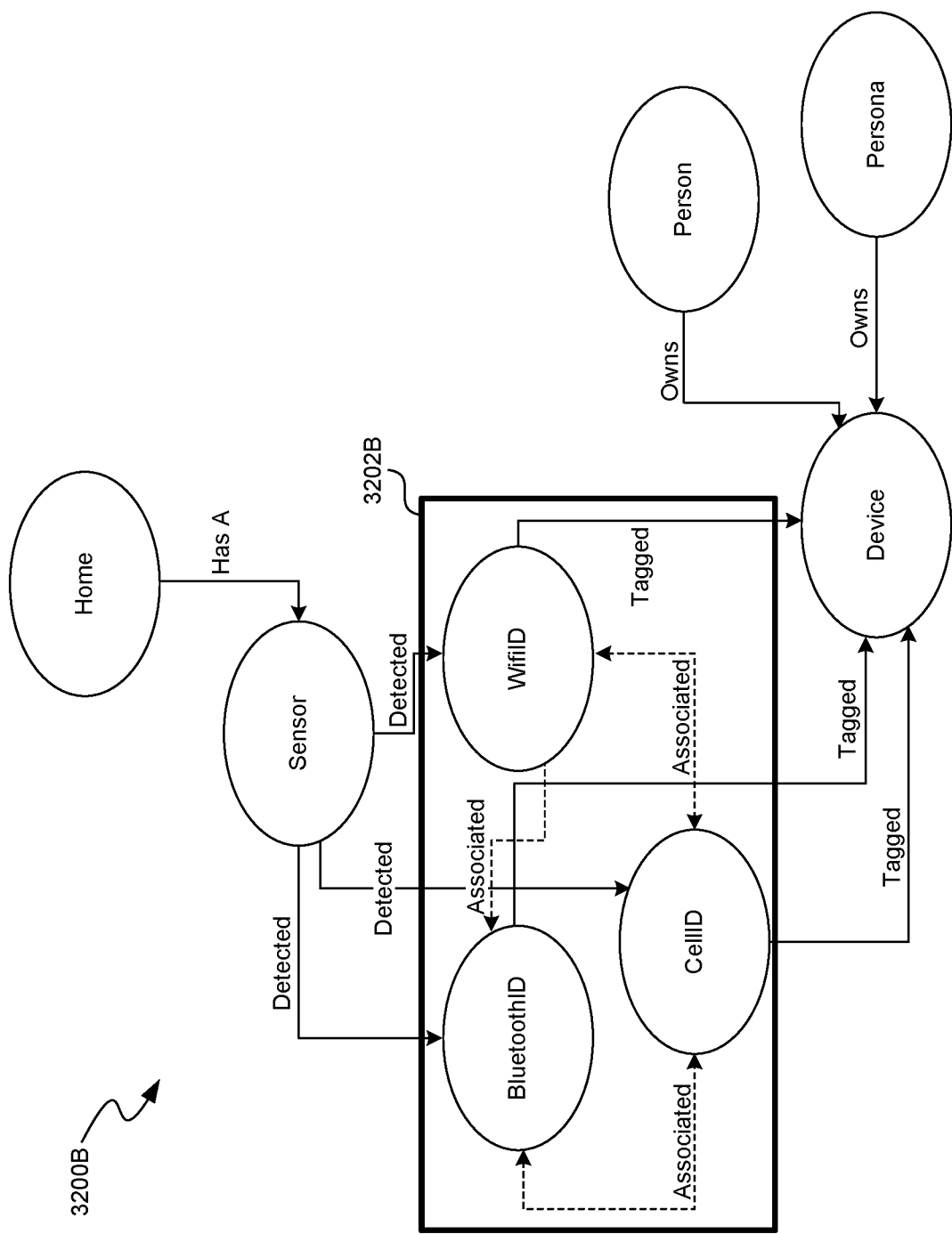
FIG. 32B is a block diagram illustrating a relationship graph according to some embodiments of the disclosed technology.

FIG. 32B illustrates a weighted edge relationship graph 3200B comprised of relationships between nodes, which include but are not limited to: Homes, Profiles (personas), Devices, Interfaces (wireless communication), Accounts, Sensors, and Others. This section describes the relationships of the subgraph that holds associations between various interface detections.

With reference to box 3202B, the nodes within the box are all detected interfaces. These interfaces may take on various identities such as a MAC address, a TMSI, etc. It is important to understand that a device such as a cell phone, watch, laptop, etc. may be detected by one or more of these interface signatures.

Most edges in the graph are binary, or they have a weight of either 1 and exist or have no edge at all. The Detections Sub-graph 3202B is however unique in that its connections amongst other detection interface notes are weighted, bidirectional, and can take on a value between 0 and 1 non-inclusive. This shows an example of how this sub-graph appears in the larger graph scheme for an example home account. The edge weights can be initialized to a weight of 0.02, for example.

This methodology captures association strengths (i.e., line weighting of association lines) between interfaces for use in understanding which interfaces may be representative of the same device/person/persona (profile) as well as what associations look like between devices/persons/personas. This is accomplished by incrementally batching interface detections and pushing these mini-batches into the graph such that the weights are updated via a continuous function that depends on the 'seen together' count. This not only provides the benefit of getting past a 'cold start' detection problem where there might not be enough data for offline training of a machine learning algorithm, but also helps to optimize the load put on the data stores and data transfer by providing an engineering lever to adjust the inherent tradeoff between responsiveness and database load.

Figure 33:
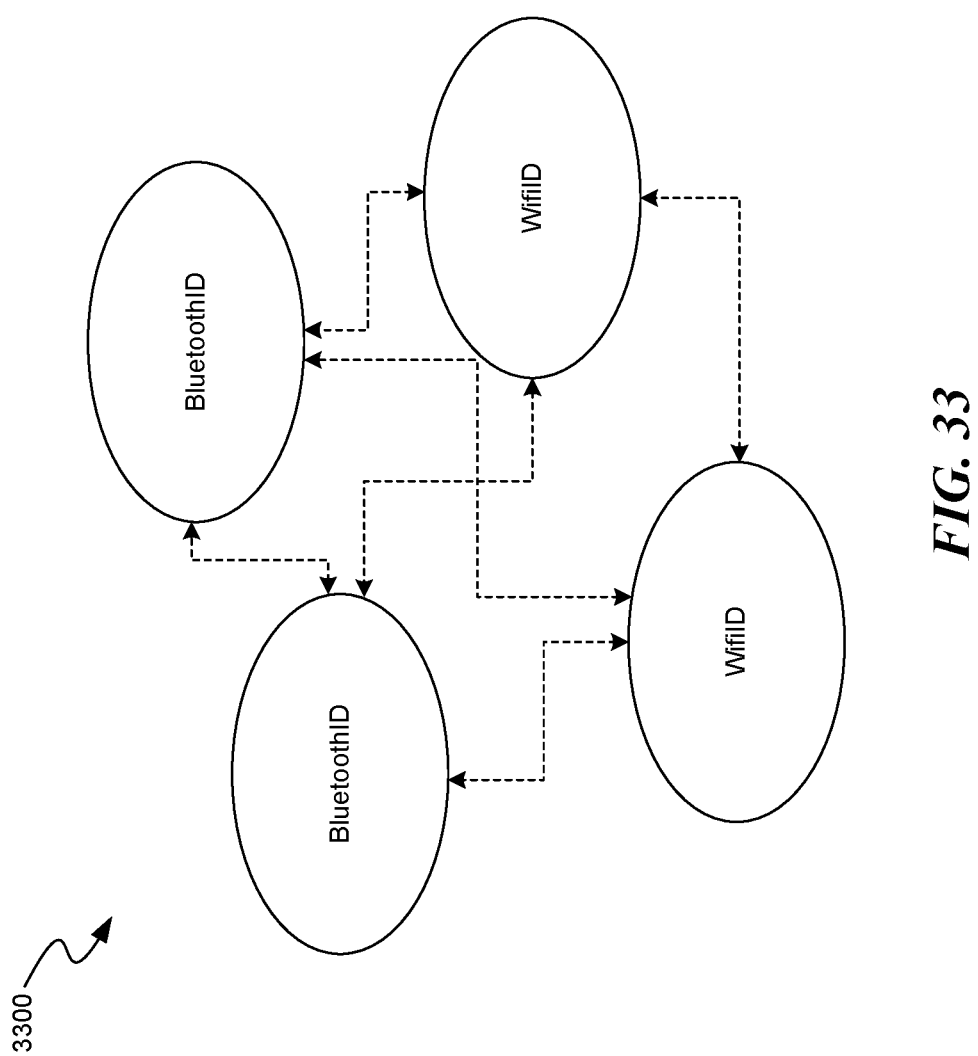
FIG. 33 is a block diagram illustrating a relationship graph according to some embodiments of the disclosed technology.

The following example steps through batched detections from a sensor. For each of these interfaces, it is assumed that they are coming from a 'DetectedBy' edge from a 'Sensor' node. Also, for simplicity, it is demonstrated with only two types of detection interfaces. With reference to FIG. 33, after a first mini-batch, the relationship graph includes two interface types for two independent devices.

Everything in the mini-batch has been associated with one another and initialized to a small value on the range of 0 to 1. At this point it is not necessary to know which BluetoothID matches up with what WifiID, but there may be additional metadata associated with these detections that can be used to infer what the device may be. In addition, over the course of more mini-batches, natural clusters that form based on the additions and removals of interface detections over time can be collected.

Figure 34A:
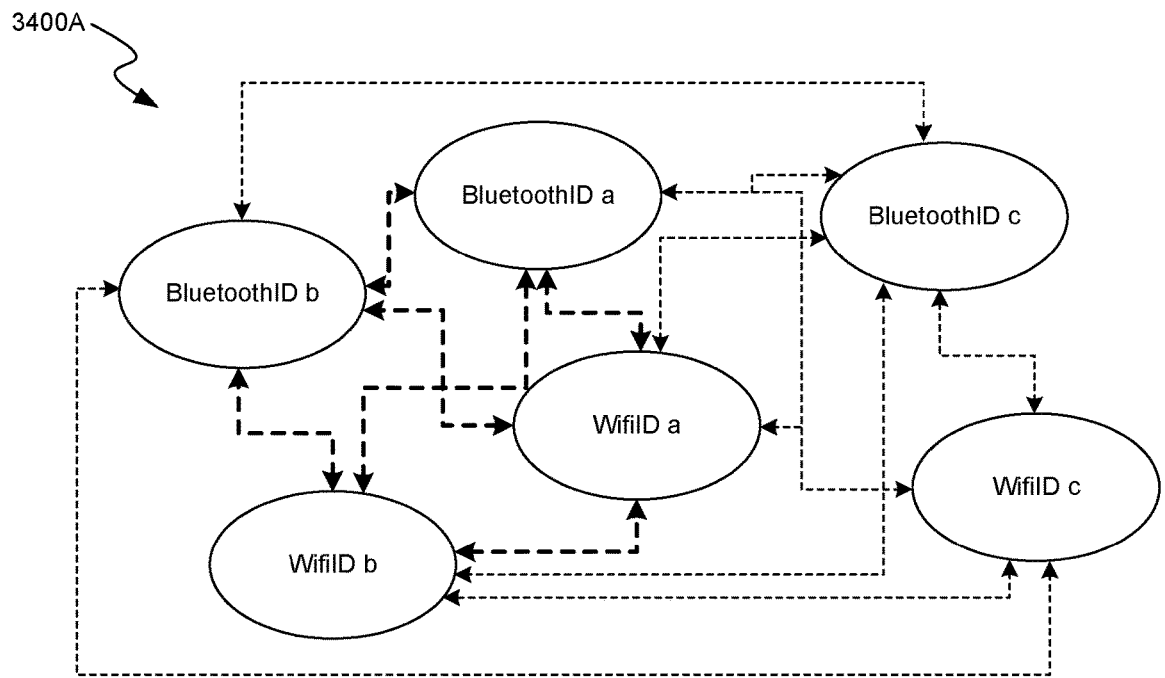
FIG. 34A is a block diagram illustrating the relationship graph of FIG. 33 updated with additional devices.

With further reference to FIG. 34A, the behavior of a relationship graph 3400A when another device is detected is demonstrated. When another device is detected a second mini-batch is combined with the original first mini-batch data points. As shown in the figure, the edge strengths between interfaces of set 'a' and 'b' becomes stronger, and there are now associations between set 'c' with both 'a' and 'b' interface sets. This allows for a deterministic query that looks for natural clusters of interfaces because there is a differential of association strengths. Even though the second mini-batch contained all six interfaces within the sets 'a', 'b', and 'c', the graph clearly shows that 'c' interfaces are distinct from both 'a' and 'b' so there is a natural grouping of sets 'a'+'b' vs. set 'c'.

Figure 34B:
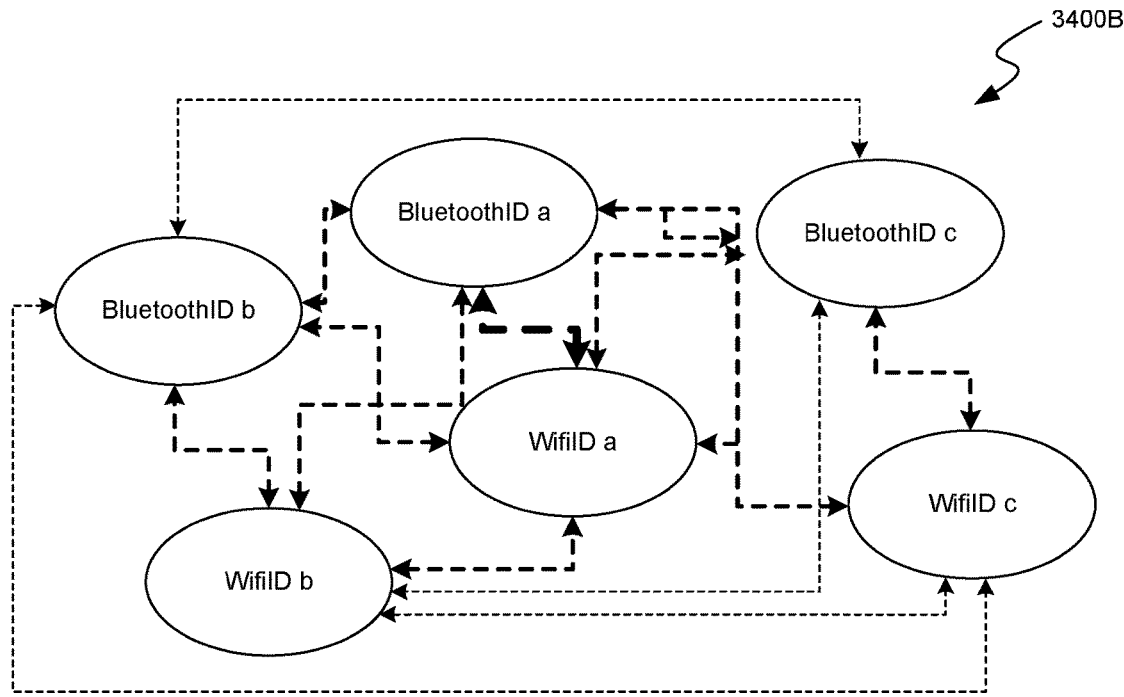
FIG. 34B is a block diagram illustrating the relationship graph of FIG. 34A with additional updates.

FIG. 34B illustrates what happens to the graph 3400B upon the removal of some interfaces. For example, assume the third mini-batch contains sets 'a' and 'c', but leaves out set 'b'. Because three mini-batches have been run at this point, there should be three levels of strength association for our edges. There were only sets 'a' and 'c' in this mini-batch, but there are a couple of points to note:

The strength of edges between set 'a' and 'c' moved to the second level of strength to match the relationships between sets 'a' and 'b'

The strength of edges between sets 'c' and 'b' remain at level 1

The strength of inter-set edges also are greater i.e., 'Bluetooth a' to 'Wifi a' is now at a level 3 and 'Bluetooth c' to 'Wifi c' is now at a 2

In this example, where one interface set is being added and removed at a time, it can be understood that the system can now distinguish between all three sets given a minimum lower bound of two steps. This lower bound of minimum mini-batch events to the number of unique sets follows a graph theory problem that is represented as $$\frac{n+1}{2} \geq m$$

where n is the number of interface sets and m is the minimum minibatch count. This implies that given a set of 100 devices that a sensor may pick up, its theoretical lower bound to where inner set clusters can be identified is 50 mini batches. This is also prior to metadata informed augmentation of interface cluster separation, which provides a significant decrease to the lower bound.

Due to this representation and event-based streaming schema, this methodology also allows a single traversal extraction of these relationship clusters, which represents a performance advantage as opposed to running offline batch training of a machine learning model that contains latency in its train/predict cycles as well as not having the benefit of a deterministic inference. Machine learning models can be used as a 'plugin,' as referenced earlier, to further reduce c, but it will always have the foundational deterministic relationships to fall back on as a source of truth.

The following is an example implementation of a continuous function for updating the edges. The actual function employed can be adapted to specific business logic; however, the function should follow a sigmoid function as such:

$$y = \frac{1}{(1 + e^{-k(x-a)})}$$

Where k is the sensitivity parameter and a is the suggestion thresholding parameter. We use a sigmoid so that we have properties of our function capable of tuning a parameter. This allows the function to adjust for noise levels inherent with this type of data collection. In this example, this is k, which is able to control the tails of the sigmoid. The second parameter can be considered a thresholding parameter for suggestions, which in this case is a and just designates where the center of the sigmoid is in order to get the stark increase in the edge weight. This nonlinear characteristic not only serves to give the edge weights ideal monotonic behavior but also gives flexibility for tuning based on different geographical environments. Examples of these environments are city apartments, suburban single-family homes, rural areas, and urban communities.

Servers and Devices

Figure 35:
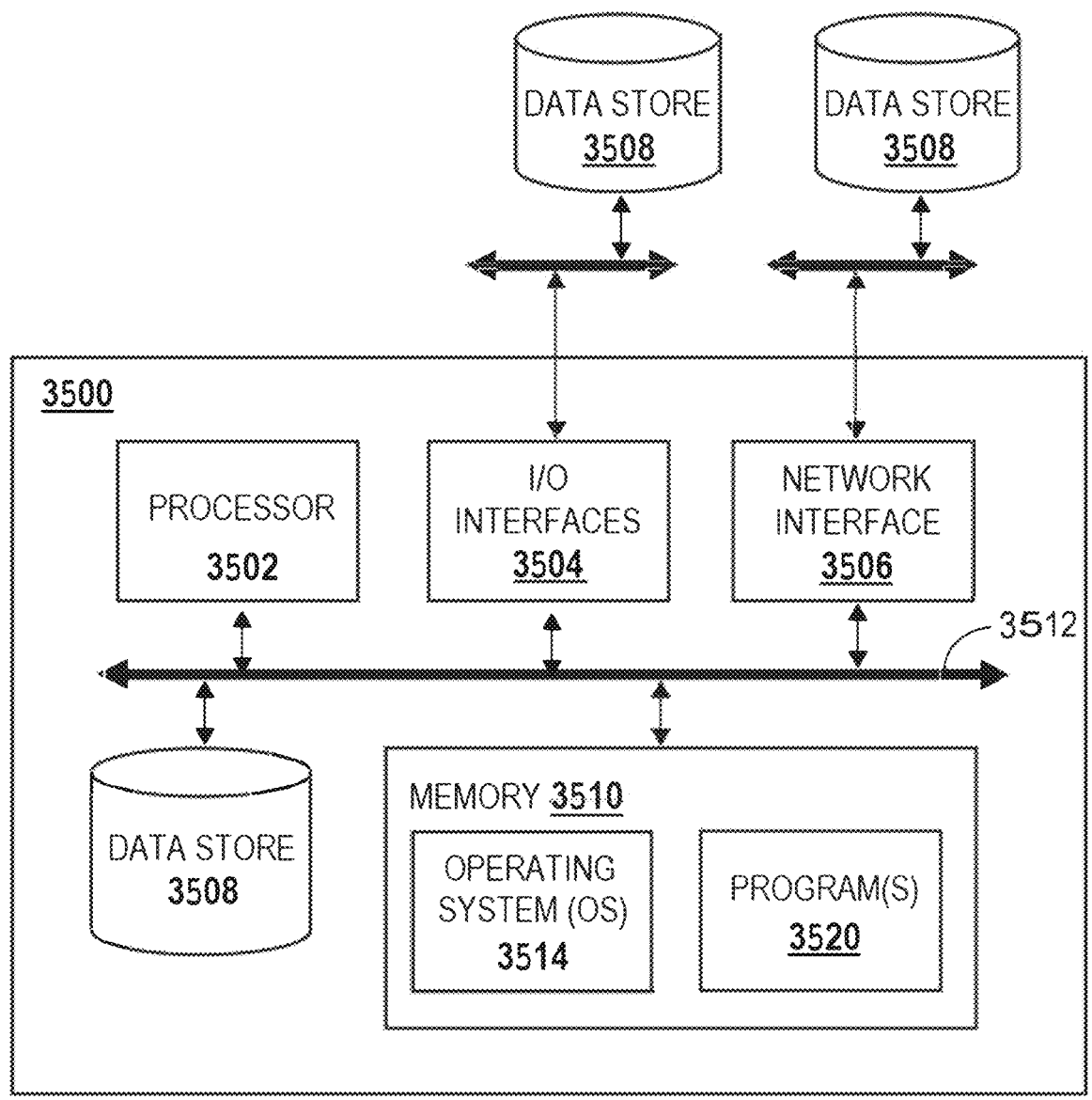
FIG. 35 depicts an example of a block diagram of a server which can be used in the system or standalone according to some embodiments of the disclosed technology.

Referring to FIG. 35, in an exemplary embodiment, a block diagram illustrates a server 3500 which can be used in the system 2400, in other systems, or standalone. The server 3500 can be a digital computer that, in terms of hardware architecture, generally includes a processor 3502, input/output (I/O) interfaces 3504, a network interface 3506, a data store 3508, and memory 3510. In some embodiments, the server 3500 can include additional components and suitably configured processing logic to support known or conventional operating features that are not necessarily described in detail herein. The components (3502, 3504, 3506, 3508, and 3510) are communicatively coupled via a local interface 3512. The local interface 3512 can be, for example but not limited to, one or more buses or other wired or wireless connections, as is known in the art. The local interface 3512 may have additional elements, which are omitted for simplicity, such as controllers, buffers (caches), drivers, repeaters, and receivers, among many others, to enable communications. Further, the local interface 3512 may include address, control, and/or data connections to enable appropriate communications among the server components.

The processor 3502 is a hardware device for executing software instructions. The processor 3502 can be any custom made or commercially available processor, a central processing unit (CPU), an auxiliary processor among several processors associated with the server 3500, a semiconductor-based microprocessor (in the form of a microchip or chip set), or generally any device for executing software instructions. When the server 3500 is in operation, the processor 3502 is configured to execute software stored within the memory 3510, to communicate data to and from the memory 3510, and to generally control operations of the server 3500 according to the software instructions. The I/O interfaces 3504 can be used to receive user input from and/or for providing system output to one or more devices or components. User input can be provided via, for example, a keyboard, touch pad, and/or a mouse. System output can be provided via a display device and a printer (not shown). I/O interfaces 3504 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 3506 can be used to enable the server 3500 to communicate on a network, such as the Internet, a wide area network (WAN), a local area network (LAN), and the like, etc. The network interface 3506 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 3506 may include address, control, and/or data connections to enable appropriate communications on the network. A data store 3508 can be used to store data. The data store 3508 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 3508 may incorporate electronic, magnetic, optical, and/or other types of storage media. In one example, the data store 3508 can be located internal to the server 3500 such as, for example, an internal hard drive connected to the local interface 3512 in the server 3500. Additionally, in another embodiment, the data store 3508 can be located external to the server 3500 such as, for example, an external hard drive connected to the I/O interfaces 3504 (e.g., SCSI or USB connection). In a further embodiment, the data store 3508 can be connected to the server 3500 through a network, such as, for example, a network attached file server.

The memory 3510 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 3510 may incorporate electronic, magnetic, optical, and/or other types of storage media. Note that the memory 3510 may have a distributed architecture, where various components are situated remotely from one another, but can be accessed by the processor 3502. The software in memory 3510 may include one or more software programs, each of which includes an ordered listing of executable instructions for implementing logical functions. The software in the memory 3510 includes a suitable operating system (O/S) 3514 and one or more programs 3520. The operating system 3514 essentially controls the execution of other computer programs, such as the one or more programs 3520, and provides scheduling, input-output control, file and data management, memory management, and communication control and related services. The one or more programs 3520 can be configured to implement the various processes, algorithms, methods, techniques, etc. described herein.

Figure 36:
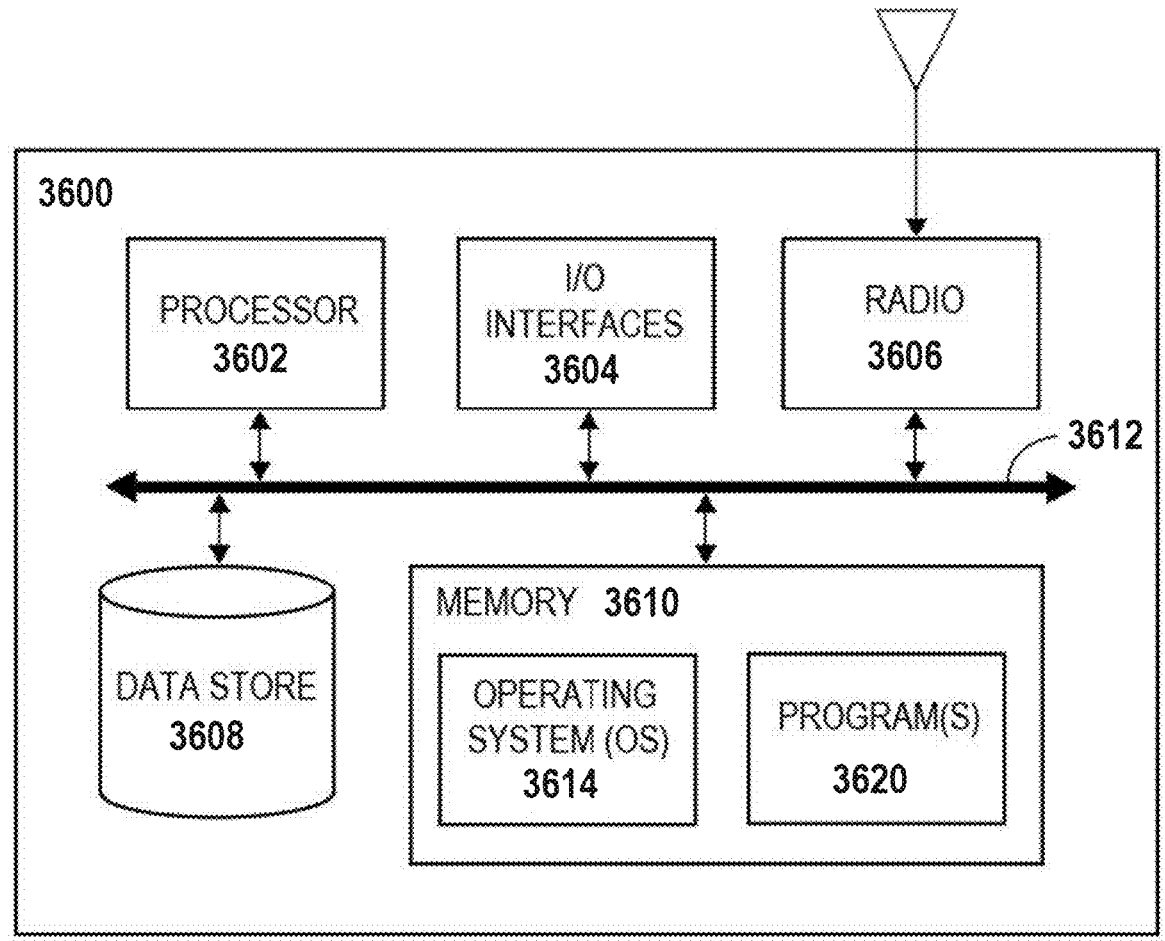
FIG. 36 shows an example of a block diagram of an electronic device according to some embodiments of the disclosed technology.

Referring to FIG. 36, in an exemplary embodiment, a block diagram illustrates an electronic device 3600, such as devices 112, 114, and/or sensors 116 which can be used in the system 2400 or the like. The term "electronic device" as used herein is a type of electronic device comprising circuitry and configured to generally perform functions such as recording audio, photos, and videos; displaying or reproducing audio, photos, and videos; storing, retrieving, or manipulation of electronic data; providing electrical communications and network connectivity; or any other similar function.

Non-limiting examples of electronic devices include: personal computers (PCs), workstations, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smart phones, tablet computers, laptop computers, wearable computers such as watches, Google Glasses, etc. and the like.

The electronic device 3600 can be a digital device that, in terms of hardware architecture, generally includes a processor 3602, input/output (I/O) interfaces 3604, a radio 3606, a data store 3608, and memory 3610. In some embodiments, the electronic device 3600 can include additional components and suitably configured processing logic to support known or conventional operating features that are not described in detail herein. The components (3602, 3604, 3606, 3608, and 3610) are communicatively coupled via a local interface 3612. The local interface 3612 can be, for example but not limited to, one or more buses or other wired or wireless connections, as is known in the art. The local interface 3612 can have additional elements, which are omitted for simplicity, such as controllers, buffers (caches), drivers, repeaters, and receivers, among many others, to enable communications. Further, the local interface 3612 may include address, control, and/or data connections to enable appropriate communications among the components.

The processor 3602, I/O interface 3604, data store 3608, and memory 3610 can be generally as described above with respect to server 3500 in FIG. 35. However, in some embodiments the processor 3602 can include a mobile optimized processor such as optimized for power consumption and mobile applications. When the electronic device 3600 is in operation, the processor 3602 is configured to execute software stored within the memory 3610, to communicate data to and from the memory 3610, and to generally control operations of the electronic device 3600 according to the software instructions. The I/O interfaces 3604 can be used to receive user input from and/or for providing system output. User input can be provided via, for example, a keypad, a touch screen, a scroll ball, buttons, bar code scanner, and the like. System output can be provided via a display device such as a liquid crystal display (LCD), touch screen, and the like. The I/O interfaces 3604 can include a graphical user interface (GUI) that enables a user to interact with the electronic device 3600. Additionally, the I/O interfaces 3604 may further include an imaging device, i.e. camera, video camera, etc.

The radio 3606 enables wireless communication to an external access device or network. Any number of suitable wireless data communication protocols, techniques, or methodologies can be supported by the radio 3606, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The software in memory 3610 can include one or more software programs 3620, each of which includes an ordered listing of executable instructions for implementing logical functions. In the example of FIG. 36, the software in the memory 3610 includes a suitable operating system (O/S) 3614 and programs 3620. The operating system 3614 essentially controls the execution of other computer programs, and provides scheduling, input-output control, file and data management, memory management, and communication control and related services. The programs 3620 may include various applications, add-ons, etc. configured to provide end user functionality with the electronic device 3600. For example, exemplary programs 3620 may include, but not limited to, a web browser, social networking applications, streaming media applications, games, mapping and location applications, electronic mail applications, financial applications, and the like. In a typical example, the end user typically uses one or more of the programs 3620 along with a network such as the system 2400.

Remarks

The above description and drawings are illustrative and are not to be construed as limiting. Numerous specific details are described to provide a thorough understanding of the disclosure. However, in some instances, well-known details are not described in order to avoid obscuring the description.

Further, various modifications can be made without deviating from the scope of the embodiments.

In some embodiments, a wireless device identification system can comprise: one or more sensors each having at least one software defined radio to receive signals transmitted between a base station and a mobile wireless device; one or more processors; and one or more memory devices having stored thereon instructions that when executed by the one or more processors cause the one or more processors to: capture an International Mobile Subscriber Identity (IMSI) and a Temporary Mobile Subscriber Identity (TMSI) from the received signals; map the IMSI to the TMSI; and identify the mobile wireless device based on the IMSI or current TMSI.

In some embodiments, identifying the mobile wireless device comprises assigning owner information to the mobile wireless device based on a cellular subscription associated with the IMSI. In some embodiments, the system can further comprise instructions causing the one or more processors to subsequently identify the mobile wireless device based on the TMSI. In some embodiments, at least one of the one or more sensors includes multiple software defined radios. In some embodiments, mapping IMSI and TMSI together comprises: capturing an uplink Radio Network Temporary Identifier (RNTI) and a downlink RNTI; mapping the uplink RNTI to the IMSI; mapping the downlink RNTI to the TMSI; and mapping the downlink RNTI to the uplink RNTI. In some embodiments, the sensor is a first sensor and further comprising a second sensor positioned in a location of interest and having at least one software defined radio to receive second signals transmitted between a second base station and the mobile wireless device; and further comprising instructions causing the one or more processors to: capture the TMSI and the downlink RNTI from the received second signals; and identify the mobile wireless device based on the TMSI. In some embodiments, the system further comprises receiving third signals transmitted between the second base station and the mobile wireless device and instructions causing the one or more processors to: capture a second TMSI and the downlink RNTI from the received third signals; map the second TMSI to the downlink RNTI; map the IMSI to the second TMSI based on the downlink RNTI map to the uplink RNTI; and identify the mobile wireless device based on the second TMSI. In some embodiments, the received signals include a Noise Ratio (SINR) and a Received Signal Strength Indicator (RSSI) corresponding to the mobile wireless device; and further comprising instructions causing the one or more processors to: determine a location of the mobile wireless device based at least in part on the SINR and the RSSI. In some embodiments, the system further comprises instructions causing the one or more processors to: determine that the location of the mobile wireless device is within a geofenced region around the location of interest; and notify a user associated with the location of interest that the mobile wireless device is within the geofenced region.

In some embodiments, a wireless device identification system can comprise: one or more sensors configured to receive signals transmitted between a wireless device and a mobile wireless device; one or more processors; and one or more memory devices having stored thereon instructions that when executed by the one or more processors cause the one or more processors to: capture information corresponding to the mobile wireless device; determine if the information matches a known device stored in a device database; if the information does not match a known device: create a new device data structure in the database; create an unknown device event; and report the unknown device event to a user; if the information does match a known device: determine if the information matches a persona stored in a persona database; if the information does not match a persona, create an unknown persona event and report the unknown persona event to the user; if the information does match a persona, determine if the persona is welcome; If the persona is not welcome create an unwelcome event and report the unwelcome event to the user; If the persona is welcome notify the user regarding the persona.

In some embodiments, the wireless device is a cell tower. In some embodiments, the system further comprises instructions causing the one or more processors to: report the unknown device event, unknown persona event, or the unwelcome persona event via a text-to-law enforcement message. In some embodiments, the information corresponding to the mobile wireless device includes a Noise Ratio (SINR) and a Received Signal Strength Indicator (RSSI) corresponding to the mobile wireless device; and further comprising instructions causing the one or more processors to: determine a location of the mobile wireless device based at least in part on the SINR and the RSSI.

In some embodiments, the system further comprises instructions causing the one or more processors to: determine that the location of the mobile wireless device is within a geofenced region around a location of interest; and notify the user that the mobile wireless device is within the geofenced region. In some embodiments, the information corresponding to the mobile wireless device includes an International Mobile Subscriber Identity (IMSI) and a Temporary Mobile Subscriber Identity (TMSI); and further comprising instructions causing the one or more processors to: map the IMSI to the TMSI; and identify subscriber information corresponding to the mobile wireless device based on the IMSI. In some embodiments, the information corresponding to the mobile wireless device includes a Temporary Mobile Subscriber Identity (TMSI) and further comprising instructions causing the one or more processors to: identify subscriber information corresponding to the mobile wireless device based on the TMSI.

In some embodiments, a method for identifying a wireless device can comprise capturing information corresponding to a mobile wireless device from signals received by a sensor transmitted between the mobile wireless device and a wireless device; determining with one or more processors if the information matches a known device stored in a device database; if the information does not match a known device: creating a new device data structure in the database; creating an unknown device event; and reporting the unknown device event to a user; if the information does match a known device: determining with the one or more processors if the information matches a persona stored in a persona database; if the information does not match a persona, creating an unknown persona event and reporting the unknown persona event to the user; if the information does match a persona, determining with the one or more processors if the persona is welcome; If the persona is not welcome creating an unwelcome event and reporting the unwelcome event to the user; If the persona is welcome notifying the user regarding the persona.

In some embodiments, the method further comprises reporting the unknown device event, unknown persona event, or the unwelcome persona event via a text-to-law enforcement message. In some embodiments, the information corresponding to the mobile wireless device includes a Noise Ratio (SINR) and a Received Signal Strength Indicator (RSSI) corresponding to the mobile wireless device and further comprising determining a location of the mobile wireless device based at least in part on the SINR and the RSSI. In some embodiments, the method further comprises determining with the one or more processors that the location of the mobile wireless device is within a geofenced region around a location of interest and notifying the user that the mobile wireless device is within the geofenced region. In some embodiments, the information corresponding to the mobile wireless device includes an International Mobile Subscriber Identity (IMSI) and a Temporary Mobile Subscriber Identity (TMSI) and further comprising mapping the IMSI to the TMSI and identifying subscriber information corresponding to the mobile wireless device based on the IMSI. In some embodiments, the information corresponding to the mobile wireless device includes a Temporary Mobile Subscriber Identity (TMSI) and further comprising identifying subscriber information corresponding to the mobile wireless device based on the TMSI.

In some embodiments, a wireless device identification system can comprise: one or more sensors each having at least one software defined radio to receive signals transmitted between one or more wireless devices and a mobile wireless device; one or more processors; and one or more memory devices having stored thereon instructions that when executed by the one or more processors cause the one or more processors to: capture cellular information and Wi-Fi information from the received signals; and correlate the cellular information and the Wi-Fi information to the mobile wireless device.

In some embodiments, the system further comprises instructions causing the one or more processors to capture Bluetooth information from the received signals and correlate the Bluetooth information to the mobile wireless device. In some embodiments, the system further comprises instructions causing the one or more processors to capture local network information from the received signals and correlate the local network information to the mobile wireless device. In some embodiments, correlating the cellular information, the Wi-Fi information, the Bluetooth information, and the local network information to the mobile wireless device comprises: creating a relationship graph having a plurality of nodes, including a node corresponding to each of the cellular information, the Wi-Fi information, the Bluetooth information, and the local network information; and determining an association strength between each node of the relationship graph.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others. Similarly, various requirements are described which can be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms can be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A wireless device identification system, comprising:
one or more sensors each having at least one software defined radio to receive signals transmitted between one or more wireless devices and a mobile wireless device;
one or more processors; and
one or more memory devices having stored thereon instructions that when executed by the one or more processors cause the one or more processors to:
capture cellular information and Wi-Fi information from the received signals corresponding to the mobile wireless device;
capture Bluetooth information from the received signals and correlate the Bluetooth information to the mobile wireless device; and
correlate the cellular information and the Wi-Fi information to the mobile wireless device, including:
creating an edge weighted relationship graph having a plurality of nodes, including a node corresponding to each of the cellular information, the Wi-Fi information, and the Bluetooth information; and
determining an association strength corresponding to an edge weighting between each node of the relationship graph.

2. The system of claim 1, further comprising instructions causing the one or more processors to capture local network information from the received signals and correlate the local network information to the mobile wireless device.

3. A wireless device identification system, comprising:
one or more sensors each having at least one software defined radio to receive signals transmitted between one or more wireless devices and a mobile wireless device;
one or more processors; and
one or more memory devices having stored thereon instructions that when executed by the one or more processors cause the one or more processors to:
capture cellular information and Wi-Fi information from the received signals corresponding to the mobile wireless device; and
correlate the cellular information and the Wi-Fi information to the mobile wireless device, including creating an edge weighted relationship graph having a node corresponding to each of the cellular information and the Wi-Fi information and determining an association strength corresponding to an edge weighting between each node of the relationship graph.

4. The system of claim 3, wherein correlating the cellular information and the Wi-Fi information to the mobile wireless device further comprises determining an association strength between each node of the relationship graph.

5. A wireless device identification system, comprising:
one or more processors; and
one or more memory devices having stored thereon instructions that when executed by the one or more processors cause the one or more processors to:
receive signals transmitted between one or more wireless devices and a mobile wireless device;
capture cellular information and Wi-Fi information from the received signals corresponding to the mobile wireless device;
capture local network information and correlate the local network information to the mobile wireless device; and
correlate the cellular information, the Wi-Fi information, and the local network information to the mobile wireless device, including:
creating an edge weighted relationship graph having a plurality of nodes, including a node corresponding to each of the cellular information, the Wi-Fi information, and the local network information; and
determining an association strength corresponding to an edge weighting between each node of the relationship graph.

6. The system of claim 5, further comprising instructions causing the one or more processors to capture Bluetooth information from the received signals and correlate the Bluetooth information to the mobile wireless device.

* * * * *